United States Patent
Lee et al.

(10) Patent No.: US 11,019,972 B2
(45) Date of Patent: Jun. 1, 2021

(54) CLEANING ROBOT AND METHOD FOR CONTROLLING SAME

(71) Applicant: Samsung Electronics Co., Ltd, Suwon-si (KR)

(72) Inventors: Dong Hun Lee, Ansan-si (KR); Heum Yong Park, Suwon-si (KR); Min Jae Kim, Seongnam-si (KR); Min Woo Ryu, Suwon-si (KR); Young Do Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 15/771,350

(22) PCT Filed: Oct. 20, 2016

(86) PCT No.: PCT/KR2016/011823
§ 371 (c)(1),
(2) Date: Apr. 26, 2018

(87) PCT Pub. No.: WO2017/073955
PCT Pub. Date: May 4, 2017

(65) Prior Publication Data
US 2018/0317725 A1   Nov. 8, 2018

(30) Foreign Application Priority Data

Oct. 27, 2015   (KR) .......................... 10-2015-0149359

(51) Int. Cl.
*A47L 9/28*  (2006.01)
*A47L 11/20*  (2006.01)
(Continued)

(52) U.S. Cl.
CPC ........... *A47L 9/2894* (2013.01); *A47L 7/0085* (2013.01); *A47L 9/28* (2013.01); *A47L 9/2815* (2013.01);
(Continued)

(58) Field of Classification Search
CPC ...... A47L 11/185; A47L 11/20; A47L 11/201; A47L 11/202; A47L 11/4011;
(Continued)

(56) References Cited

U.S. PATENT DOCUMENTS 7,861,366 B2 * 1/2011 Hahm .................... A47L 9/009
15/319
2010/0256812 A1 * 10/2010 Tsusaka ................ A47L 9/2852
700/254
(Continued)

FOREIGN PATENT DOCUMENTS

CN   102046059 A   5/2011
CN   202397386 U   8/2012
(Continued)

OTHER PUBLICATIONS

KR-20150026528-A—English Machine Translation (Year: 2015).*
(Continued)

*Primary Examiner* — Marc Carlson

(57) ABSTRACT

Disclosed herein are a cleaning robot and a method of controlling the same. The cleaning robot according to one embodiment includes a modular in which one or more modules configured to support different functions are integrated, and a controller configured to control the overall operation of the cleaning robot.

9 Claims, 65 Drawing Sheets

(51) Int. Cl.
　　　*A47L 11/202* (2006.01)
　　　*A47L 11/18* (2006.01)
　　　*A47L 11/40* (2006.01)
　　　*B25J 11/00* (2006.01)
　　　*B25J 9/16* (2006.01)
　　　*B25J 9/00* (2006.01)
　　　*B25J 13/08* (2006.01)
　　　*A47L 7/00* (2006.01)

(52) U.S. Cl.
　　　CPC .......... *A47L 9/2826* (2013.01); *A47L 11/185* (2013.01); *A47L 11/20* (2013.01); *A47L 11/201* (2013.01); *A47L 11/202* (2013.01); *A47L 11/4011* (2013.01); *A47L 11/4044* (2013.01); *B25J 9/00* (2013.01); *B25J 9/16* (2013.01); *B25J 9/1697* (2013.01); *B25J 11/00* (2013.01); *B25J 11/0085* (2013.01); *B25J 13/08* (2013.01); *A47L 2201/02* (2013.01); *A47L 2201/04* (2013.01); *A47L 2201/06* (2013.01)

(58) Field of Classification Search
　　　CPC ............. A47L 11/4044; A47L 2201/02; A47L 2201/04; A47L 2201/06; A47L 7/0085; A47L 9/28; A47L 9/2815; A47L 9/2826; A47L 9/2894; B25J 11/00; B25J 11/0085; B25J 13/08; B25J 9/00; B25J 9/16; B25J 9/1697
　　　See application file for complete search history.

(56) References Cited

U.S. PATENT DOCUMENTS

| | | |
|---|---|---|
| 2014/0100693 A1 | 4/2014 | Fong et al. |
| 2014/0207280 A1 | 7/2014 | Duffley et al. |
| 2015/0000068 A1 | 1/2015 | Tsuboi et al. |
| 2017/0008162 A1* | 1/2017 | Tsubota ................. G05B 19/00 |
| 2018/0206687 A1* | 7/2018 | Kim ........................... A47L 9/28 |
| 2020/0245837 A1* | 8/2020 | Furuta ..................... A47L 9/009 |

FOREIGN PATENT DOCUMENTS

| | | | |
|---|---|---|---|
| CN | 203074576 U | 7/2013 | |
| CN | 104460663 A | 3/2015 | |
| CN | 104714411 A | 6/2015 | |
| KR | 10-2007-0096272 A | 10/2007 | |
| KR | 10-1349671 B1 | 1/2014 | |
| KR | 10-2015-0026528 A | 3/2015 | |
| KR | 20150026528 A * | 3/2015 | |
| KR | 10-2015-0075639 A | 7/2015 | |
| KR | 101654012 B1 * | 9/2016 | |
| WO | WO-2007117095 A1 * | 10/2007 | ............. A47L 9/009 |

OTHER PUBLICATIONS

KR-101654012-B1—English Machine Translation (Year: 2016).*
Supplementary Partial European Search Report dated Oct. 4, 2018 in connection with European Patent Application No. 16 86 0138, 13 pages.
Supplementary Partial European Search Report dated Jan. 11, 2019 in connection with European Patent Application No. 16 86 0138, 11 pages.
The First Office Action in connection with Chinese Application No. 2020033001991520 dated Apr. 2, 2020, 30 pages.
International Search Report dated Jan. 18, 2017 in connection with International Patent Application No. PCT/KR2016/011823.
Written Opinion of the International Searching Authority dated Jan. 18, 2017 in connection with International Patent Application No. PCT/KR2016/011823.
Office Action dated Oct. 26, 2020 in connection with Chinese Patent Application No. 201680070436.5, 23 pages.

* cited by examiner

Fig. 2A
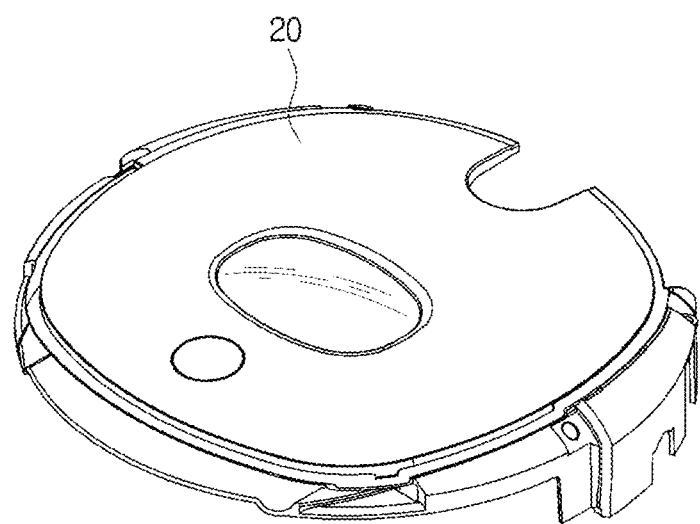
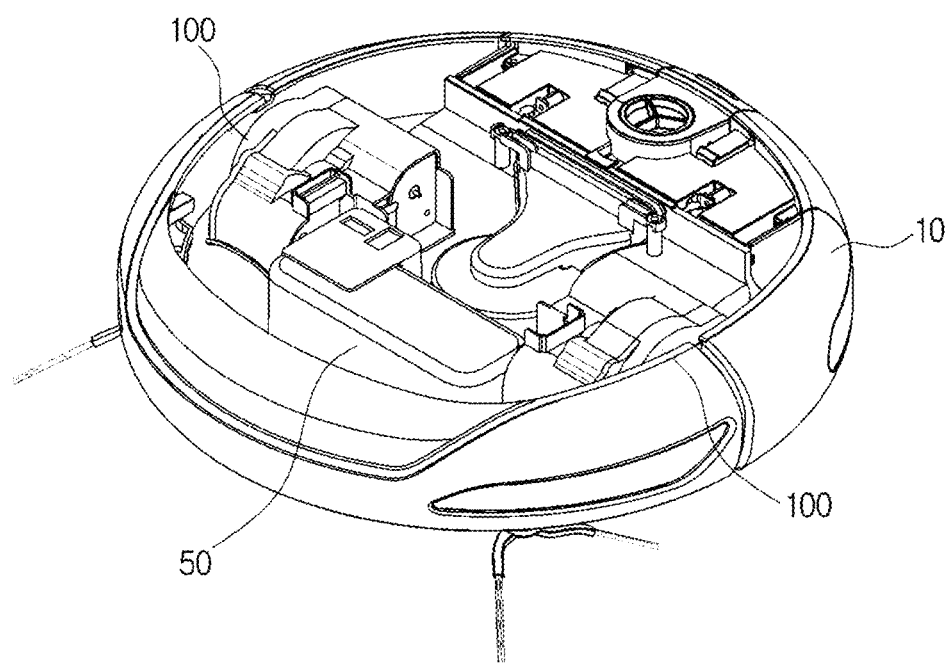

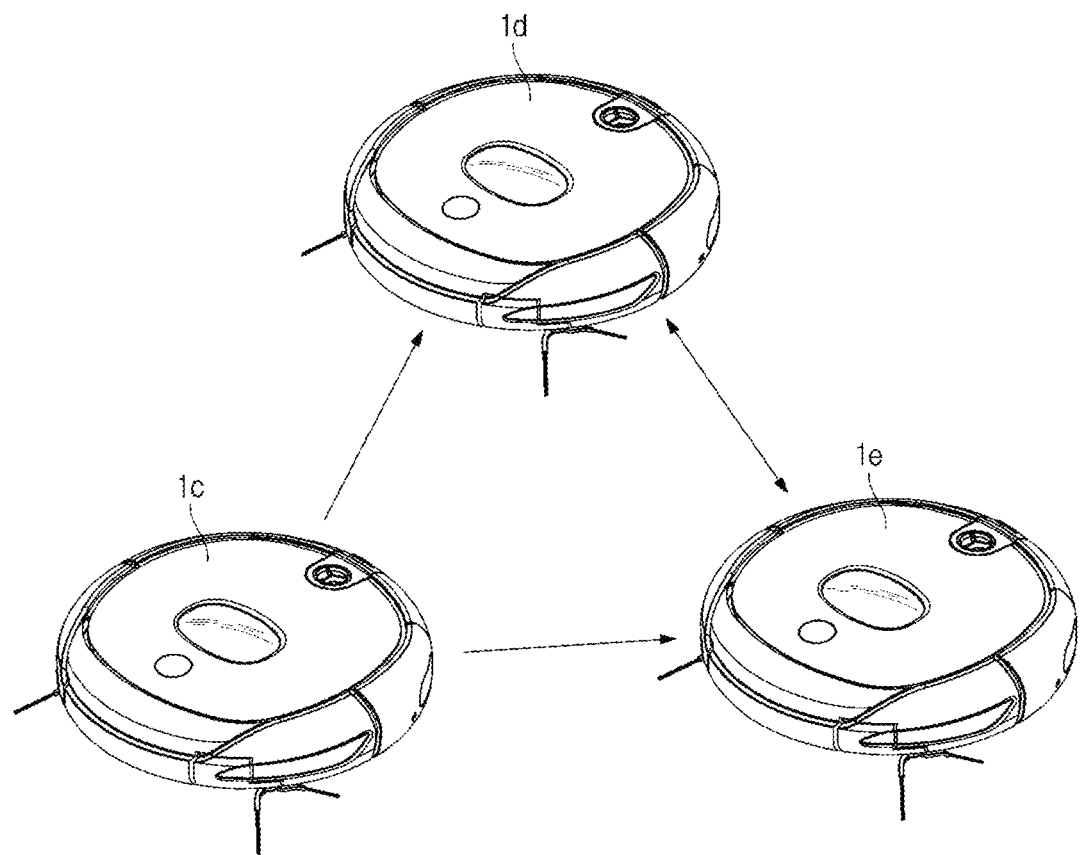

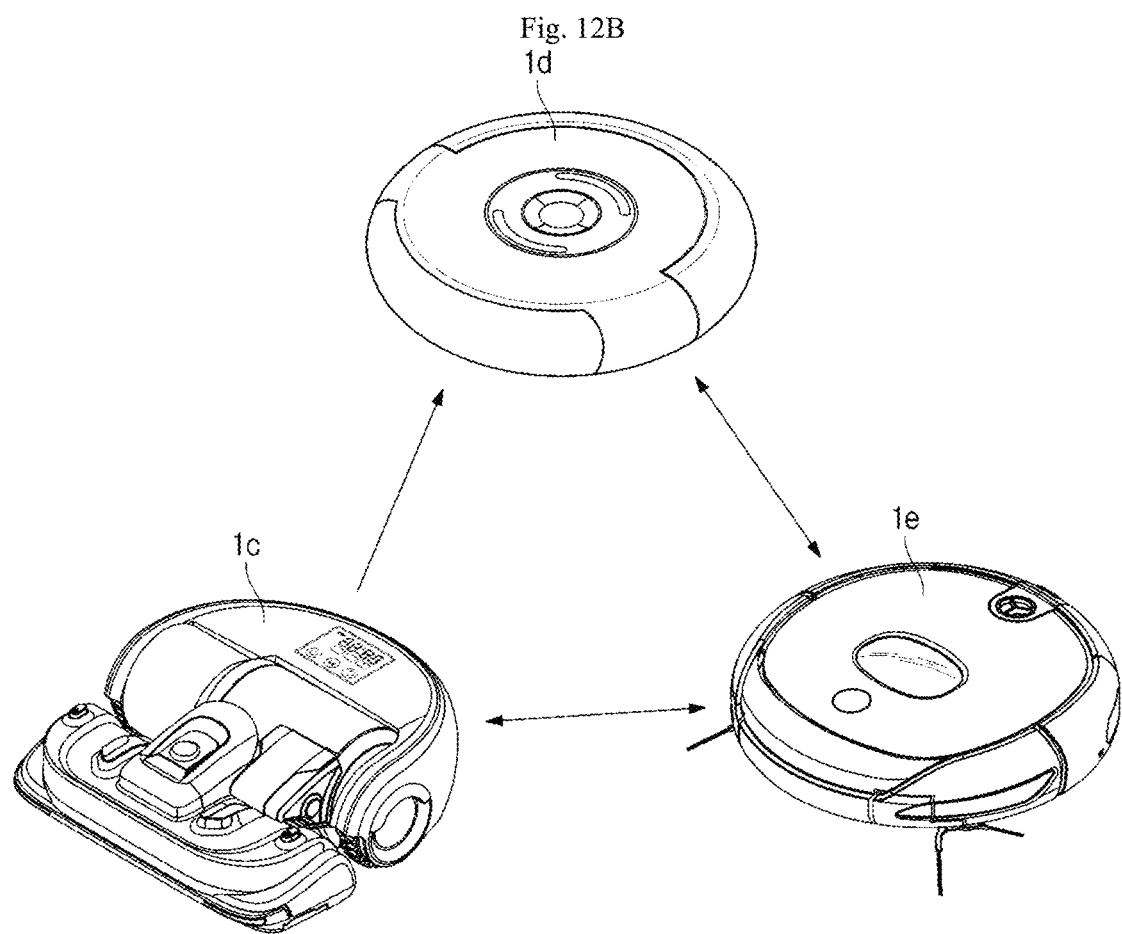

Fig. 24
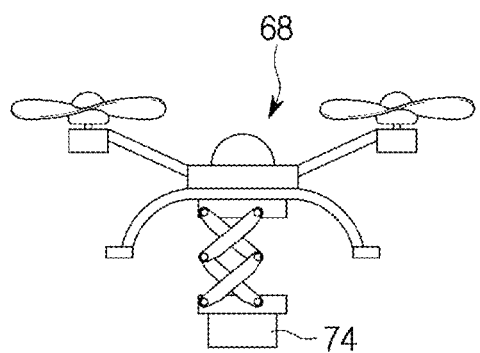
(a)
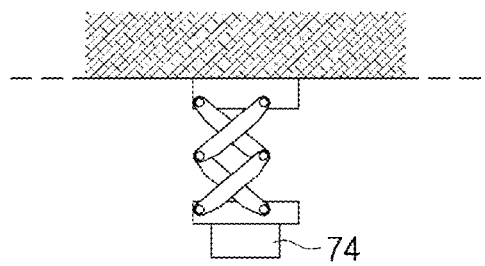
(b)

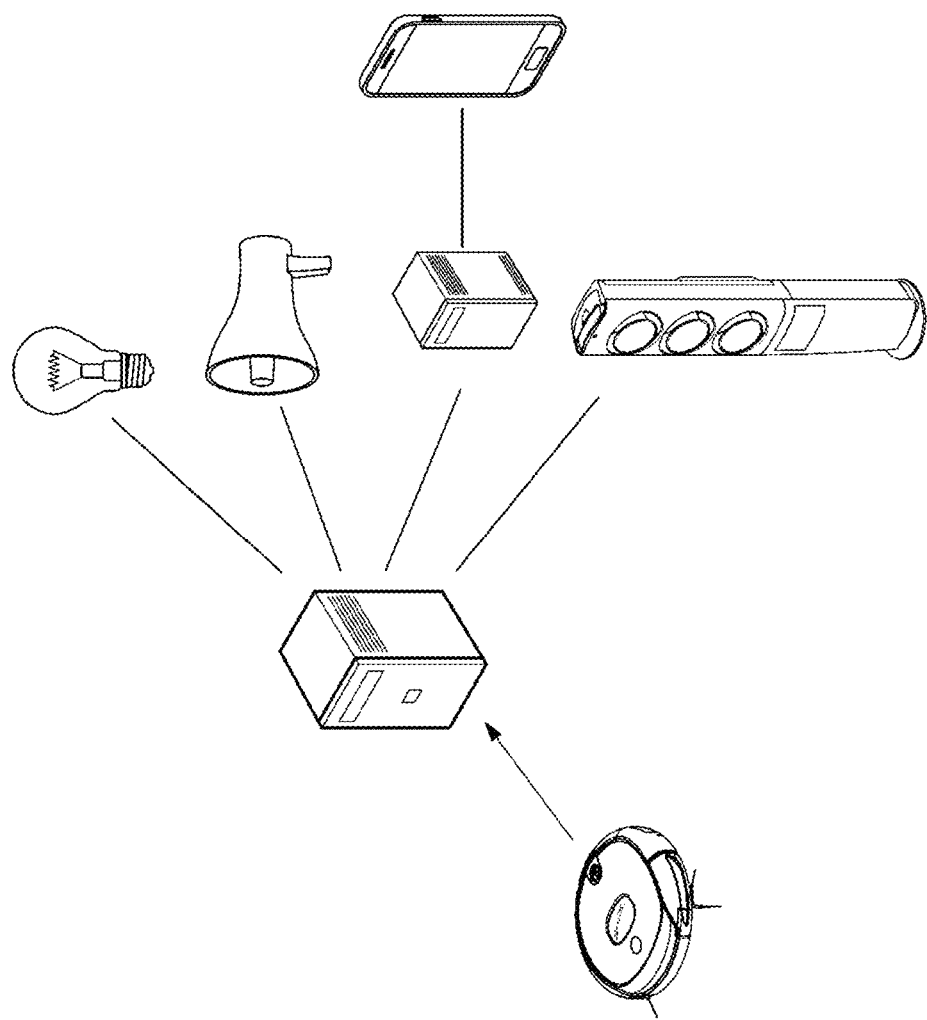
Fig. 49
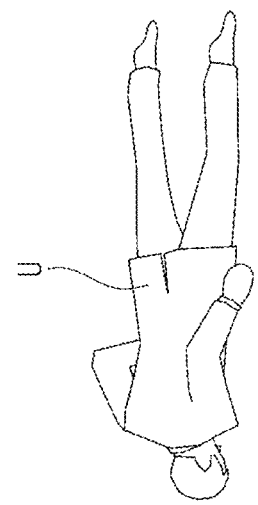

CLEANING ROBOT AND METHOD FOR CONTROLLING SAME

CROSS-REFERENCE TO RELATED APPLICATION(S) AND CLAIM OF PRIORITY

This application is a 371 of International Application No. PCT/KR2016/011823 filed Oct. 20, 2016, which claims priority to Korean Patent Application No. 10-2015-0149359 filed Oct. 27, 2015, the disclosures of which are herein incorporated by reference in their entirety.

TECHNICAL FIELD

The present disclosure relates to a cleaning robot that provides the Human Service Interaction (HRI) technology, and a method of manufacturing the same.

BACKGROUND

A cleaning robot is an apparatus that automatically cleans an area to be cleaned by suctioning foreign substances such as dust accumulated on a floor while navigating the area to be cleaned without a user's manipulation. That is, the cleaning robot cleans the area to be cleaned while navigating the area to be cleaned.

Recently, as the cleaning robot market has been gradually expanding, a cleaning robot is no longer limited to merely cleaning an area to be cleaned, and research for combining various other technologies is being carried out.

SUMMARY

To solve the above problem, the following cleaning robot and method of controlling the same are provided.

According to one aspect, a cleaning robot includes a modular in which one or more modules configured to support different functions are integrated, and a controller configured to control an operation of the modular and control at least one of devices in the cleaning robot and Internet-of-Things (IoT) devices.

The modular may include a gripper module configured to control a robot arm and mount a cleaning head on the robot arm, and the controller may control an operation of the gripper module to perform cleaning using the cleaning head mounted on the robot arm.

The modular may include a communication module configured to support connection to at least one other cleaning robot through a communication network, and the controller may control an operation of the communication module on the basis of at least one of supporting specifications that the at least one other cleaning robot supports, a size of a cleaning region, and a shape of the cleaning region and control performance of joint cleaning.

The modular may include a recognition module configured to detect a user present in an indoor space, and the controller may control performance of cleaning on the basis of at least one of a result detected through the recognition module and a result detected through an IoT device.

The modular may include a sensor module configured to acquire indoor environment information, and the controller may control at least one of the cleaning robot and the IoT devices on the basis of the indoor environment information acquired by the sensor module and desired information on the indoor environment set by a user and adjust the indoor environment.

The modular may include a communication module configured to support connection to an external device through a communication network and an imaging unit configured to acquire image information, and when a remote connection request is received through the communication module, the controller may control the imaging unit to acquire image information.

According to another aspect, a cleaning robot includes a robot arm on which a cleaning head is mounted, and a controller configured to determine a cleaning head corresponding to a cleaning mode from among a plurality of cleaning heads, control mounting between the robot arm and the determined cleaning head, and control performance of cleaning using the mounted cleaning head.

A water supply pipe configured to supply water to the cleaning head and a suctioning flow path configured to suction dust may be provided inside the robot arm.

A docking unit configured to guide coupling with the cleaning head and an electromagnet configured to fix the cleaning head may be provided inside the robot arm.

The cleaning robot may further include a cleaning head storage in which the plurality of cleaning heads are stored.

The cleaning head storage may be provided at a station of the cleaning robot or at a predetermined position.

The plurality of cleaning heads may be stored at predetermined positions in the cleaning head storage.

The controller may use an infrared ray (IR) sensor mounted on the cleaning head storage to identify a position of the cleaning head storage.

According to still another aspect, a cleaning robot includes a communication module configured to perform communication connection to at least one other cleaning robot, a determiner configured to determine a joint cleaning method to be performed with the at least one other cleaning robot, on the basis of at least one of supporting specifications that the at least one other cleaning robot supports, a size of a cleaning region, and a shape of the cleaning region, and a controller configured to control the cleaning robot and the at least one other cleaning robot on the basis of the determined joint cleaning method.

The cleaning robot may include a storage unit configured to store map data related to a region in which the cleaning robot is present.

The determiner may determine any one of a group joint cleaning method in which the same region is cleaned together by the cleaning robot and the at least one other cleaning robot, a sectional joint cleaning method in which a cleaning region is divided and each section thereof is separately cleaned by the cleaning robot and the at least one other cleaning robot, and a multiple-pattern joint cleaning method in which the group joint cleaning method and the sectional joint cleaning method are mixed, as the joint cleaning method.

The controller may use at least one of environment information and state information included in cleaning situation information received from the at least one other cleaning robot and control at least one of the operations of the at least one other cleaning robot and the cleaning robot.

According to yet another aspect, a cleaning robot includes a communication unit configured to receive, in response to transmitting supporting specifications of the cleaning robot to at least one other cleaning robot, a cleaning method and a cleaning region from a cleaning robot that has received the transmitted supporting specifications, and a controller configured to control devices in the cleaning robot on the basis of the cleaning method and the cleaning region received from the cleaning robot.

The communication unit may transmit environment information of the cleaning region and state information of the cleaning robot.

The controller may control devices in the cleaning robot and perform cleaning on the basis of any one of a group joint cleaning method in which the same region is cleaned together by the cleaning robot and the at least one other cleaning robot, a sectional joint cleaning method in which a cleaning region is divided and each section thereof is separately cleaned by the cleaning robot and the at least one other cleaning robot, and a multiple-pattern joint cleaning method in which the group joint cleaning method and the sectional joint cleaning method are mixed.

According to yet another aspect, a cleaning robot includes a detector configured to detect a user on the basis of at least one of at least one Internet-of-Things (IoT) device present in an indoor space and a sensor module, and a cleaning controller configured to, when a distance between the detected user and the cleaning robot is determined to be smaller than a predetermined level, control performance of cleaning on the basis of a state of the detected user.

When the distance between the detected user and the cleaning robot is determined to be smaller than the predetermined level, the cleaning controller may switch to a quiet mode on the basis of an action of the detected user or switch a cleaning section.

When the distance between the detected user and the cleaning robot is determined to be smaller than the predetermined level, the cleaning controller may control performance of cleaning on the basis of at least one of an action of the user detected by the at least one IoT device or a sensor unit, a position of the user, a voice of the user received through a voice recognizer, and surrounding noise.

The cleaning controller may regulate a level of the quiet mode in accordance with a level of the surrounding noise received through the voice recognizer.

According to yet another aspect, a cleaning robot includes a desired information setter configured to set desired information related to an indoor environment, a generator configured to acquire indoor environment information and generate an indoor environment map, and an indoor environment controller configured to compare the set desired information related to the indoor environment and the acquired indoor environment map and regulate the indoor environment on the basis of a result of the comparison.

The cleaning robot may further include a controller configured to control the overall operation of the cleaning robot, and a flight vehicle controlled by the controller and having a sensor module configured to acquire the indoor environment information mounted thereon.

The generator may acquire the indoor environment information from at least one of a sensor module mounted on the cleaning robot, the sensor module mounted on the flight vehicle, and an IoT device, combine the acquired pieces of indoor environment information, and map the combined pieces of indoor environment information to map information to generate the indoor environment map.

The indoor environment controller may control at least one of devices in the cleaning robot and IoT devices and regulate the indoor environment to correspond to the set desired information related to the indoor environment.

The generator may control operation of at least one of the sensor module mounted on the cleaning robot, the sensor module mounted on the flight vehicle, and an IoT device in accordance with a predetermined update cycle to acquire the indoor environment information and generate the indoor environment map.

When a difference between indoor environment information acquired by the IoT device and indoor environment information acquired by the sensor module mounted on the cleaning robot exceeds a predetermined range, the indoor environment controller may request for re-measurement.

According to yet another aspect, a cleaning robot includes an imaging unit configured to acquire image information in response to a remote connection request from a user, a communication unit configured to transmit the acquired image information, and a controller configured to control devices in the cleaning robot.

When another task is being performed, the controller may control the devices in the cleaning robot to stop the other task which is being performed, in accordance with the remote connection request, and activate the imaging unit.

The imaging unit may acquire image information related to an area of interest of the user or acquire the image information according to remote controlling of the user.

The imaging unit may acquire image information related to a plurality of areas of interest at predetermined times according to a predetermined order.

The cleaning robot may further include a flight vehicle controlled by the controller.

The imaging unit may be mounted on at least one of one surface of the cleaning robot and one surface of the flight vehicle.

When the remote connection of the user is ended, the controller may control the devices in the cleaning robot to resume the stopped task.

The controller may detect a position of the flight vehicle and mark the position of the flight vehicle on map information on the basis of a result of the detection.

According to yet another aspect, a cleaning robot includes a voice recognition module configured to recognize and record a voice and identify a point from which the recognized voice is generated, a communication unit configured to transmit the recorded voice, and a controller configured to control devices in the cleaning robot to output a predetermined voice or perform connection to predetermined contact information.

The voice recognition module may use voice recognizers arranged in an array form to identify the point from which the recognized voice is generated.

The controller may control the devices in the cleaning robot to move to the identified point and output a predetermined voice, capture image information related to the identified point, or make a phone call through a home network.

According to yet another aspect, a cleaning robot includes a recognizer configured to recognize a call signal of a user, a voice recognition module configured to receive a voice command from the user and derive a recognized result related to the received voice command, and a controller configured to control devices in the cleaning robot on the basis of the recognized result when the identified user is determined to have use authority related to the recognized result.

The controller may include a security module configured to determine the use authority of the user through at least one of motion of the user and voice of the user.

The controller may control the devices in the cleaning robot and at least one Internet-of-Things (IoT) device connected through a communication network to provide a service corresponding to the recognized result.

According to yet another aspect, a cleaning robot includes a voice recognition module configured to receive voice of a user and detect an abnormal symptom, a sensor module configured to acquire biometric information of the user, and a controller configured to determine a degree of a state of the user on the basis of the acquired biometric information of the user and control devices in the cleaning robot in accordance with a predetermined response plan on the basis of the determined degree of the state of the user.

The voice recognition module may identify a point from which the received voice of the user is generated through a voice recognizer.

In accordance with the determined degree of the state of the user, the controller may control a speaker and output a predetermined voice to the user or control a communication unit and perform connection to predetermined contact information.

In accordance with the determined degree of the state of the user, the controller may control operation of one or more IoT devices connected through a home network.

According to yet another aspect, a cleaning robot includes a sensor module configured to acquire biometric information of a user in accordance with a predetermined cycle, and a controller configured to, when a degree of a state of the user is determined on the basis of the acquired biometric information of the user and, as a result, is determined to be abnormal, control devices in the cleaning robot in accordance with a predetermined response plan on the basis of the determined degree of the state of the user and whether a user reacts.

According to yet another aspect, a cleaning robot includes an imaging unit configured to follow an object selected by a user and acquire image information related to the object, and a controller configured to perform a process corresponding to a situation that occurs in accordance with movement of the detected object from the acquired image information.

The imaging unit may receive selection on an object to be followed through an input unit or receive selection on an object to be followed by being in association with an external device through a communication unit, and follow the selected object to acquire image information related to the object.

The controller may detect pollution that occurs in surroundings as the detected object moves and, when it is detected that pollution has occurred, control devices in the cleaning robot to perform cleaning.

The controller may control the communication unit and contact predetermined contact information or send a message when an occurrence of danger is expected on the basis of at least one of movement of the object and map information.

The controller may control a speaker and transmit a warning message to the object.

The cleaning robot may further include a voice recognition module configured to recognize voice of the object.

The controller may recognize the voice of the object through the voice recognition module and perform operation corresponding to a result of the recognition.

When it is determined, as a result of the recognition through the voice recognition module, that a path to a destination has been requested for, the controller may provide path guidance to the destination on the basis of map information stored in a memory.

According to yet another aspect, a method of controlling a cleaning robot includes controlling mounting between a robot arm and a determined cleaning head, and controlling performance of cleaning using the mounted cleaning head.

The controlling of the mounting may further include fixing the mounted cleaning head through a docking unit provided at the robot arm and an electromagnet provided at the robot arm.

The controlling of the mounting may include identifying a storage in which the determined cleaning head is stored from a cleaning head storage in which a plurality of cleaning heads are stored, and controlling mounting between the cleaning head stored in the identified storage and the robot arm.

The controlling of the mounting may include identifying a position of the cleaning head storage using an infrared sensor mounted on the cleaning head storage.

According to yet another aspect, a method of controlling a cleaning robot includes performing communication connection to at least one other cleaning robot, determining a joint cleaning method to be performed with the at least one other cleaning robot, on the basis of at least one of supporting specifications that the at least one other cleaning robot supports, a size of a cleaning region, and a shape of the cleaning region, and controlling the cleaning robot and the at least one other cleaning robot on the basis of the determined joint cleaning method.

The determining may include determining any one of a group joint cleaning method in which the same region is cleaned together by the cleaning robot and the at least one other cleaning robot, a sectional joint cleaning method in which a cleaning region is divided and each section thereof is separately cleaned by the cleaning robot and the at least one other cleaning robot, and a multiple-pattern joint cleaning method in which the group joint cleaning method and the sectional joint cleaning method are mixed, as the joint cleaning method.

The controlling may further include using at least one of environment information and state information included in cleaning situation information received from the at least one other cleaning robot and controlling at least one of the operations of the at least one other cleaning robot and the cleaning robot.

According to yet another aspect, a method of controlling a cleaning robot includes receiving, in response to transmitting supporting specifications of the cleaning robot to at least one other cleaning robot, a cleaning method and a cleaning region from a cleaning robot that has received the transmitted supporting specifications, and controlling devices in the cleaning robot on the basis of the cleaning method and the cleaning region received from the cleaning robot.

The receiving may include transmitting, in response to the receiving of the cleaning method and the cleaning region, environment information of the cleaning region and state information of the cleaning robot.

The controlling may include controlling devices in the cleaning robot and performing cleaning on the basis of any one of a group joint cleaning method in which the same region is cleaned together by the cleaning robot and the at least one other cleaning robot, a sectional joint cleaning method in which a cleaning region is divided and each section thereof is separately cleaned by the cleaning robot and the at least one other cleaning robot, and a multiple-pattern joint cleaning method in which the group joint cleaning method and the sectional joint cleaning method are mixed.

According to yet another aspect, a method of controlling a cleaning robot includes detecting a user on the basis of at least one of at least one Internet-of-Things (IoT) device present in an indoor space and a sensor module, and, when a distance between the detected user and the cleaning robot is determined to be smaller than a predetermined level, controlling performance of cleaning on the basis of a state of the detected user.

The controlling may further include, when the distance between the detected user and the cleaning robot is determined to be smaller than the predetermined level, switching to a quiet mode on the basis of an action of the detected user or switching a cleaning section.

The controlling may further include, when the distance between the detected user and the cleaning robot is determined to be smaller than the predetermined level, controlling performance of cleaning on the basis of at least one of an action of the user detected by the at least one IoT device or a sensor unit, a position of the user, a voice of the user received through a voice recognizer, and surrounding noise.

The controlling may further include regulating a level of the quiet mode in accordance with a level of the surrounding noise received through the voice recognizer.

According to yet another aspect, a method of controlling a cleaning robot includes setting desired information related to an indoor environment, acquiring indoor environment information and generating an indoor environment map, and comparing the set desired information related to the indoor environment and the acquired indoor environment map and regulating the indoor environment on the basis of a result of the comparison.

The generating may include combining pieces of indoor environment information acquired from at least one of a sensor module mounted on the cleaning robot, a sensor module mounted on a flight vehicle, and an IoT device, and mapping the combined pieces of indoor environment information to map information to generate the indoor environment map.

The regulating may include controlling at least one of devices in the cleaning robot and IoT devices and regulating the indoor environment to correspond to the set desired information related to the indoor environment.

According to yet another aspect, a method of controlling a cleaning robot includes acquiring image information in response to a remote connection request from a user, transmitting the acquired image information, and controlling devices in the cleaning robot.

The controlling may further include, when another task is being performed, controlling the devices in the cleaning robot to stop the other task which is being performed, in accordance with the remote connection request, and activating the imaging unit.

The acquiring may include acquiring image information related to an area of interest of the user or acquiring the image information according to remote controlling of the user.

The acquiring may include, when the remote connection of the user is ended, controlling the devices in the cleaning robot to resume the stopped task.

According to yet another aspect, a method of controlling a cleaning robot includes transmitting a recorded voice, and controlling devices in the cleaning robot to output a predetermined voice or perform connection to predetermined contact information.

The identifying may include using voice recognizers arranged in an array form and identifying the point from which the recognized voice is generated.

The controlling may further include controlling the devices in the cleaning robot to move to the identified point and outputting a predetermined voice, capturing image information related to the identified point, or making a phone call through a home network.

According to yet another aspect, a method of controlling a cleaning robot includes recognizing a call signal of a user, receiving a voice command from the user and deriving a recognized result related to the received voice command, and controlling devices in the cleaning robot on the basis of the recognized result when the identified user is determined to have use authority related to the recognized result.

The controlling may include determining the use authority of the user through at least one of motion of the user and voice of the user.

The controlling may include controlling the devices in the cleaning robot and at least one Internet-of-Things (IoT) device connected through a communication network and providing a service corresponding to the recognized result.

According to yet another aspect, a method of controlling a cleaning robot includes receiving voice of a user and detecting an abnormal symptom, acquiring biometric information of the user, and determining a degree of a state of the user on the basis of the acquired biometric information of the user and controlling devices in the cleaning robot in accordance with a predetermined response plan on the basis of the determined degree of the state of the user.

The detecting may further include identifying a point from which the received voice of the user is generated through a voice recognizer.

The controlling may include, in accordance with the determined degree of the state of the user, controlling a speaker and outputting a predetermined voice to the user or controlling a communication unit and performing connection to predetermined contact information.

According to yet another aspect, a method of controlling a cleaning robot includes acquiring biometric information of a user in accordance with a predetermined cycle, and, when a degree of a state of the user is determined on the basis of the acquired biometric information of the user and, as a result, is determined to be abnormal, controlling devices in the cleaning robot in accordance with a predetermined response plan on the basis of the determined degree of the state of the user and whether a user reacts.

According to yet another aspect, a method of controlling a cleaning robot includes following an object selected by a user and acquiring image information related to the object, and performing a process corresponding to a situation that occurs in accordance with movement of the detected object from the acquired image information.

The acquiring may include receiving selection on an object to be followed through an input unit or receiving selection on an object to be followed by being in association with an external device through a communication unit, and following the selected object and acquiring image information related to the object.

The performing may include detecting pollution that occurs in surroundings as the detected object moves and, when it is detected that pollution has occurred, controlling devices in the cleaning robot to perform cleaning.

The performing may include controlling the communication unit and contacting predetermined contact information or sending a message when an occurrence of danger is expected on the basis of at least one of movement of the object and map information.

Such a cleaning robot and a method of controlling the same can provide various convenience services as well as a cleaning service, which corresponds to the original function of a cleaning robot, to a user.

BRIEF DESCRIPTION OF THE DRAWINGS

FIGS. 2A and 2B are views illustrating an interior/exterior of a cleaning robot according to one embodiment.

FIGS. 12A and 12B are views illustrating a plurality of cleaning robots according to different embodiments.

FIG. 24 is a view illustrating a flight vehicle to which a sensor module is attached according to one embodiment.

FIGS. 49 and 50 are views for describing a response plan through a home network when a user is in an emergency situation according to different embodiments.

DETAILED DESCRIPTION

Hereinafter, embodiments of the present disclosure will be described in detail with reference to the accompanying drawings.

Figure 1:
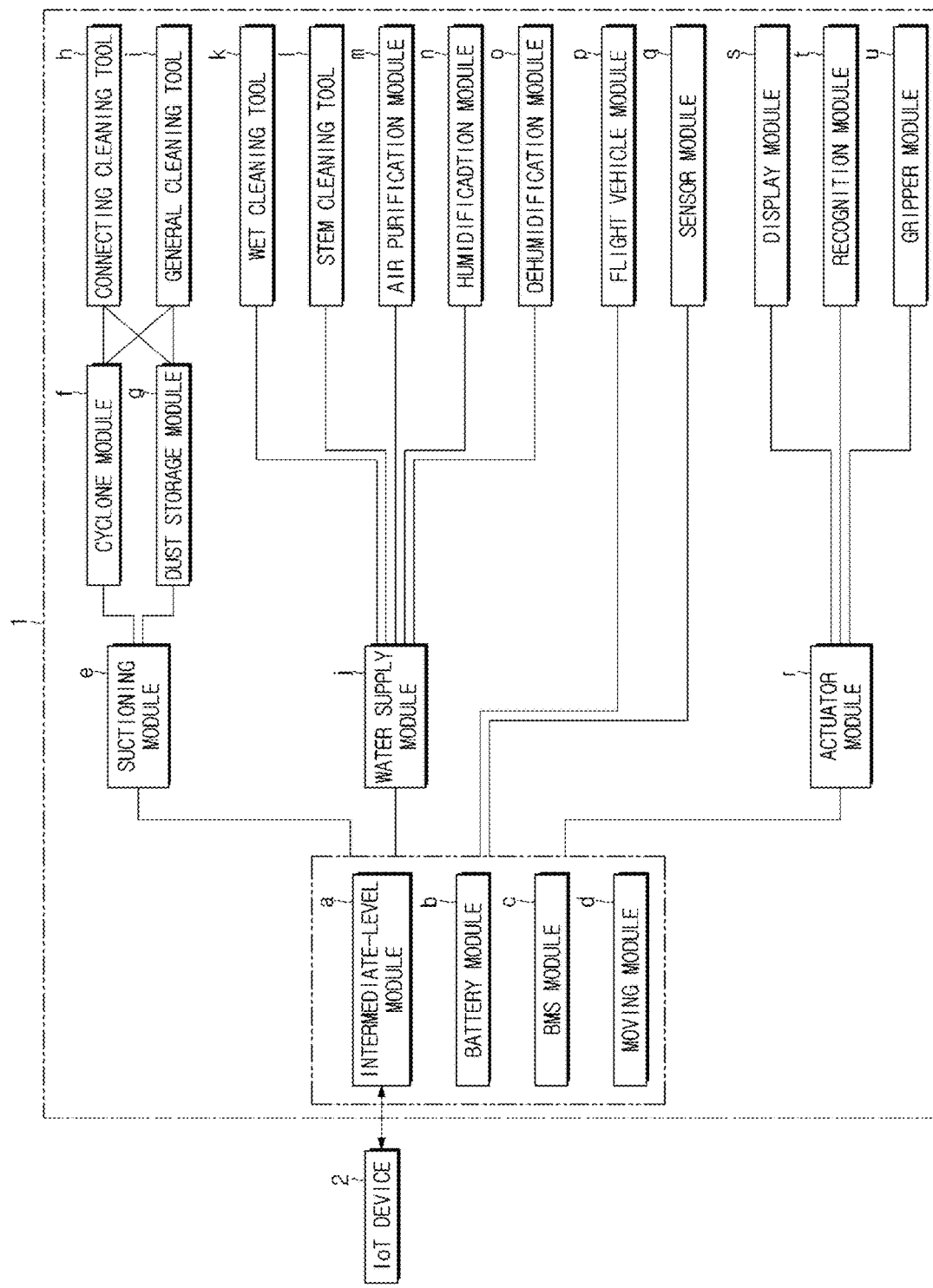
FIG. 1 is a view illustrating a modular system structure of a cleaning robot according to one embodiment.

FIG. 1 is a view illustrating an Internet-of-Things (IoT) device and a modular system mounted on a cleaning robot.

A cleaning robot 1 refers to an apparatus that automatically cleans an area to be cleaned by suctioning foreign substances such as dust accumulated on a floor while navigating the area to be cleaned without a user's manipulation. That is, the cleaning robot 1 cleans the area to be cleaned while navigating the area to be cleaned.

The cleaning robot 1 according to an embodiment may provide various services as well as a cleaning service. For example, in addition to the cleaning service, the cleaning robot 1 may provide a service capable of regulating indoor environment and provide various services to a user present in the indoor environment. In other words, the cleaning robot 1 may be a human-service robot capable of influencing the user and the indoor environment, in which the user is present, in various ways. For this, the cleaning robot 1 may be expanded to provide various services in addition to the cleaning service.

For example, a modular system may be applied to the cleaning robot 1, and various modules may be integrally built therein. Here, a "modular" refers to a device or system in which one or more modules that support different functions are integrated or refers to a device or system that supports connection between one or more modules supporting different functions. That is, the modular system is applied to the cleaning robot 1, and various modules are built therein such that a conventional limited function may be overcome.

Referring to FIG. 1, an intermediate-level module a, a battery module b, a battery management system (BMS) module c, and a moving module d may be fundamentally built in the cleaning robot 1. Here, the intermediate-level module a refers to a module that plans and manages overall operation of the cleaning robot 1. The intermediate-level module a serves as a medium of interactions between hardware that directly performs an operation of the cleaning robot 1 and a user.

For example, as will be described below, the intermediate-level module a may set or reserve operation of the cleaning robot 1 on the basis of an input unit mounted on the cleaning robot 1 or various control commands received from the IoT device 2. In one embodiment, the user may input various tasks that should be performed by the cleaning robot 1 via various applications and the like installed in the IoT device 2. Then, the intermediate-level module a may manage the operation of the cleaning robot 1 on the basis of the received tasks. That is, the intermediate-level module a serves to support connection between the user and the hardware of the cleaning robot.

The battery module b refers to a module that enables the cleaning robot to drive. Here, the battery module b mounted on the cleaning robot 1 may be implemented with various types of batteries that are known to one of ordinary skill in the art, and the types of batteries are not limited. The battery module b is built in the cleaning robot 1 and serves to supply power to an element in need of power. The battery module b is also referred to as "battery" and, hereinafter, will be referred to as "battery" for convenience.

The BMS module c refers to a module that generally manages the battery of the cleaning robot 1. For example, the BMS module c performs the overall operation of managing the battery power consumption or the like as well as an operation of performing charge/discharge of the battery. As will be described below, when residual power of the battery is at a predetermined level or lower, the BMS module c may request for returning to a charging station, or the like.

The moving module d refers to a module that manages the overall movement of the cleaning robot 1. For example, the moving module d may control a motor of the cleaning robot 1 and control operation of a caster wheel or the like. In one embodiment, the moving module d may control a movement path or the like of the cleaning robot 1 on the basis of a detection result detected by an obstacle sensor, which will be described below.

The cleaning robot 1 may also include a suctioning module e. Here, the suctioning module e may control operation of suctioning dust. The suctioning module e may be used to suction dust or the like during dry cleaning. For example, the suctioning module e may control a suctioning motor, an impeller, and the like and control the operation of suctioning dust.

The cleaning robot 1 may also include a cyclone module f. The cyclone module f performs operation of suctioning only the dust from air and dust suctioned into the cleaning robot 1 by a centrifugal force, and transferring the suctioned dust to a dust bin.

A dust storage module g isolates dust suctioned as cleaning is performed according to a dry cleaning mode to an airtight space. For example, the dust storage module g refers to a module that controls operation of storing dust suctioned from a cleaning head during the dry cleaning to the dust bin.

A connecting cleaning tool h refers to various forms of cleaning heads used for cleaning or the like that may be attached and detached. A general cleaning tool i refers to a cleaning head or the like generally already mounted on the cleaning robot. The suctioning module e, the cyclone module f, the dust bin module g, the connecting cleaning tool h, and the general cleaning tool i, which are described above, may be used when the dry cleaning mode is performed.

That is, the elements illustrated in FIG. 1 are not included in every cleaning robot, and modules suitable and required for a circumstance may be selectively attached to a cleaning robot, and expansion of only necessary services may be promoted. There is no limitation. For example, in a case of a cleaning robot that provides only a dry cleaning service, in addition to the intermediate-level module a, the battery module b, the BMS module c, and the moving module d fundamentally built in the cleaning robot, the suctioning module e, the cyclone module f, and the dust storage module g may be mounted. At least one of the connecting cleaning tool h and the general cleaning tool I may also be mounted on the cleaning robot, and dry cleaning may be performed.

A water supply module j refers to a module that controls supply of water to a cleaning head when wet cleaning or steam cleaning is performed. A wet cleaning tool k refers to various cleaning heads used when the wet cleaning is performed. A steam cleaning tool l refers to various cleaning heads used when the steam cleaning is performed.

In a case of a cleaning robot that provides wet cleaning and steam cleaning services, in addition to the intermediate-level module a, the battery module b, the BMS module c, and the moving module d fundamentally built in the cleaning robot, the water supply module j, the wet cleaning module k, and the steam cleaning tool l may be built therein.

As will be described below, an air purification module m refers to a module that regulates cleanliness of indoor air. A humidification module n refers to a module that increases moisture in the air. A dehumidification module o refers to a module that cools air to lower the humidity level. By regulating the air cleanliness, moisture, and the like in the indoor environment, the air purification module m, the humidification module n, and the dehumidification module o may provide pleasant indoor environment to the user.

A flight vehicle module p refers to a module that controls the overall operation of a flight vehicle. As will be described below, a flight vehicle such as a drone may be mounted on the cleaning robot 1 and acquire three-dimensional indoor environment information.

A sensor module q refers to a module that collects the indoor environment information. For example, the sensor module q may be implemented with various sensors capable of acquiring environment information and a processor capable of controlling the overall operation of the above-mentioned sensors. As will be described below, the cleaning robot 1 may control operation of the IoT device 2 as well as operation of the cleaning robot 1 itself on the basis of the environment information acquired by the sensor module q, thereby regulating the indoor environment.

An actuator module r refers to a module that mechanically converts power to operate various types of mechanisms. As will be described below, the actuator module r may be mounted on a joint of a robot arm or inside a support stand that supports an imaging unit, and operate the robot arm or the support stand. The actuator module is also referred to as "actuator" and, hereinafter, will be referred to as "actuator" for convenience.

A display module s refers to a device that displays various pieces of information to the user. For example, the display module s may be any known device capable of visually displaying various pieces of information, such as a display panel and a beam projector, and the device is not limited. The display module s is also referred as "display" and, hereinafter, will be referred to as "display" for convenience.

A recognition module t refers to a module capable of detecting a user's actions. Here, the user's action includes various motions or the like such as gestures, as well as the user's voice. For example, the recognition module t may be implemented by a voice recognition module that detects the user's voice, a camera module that detects the user's motion, and the like. The recognition module t may be implemented by various other devices capable of detecting the user's action, and is not limited to the above examples.

A gripper module u refers to a module for physically gripping various types of objects. For example, as will be described below, the robot arm may be provided in the cleaning robot 1. In one embodiment, the gripper module u may allow a cleaning head to be mounted on the robot arm by an electrical signal.

The above-described modules may be integrated in a modular as needed. The modular may be implemented by a micro control unit (MCU), a processor, or the like and be integrated with a controller configured to control the overall operation of the cleaning robot 1 or be separately built in the cleaning robot 1. The above-described modules may be integrated with another element, which will be described below, or may replace the other element. Therefore, even when the name of an element, which will be described below, does not match that of any of the above-described modules, the element may include one of the above-described modules or correspond thereto as long as the element supports the same function as one of the above-described modules.

At least one of the above-described modules may be integrated in a System On Chip (SOC). However, because a plurality of SOCs may be built in the cleaning robot 1 instead of in only one SOC, embodiments are not limited to at least one of the above-described modules being integrated in only one SOC.

FIG. 2 is a view illustrating an exterior of a cleaning robot according to another embodiment.

Figure 2B:
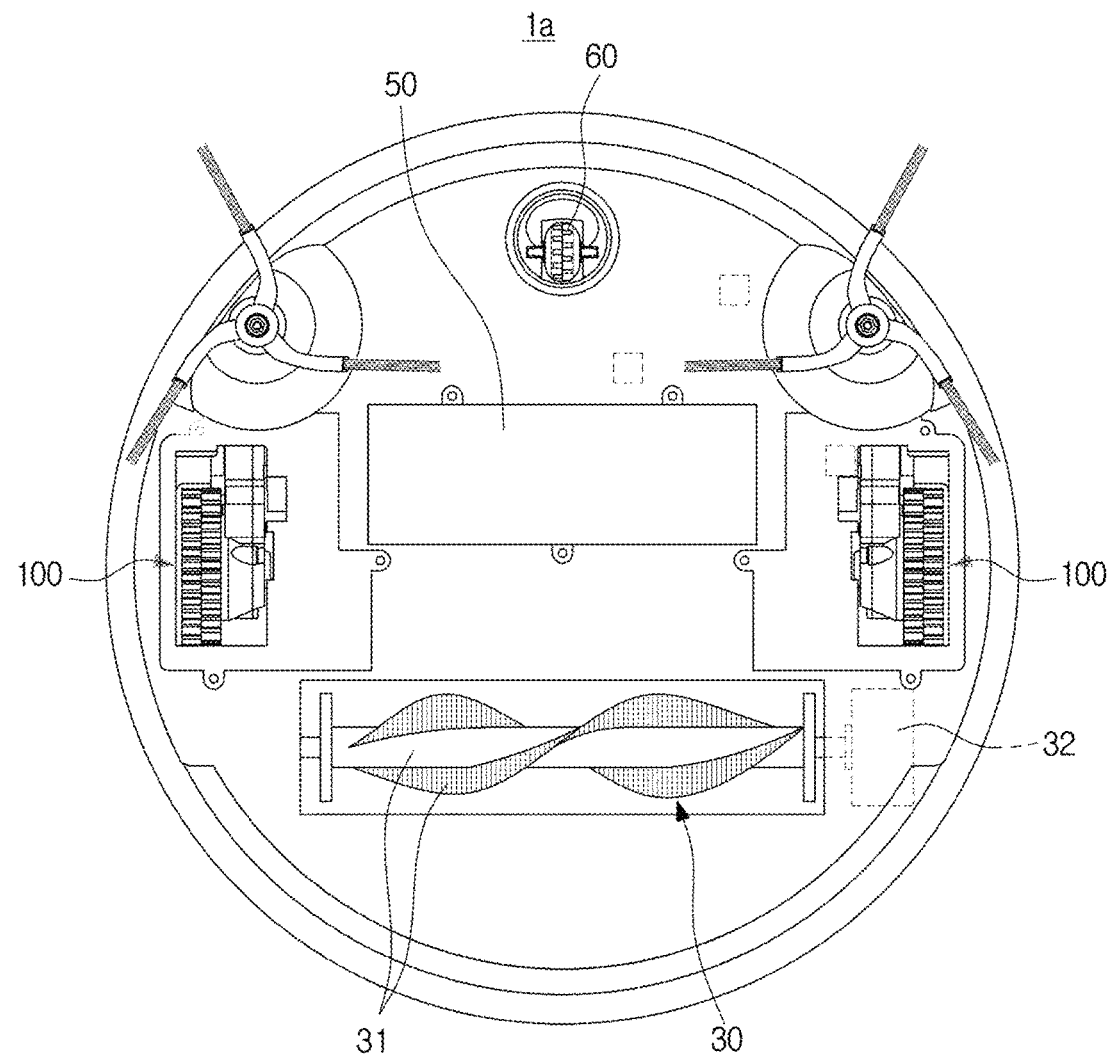

In FIGS. 2A and 2B, a cleaning robot 1a according to an embodiment of the present disclosure includes a main body 10 forming an exterior, a cover 20 configured to cover an upper portion of the main body 10, a cleaning head mounting portion 30 on which a cleaning head configured to sweep or scatter dust present in an area to be cleaned is mounted, a battery 50 configured to supply driving power for driving the main body 10, and a driving motor 100 configured to drive the main body 10.

The main body 10 forms the exterior of the cleaning robot 1a and supports various types of components installed therein. The cleaning head mounting portion 31 is installed in an inlet 30, which is formed at a lower portion of the main body 10 to improve efficiency of suctioning dust, and sweeps or scatters dust on the floor.

The cleaning head mounting portion 30 includes a drum-shaped brush unit 31, which has a length corresponding to that of the inlet 30, installed in the inlet 30 and configured to rotate like a roller on the floor surface to sweep or scatter dust on the floor surface, and a brush motor 32 for rotating the brush unit 31.

The unit mounted on the cleaning head mounting portion 30 is not limited to the brush unit 31. For example, various cleaning heads may be mounted on the cleaning head mounting portion 30 according to cleaning modes.

A caster wheel 60 whose rotating angle changes according to a state of the floor surface on which the cleaning robot 1a moves is installed at a front portion of the main body 10. The caster wheel 60 is utilized for stabilizing the posture of the cleaning robot 1a, preventing falling thereof, and the like, supports the cleaning robot 1a, and is formed of a roller or caster-shaped wheel.

The cleaning head may be mounted on various other positions of the cleaning robot. Hereinafter, a cleaning robot in which a cleaning head is mounted on a robot arm will be described.

Figure 3:
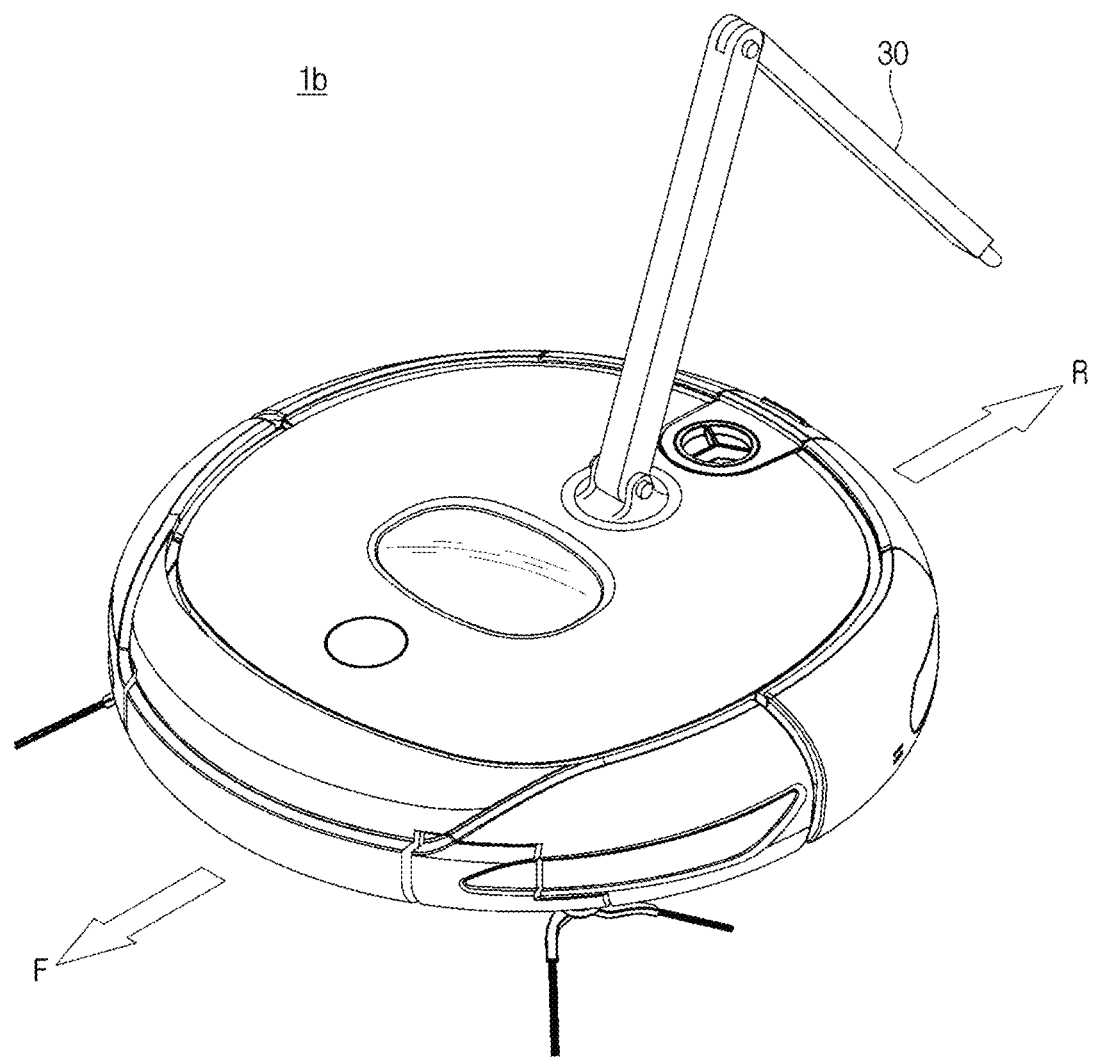
FIG. 3 is a view illustrating an exterior of a cleaning robot to which a robot arm is attached according to one embodiment.
Figure 4:
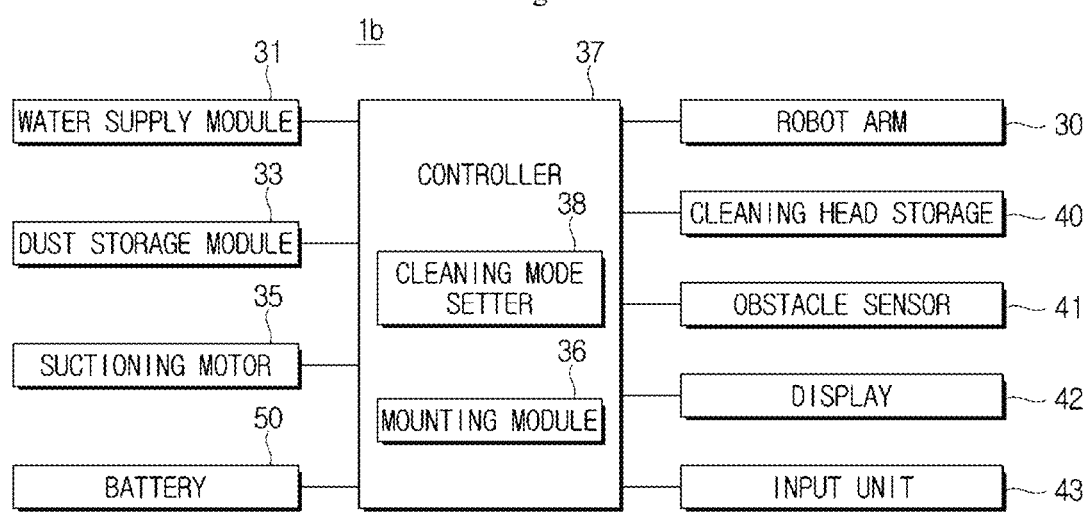
FIGS. 4 and 5 are views illustrating control block diagrams of a cleaning robot that performs cleaning with a cleaning head mounted on a robot arm according to different embodiments.
Figure 5:
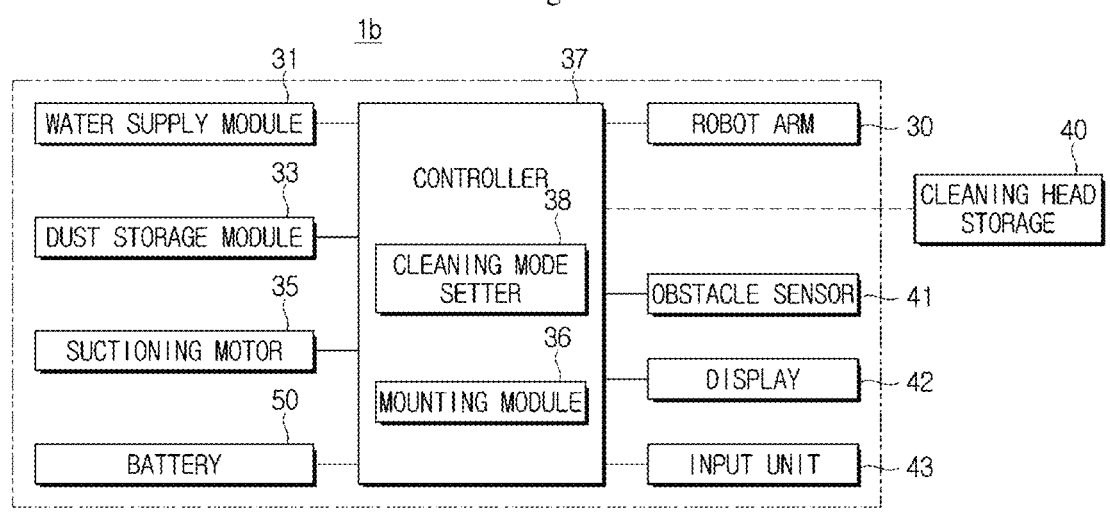
Figure 6:
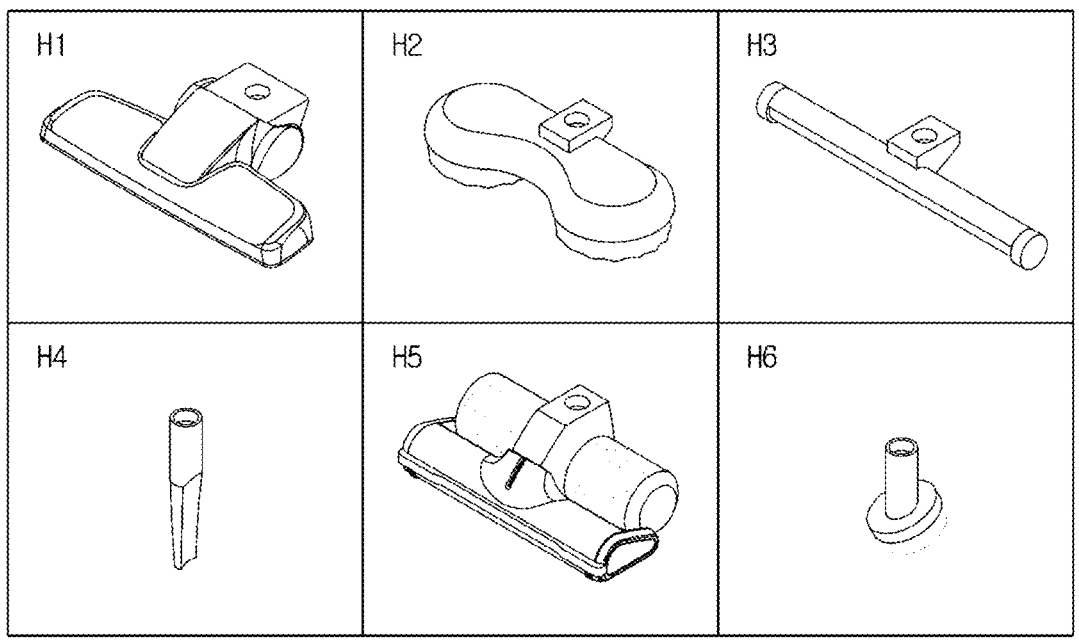
FIG. 6 is a view illustrating various forms of cleaning heads mounted on a robot arm according to one embodiment.
Figure 7:
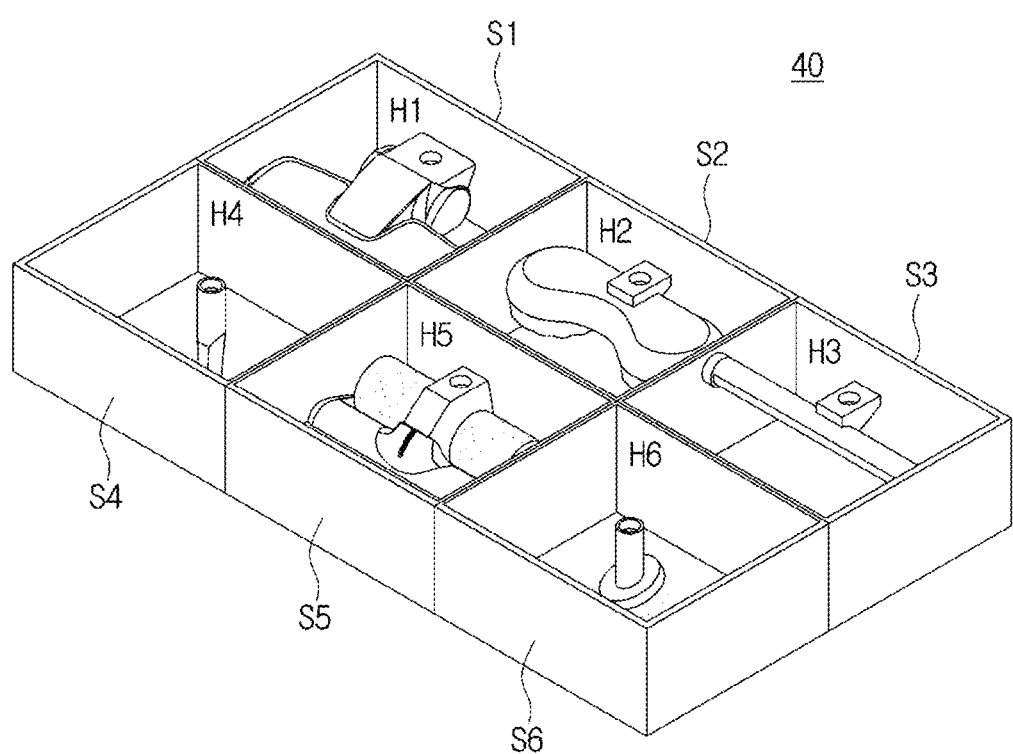
FIG. 7 is a view illustrating a cleaning head storage in which cleaning heads are stored in separate compartments according to one embodiment.

FIG. 3 is a view illustrating an exterior of a cleaning robot to which a robot arm is attached according to an embodiment, and FIGS. 4 and 5 are views illustrating control block diagrams of the cleaning robot that performs cleaning with a cleaning head mounted on a robot arm according to different embodiments. FIG. 6 is a view illustrating various forms of cleaning heads mounted on the robot arm according to an embodiment, and FIG. 7 is a view illustrating a cleaning head storage in which the cleaning heads are stored in separate compartments according to an embodiment. The above drawings will be described along with each other to avoid overlapping description.

Referring to FIG. 3, a robot arm 30 may be provided in a cleaning robot 1b. The cleaning robot 1b may perform cleaning with a cleaning head mounted on the robot arm 30. As illustrated in FIG. 3, the robot arm 3 has joints to be movable upward/downward, leftward/rightward. The robot arm 30 may be implemented with various materials which are known, and the materials are not limited. A coupling terminal may be provided at an outer surface of the robot arm 30. The cleaning robot 1b may have a cleaning head mounted through the coupling terminal and perform cleaning by the mounted cleaning head.

Here, by a required cleaning head being selected according to a cleaning mode and the cleaning robot 1b having the selected cleaning head mounted therein, the cleaning robot 1b may more conveniently perform cleaning. Hereinafter, the configuration of the cleaning robot 1b at which the robot arm 3 is mounted will be described in more detail.

As illustrated in FIG. 4, the cleaning robot 1b includes the robot arm 30, a water supply module 31, a dust storage module 33, a suctioning motor 35, a mounting module 36, a controller 37, the battery 50, a cleaning head storage 40, an obstacle sensor 41, a display 42, and an input unit 43.

Here, the water supply module 31, the dust storage module 33, the obstacle sensor 41, the mounting module 36, and the controller 37 may be integrated in an SOC built in the cleaning robot 1 and may be operated by a processor. However, because a plurality of SOCs may be built in the cleaning robot 1b instead of in only one SOC, embodiments are not limited to the above modules being integrated in only one SOC.

The water supply module 31 refers to a module that controls supply of water to a cleaning head during wet cleaning. The water supply module 31 controls supply of water to the cleaning head through a water supply pipe built in the robot arm 30.

The dust storage module 33 refers to a module that controls an operation of storing dust suctioned from a cleaning head in a dust bin during dry cleaning. The dust storage module 33 transfers the dust suctioned from the cleaning head to the dust bin through a suctioning flow path provided inside the robot arm 30. Here, the dust storage module 33 suctions dust into the cleaning head using the suctioning motor 35.

The battery 50 supplies power to the cleaning robot 1b. The battery 50 may be implemented in various forms such as a removable form or a built-in form, and the forms are not limited.

The obstacle sensor 41 refers to a sensor that detects an obstacle. In one embodiment, the obstacle sensor 41 may radiate an ultrasonic signal, receive the ultrasonic signal reflected from an obstacle, and detect the obstacle. The obstacle sensor 41 may detect an obstacle using various other known methods, and the method is not limited to the above embodiment.

The display 42 may be provided in the cleaning robot 1b. For example, although the display 42 may be placed at a central region of an upper surface of the cleaning robot 1b as illustrated in FIG. 3, the display 42 may be provided at various other positions.

According to an embodiment, the display 42 may be implemented with a liquid crystal display (LCD), a light emitting diode (LED), a plasma display panel (PDP), an organic light emitting diode (OLED), a cathode ray tube (CRT), or the like, but is not limited thereto. As described with reference to FIG. 1 above, the display 42 may be implemented by a device, other than the above-mentioned elements, capable of visually displaying various pieces of information, and is not limited to the above.

The input unit 43 receives various types of control commands related to the operation of the cleaning robot 1b. The input unit 43 may be provided at the upper surface of the cleaning robot 1b. When the display 42 is implemented as a touchscreen type, the display 42 may serve as the input unit 43.

As described above, the robot arm 30 may be provided at the cleaning robot 1b. The robot arm 30 may be mounted on one surface of the cleaning robot 1b. Although the robot arm 30 may be mounted on a side surface of the cleaning robot 1b as illustrated in FIG. 3, the position at which the robot arm 30 is mounted is not limited to that illustrated in FIG. 3, and the robot arm 30 may be mounted on any part of the cleaning robot 1b.

As described above, a motor may be provided inside the robot arm 30. Each joint of the robot arm 30 moves by the motor. Here, the robot arm 30 includes two joints as illustrated in FIG. 3 and may be freely manipulated upward/downward, leftward/rightward by the motor driving each of the joints. As will be described below, the controller 37 may control driving of the motor and control movement of the robot arm 30.

Figure 9:
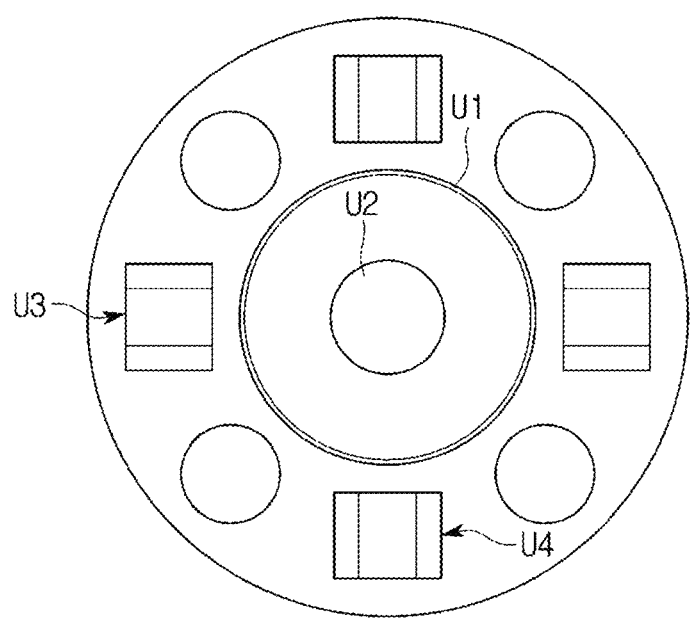
FIG. 9 is a view illustrating a cross-sectional view of a robot arm according to one embodiment.

One or more paths may be provided inside the robot arm 30, and the robot arm 30 may be connected to the cleaning head. For example, as illustrated in FIG. 9, a suctioning flow path u1 and a water supply pipe u2 may be provided inside the robot arm 30. The water supply pipe u2 may be provided from a water tray, which is filled with water, to an end of the robot arm 30 on which the cleaning head is mounted. The suctioning flow path u1 may be provided from the dust bin to the end of the robot arm 30 on which the cleaning head is mounted.

A docking unit u4 may be provided at the end of the robot arm 30 on which the cleaning head is mounted. As illustrated in FIG. 9, the docking unit u4 is docked to a groove provided in the cleaning head. Here, an electrode u3 may be provided at an end of the docking unit u4. Accordingly, power supply and various types of control signals may be transmitted to the cleaning head through the docking unit u4.

Here, although the cleaning head and the robot arm 30 are coupled through the docking unit u4, the cleaning head may be separated as cleaning is performed or as the cleaning robot 1b moves. Accordingly, a coupling terminal u5 may be provided at a surface of the robot arm 30 on which the cleaning head is mounted. The coupling terminal u5 serves to fix between the cleaning head and the robot arm 30 to prevent the cleaning head from being separated.

Although the coupling terminal u5 may be implemented by an electromagnet in one embodiment, the coupling terminal u5 is not limited to the embodiment, and may be implemented using various materials capable of fixing the cleaning head and the robot arm 30 to each other. In addition, a rubber packing is provided at an end of the coupling terminal u5 to prevent dust or water from being discharged to the outside.

Figure 8:
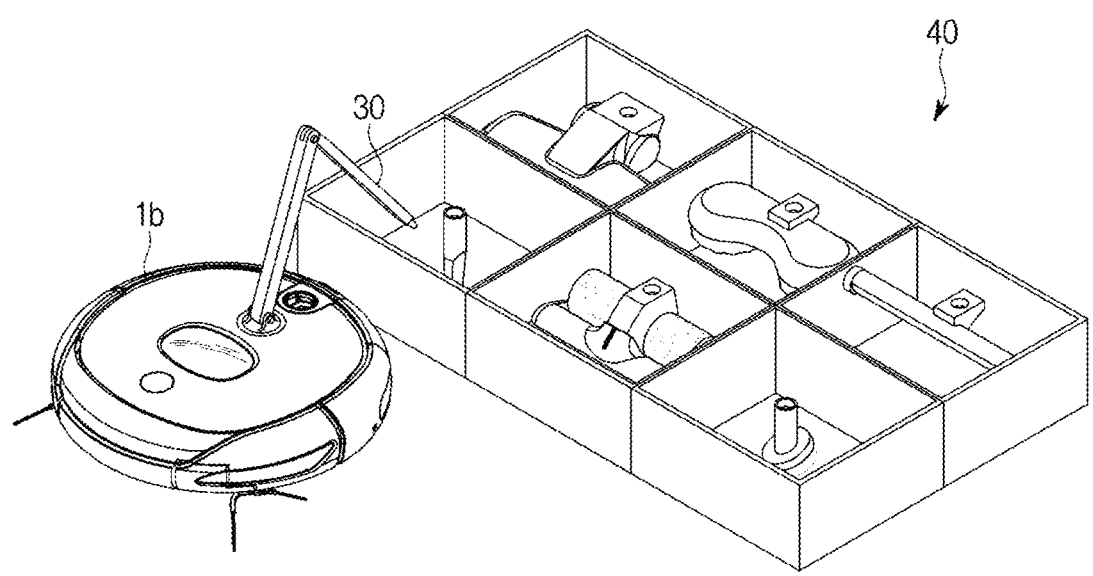
FIG. 8 is a view for describing mounting of a cleaning head on a robot arm according to one embodiment.

The cleaning head storage 40 may be provided in the cleaning robot 1b. The cleaning head storage 40 may be mounted on the cleaning robot 1b or may be provided outside the cleaning robot 1b as illustrated in FIG. 8. This will be described in detail below.

Various cleaning heads may be stored in the cleaning head storage 40. Referring to FIG. 6, a dry cleaning head h1 used during dry cleaning, a damp cloth cleaning head h2 used during wet cleaning, a sterilizing cleaning head h3 used during sterilizing cleaning, a corner cleaning head h4 used during corner cleaning, a bedding cleaning head h5 used during bedding cleaning, and a window frame cleaning head h6 used during window frame cleaning may be stored in the cleaning head storage 40.

The cleaning head storage 40 is divided into a plurality of compartments. Here, a cleaning head to be stored in each of the compartments of the cleaning head storage 40 may be determined in advance. For example, referring to FIG. 6, the dry cleaning head h1, the damp cloth cleaning head h2, the sterilizing cleaning head h3, the corner cleaning head h4, the bedding cleaning head h6, and the window frame cleaning head h6 may be stored in a first compartment s1, a second compartment s2, a third compartment s3, a fourth compartment s4, a fifth compartment s5, and a sixth compartment s6, respectively. A designated cleaning head may be stored in each of the compartments in the cleaning head storage 40 according to predetermined turns.

That is, a cleaning head stored in each of the compartments is pre-designated, and information thereon is stored in a memory of the cleaning robot 1b. Accordingly, the controller 37 may recognize a compartment in which each of the cleaning heads is present on the basis of the information stored in the memory and control a cleaning head required during cleaning to be attached to the robot arm.

Because the cleaning heads have different forms and sizes, the compartments may be designed in different shapes or sizes. Each of the cleaning heads may be stored such that a surface thereof coupled to the robot arm 30 faces an upper surface of the compartment. Accordingly, the controller 37 may easily manipulate the cleaning heads to be mounted on the robot arm 30 without the need for separately manipulating the cleaning heads.

The controller 37 may control the overall operation of the cleaning robot 1b. Specifically, the controller 37 may control operations of all elements in the cleaning robot 1b such as the robot arm 30 and the display 42 in addition to the various types of modules built in the cleaning robot 1b.

The controller 37 may be implemented by a processing device or the like configured to perform various types of computations and control processes, such as a processor built in the cleaning robot 1b, and may also be implemented by various other known processing devices.

The controller 37 may generate control signals for controlling the elements of the cleaning robot 1b and control operations of the above-described elements. For example, as described above, the controller 37 may transmit power supply and control signals to the cleaning robot 1b through an electrode which is provided at the end of the docking unit u4 and control the operation of the cleaning head.

The controller 37 includes a cleaning mode setter 38 and the mounting module 36. The cleaning mode setter 38 may set a cleaning mode. Here, the cleaning mode refers to a mode related to a method by which the cleaning robot performs cleaning. In one embodiment, the cleaning mode includes a dry cleaning mode, a wet cleaning mode, and a sterilizing cleaning mode. The cleaning mode also includes a hard floor cleaning mode for cleaning a normal floor and a soft floor cleaning mode for cleaning a floor surface such as a carpet, according to the type of the floor surface.

In addition, the cleaning mode includes a normal cleaning mode for cleaning open regions and a corner cleaning mode for cleaning corners, according to a cleaning region. Not only is the cleaning head used to perform cleaning different according to each of the cleaning modes, but whether water is supplied, number of times of cleaning, intensity of cleaning, and the like are also differently set, and whether the suctioning motor 35 is operated and number of rotations during the operation of the suctioning motor 35 also vary.

In one embodiment, the cleaning mode setter 38 may set a cleaning mode of the cleaning robot on the basis of information on the cleaning mode received from a user through the display 42, the input unit 43, a remote controller, a user terminal, or the like.

That is, the cleaning mode setter 38 may control the cleaning mode corresponding to the received information on the cleaning mode and various types of settings of a device in the cleaning robot 1b for the cleaning robot 1b to be driven in that cleaning mode. In one embodiment, setting information for each of the cleaning modes is stored in the memory. Accordingly, the cleaning mode setter may set operations of the elements in the cleaning robot 1b according to a cleaning mode received from the user on the basis of the setting information for each of the cleaning modes stored in the memory.

The controller 37 may control mounting of the cleaning head corresponding to the cleaning mode among the plurality of cleaning heads stored in the cleaning head storage. For example, when an open region is cleaned by dry cleaning, the controller 37 may control the dry cleaning head h1 in the cleaning storage 40 to be mounted on the robot arm 30 by using the mounting module 36.

The mounting module 36 may correspond to the gripper module u in FIG. 1. That is, the mounting module 36 may perform an operation of physically mounting the cleaning head at the robot arm 30.

For example, a method of mounting between the robot arm 30 and the cleaning head according to each of the cleaning modes is set, implemented in the form of a program, and stored in the mounting module 36. Accordingly, the controller 37 may use the mounting module 36 and control a cleaning head required according to each of the cleaning modes to be mounted on the robot arm 30.

The controller 37 may perform cleaning using the cleaning head mounted on the robot arm 30. For example, the controller 37 may have the above-described cyclone module f integrated therewith and perform dry cleaning. Alternatively, the controller 37 may control the operation of the water supply module 31 and perform wet cleaning using the cleaning head mounted on the robot arm 30. The method by which the controller 37 performs cleaning is not limited.

Hereinafter, an operational flow of a robot according to an embodiment will be described.

Figure 10:
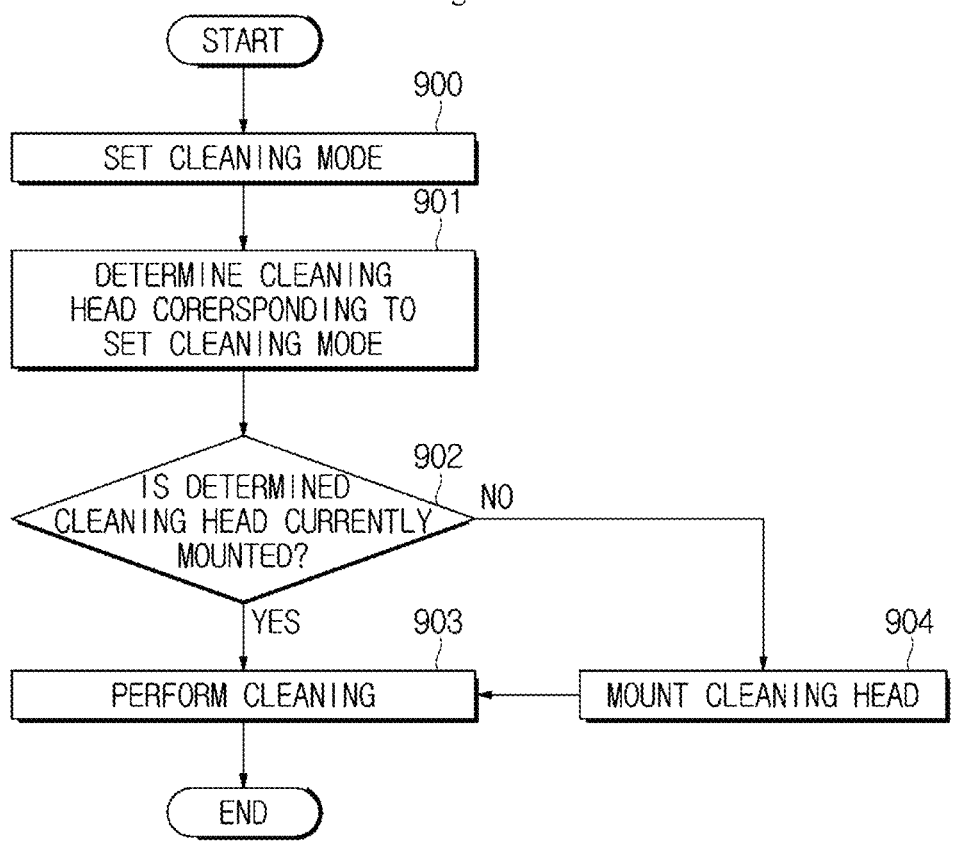
FIG. 10 is a view illustrating an operational flowchart of a cleaning robot at which a cleaning head corresponding to a cleaning mode is mounted according to one embodiment.

FIG. 10 is a view illustrating an operational flowchart of the cleaning robot at which a cleaning head corresponding to a cleaning mode is mounted according to an embodiment.

The cleaning robot may set a cleaning mode (900). For example, the cleaning robot may receive setting information related to the cleaning mode from the user through a display, an input device provided in the cleaning robot, a remote controller, or a user terminal. Accordingly, the cleaning robot may set the cleaning mode on the basis of the received setting information.

The cleaning robot may determine a cleaning method, a cleaning head, and the like corresponding to the set cleaning mode (901). Accordingly, the cleaning robot may determine whether the cleaning head suitable for the cleaning mode is currently mounted on the robot arm (902).

When it is determined that the cleaning head suitable for the cleaning mode is currently mounted on the robot arm, the cleaning robot may perform cleaning using the mounted cleaning head (903). However, when the cleaning head suitable for the cleaning mode is not mounted on the robot arm, the cleaning robot may identify the cleaning head suitable for the cleaning mode among the cleaning heads stored in the cleaning head storage and mount the identified cleaning head at the robot arm (904).

The cleaning head storage refers to a case in which cleaning heads to be mounted on the cleaning robot are stored. For example, the cleaning head storage may be divided into a plurality of compartments. A cleaning head is stored in each of the compartments. Here, a compartment in which each of the cleaning heads is stored may be predetermined. That is, information on the cleaning head stored in each of the compartments is stored in the memory of the cleaning robot. Accordingly, the cleaning robot may identify the cleaning head corresponding to the set cleaning mode from the above-described cleaning head storage.

The cleaning head storage may be mounted on the cleaning robot. For example, the cleaning head storage may be designed to be mounted on an upper surface of the cleaning robot. Accordingly, as described above, the cleaning robot may recognize positions of the cleaning heads stored in the cleaning head storage through the information stored in the memory, and perform cleaning while replacing the cleaning heads according to the cleaning modes. Therefore, the cleaning robot according to the disclosed embodiment may continuously perform various cleaning methods.

Figure 11:
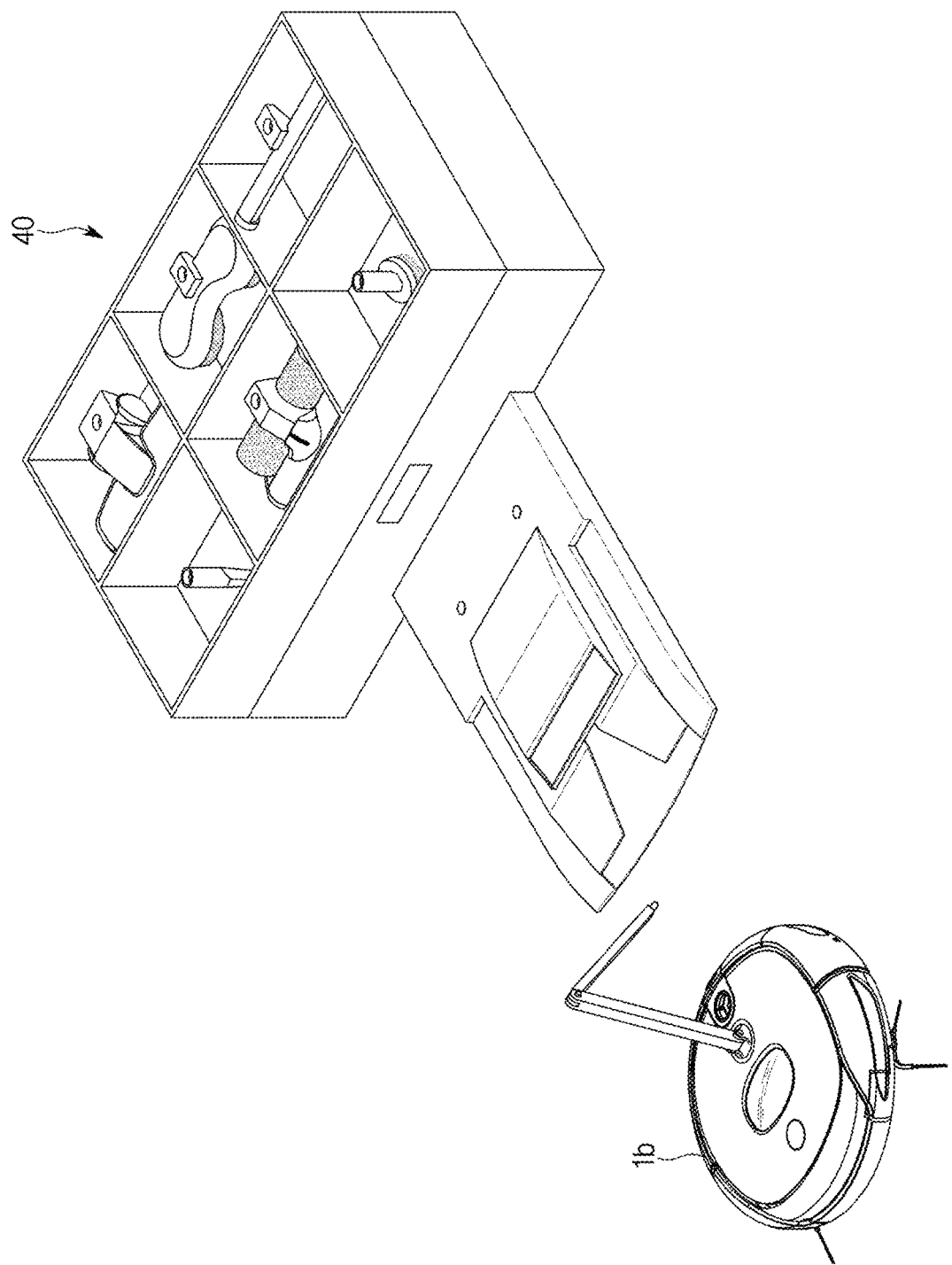
FIG. 11 is a view for describing a case in which a cleaning storage is provided at a charging station according to one embodiment.

Alternatively, the cleaning head storage may also be mounted on another device. For example, the cleaning head storage may be designed to be mounted on a charging station. Although the cleaning head storage 40 may be mounted on a main body of a charging station 51 as illustrated in FIG. 11, the position at which the cleaning head storage 40 is mounted is not limited thereto. Position information of the cleaning head storage mounted on the station is stored in the memory of the cleaning robot. Accordingly, the cleaning robot may move to the charging station and mount a required cleaning head thereon from the cleaning head storage mounted on the charging station.

Alternatively, the cleaning head storage may be provided at a predetermined position. For example, the user may put the cleaning head storage at a desired position. Also, the user may input position setting of the cleaning head storage through the input unit of the cleaning robot. Then, the cleaning robot may identify the position of the cleaning head storage through a 3D sensor and move to the cleaning head storage on the basis of the identified position thereof. In still another example, an infrared ray (IR) sensor may be provided in the cleaning head storage. Accordingly, the cleaning robot may recognize the position of the cleaning head storage on the basis of a guide signal radiated by the IR sensor.

By easily replacing a cleaning head required according to various cleaning modes by using the robot arm, the cleaning robot according to the disclosed embodiment may more efficiently perform cleaning.

For the cleaning robot to perform cleaning, various settings, in addition to the cleaning mode, such as a cleaning region in which cleaning is to be performed and a method of cleaning the cleaning region, need to be set. Therefore, hereinafter, a cleaning robot that performs cleaning with another cleaning robot adjacent thereto according to a joint cleaning method on the basis of the above-described settings and the like will be described.

Figure 13A:
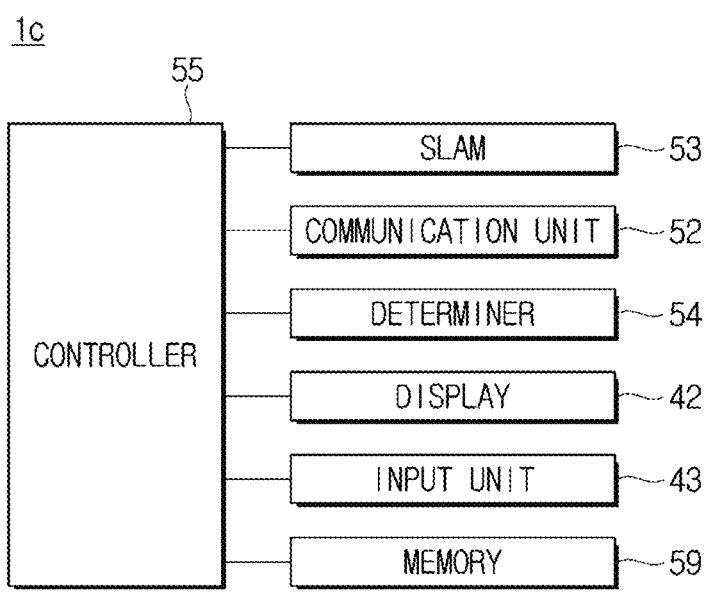
FIG. 13A is a view illustrating a control block diagram of a cleaning robot that performs joint cleaning according to one embodiment.
Figure 13B:
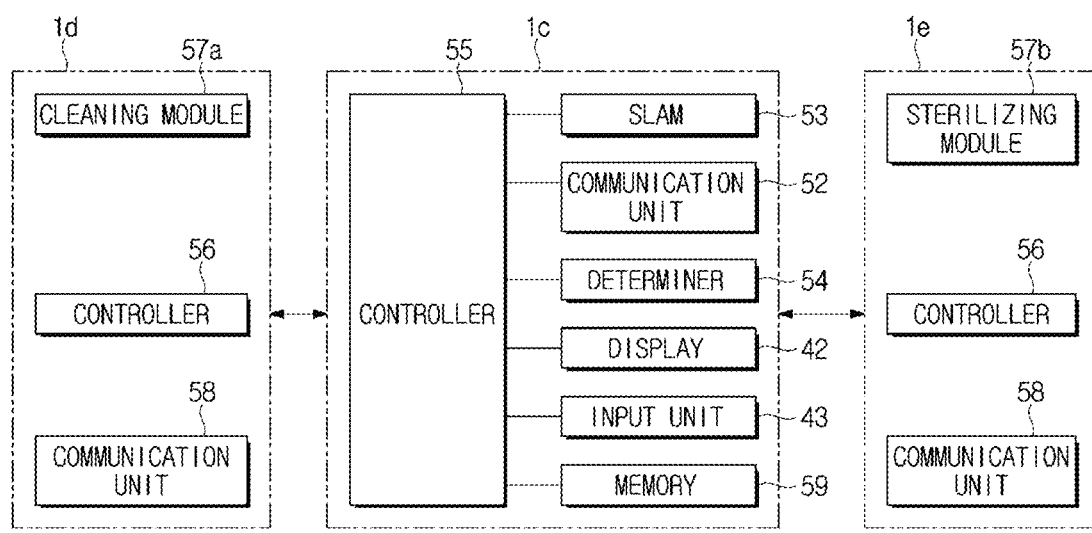
FIG. 13B is a view illustrating a control block diagram of a plurality of cleaning robots that perform joint cleaning according to one embodiment.
Figure 14:
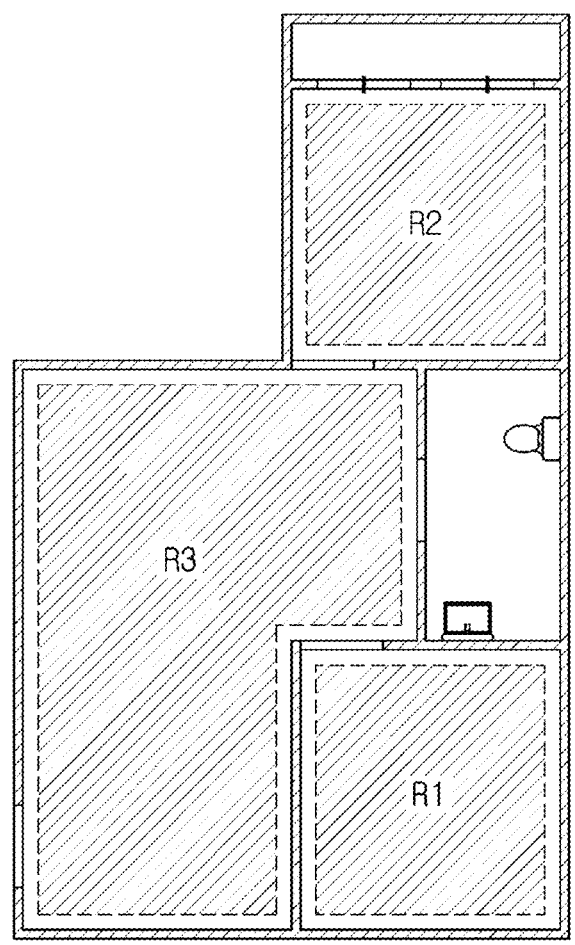
FIG. 14 is a view illustrating a structural view of a joint cleaning region according to one embodiment.

FIGS. 12A and 12B are views illustrating a plurality of cleaning robots according to different embodiments, FIG. 13A is a view illustrating a control block diagram of a cleaning robot that performs joint cleaning according to an embodiment, FIG. 13B is a view illustrating a control block diagram of a plurality of cleaning robots that perform joint cleaning according to an embodiment, and FIG. 14 is a view illustrating a structural view of cleaning regions according to an embodiment. Hereinafter, the above drawings will be described along with each other to avoid overlapping description.

As illustrated in FIG. 13A, a cleaning robot 1c includes the display 42, the input unit 43, a communication unit 52, a simultaneous localization and modeling (SLAM) module 53, a determiner 54, and a controller 55. Here, at least one of the communication unit 52, a SLAM module 53, the determiner 54, and the controller 55 may be integrated in an SOC built in the cleaning robot 1c and may be operated by a processor. However, because a plurality of SOCs may be built in the cleaning robot 1c instead of in only one SOC, embodiments are not limited to at least one of the above being integrated in only one SOC.

Because the input unit 43 and the display 42 are respectively the same as the input unit and the display described above with reference to FIG. 4, detailed descriptions thereof will be omitted.

The SLAM module 53 refers to a module that generates map information related to an indoor environment. Here, the SLAM module 53 may be formed of a sensor configured to collect surrounding information during navigation and a processor such as an MCU capable of performing operations to gather the collected pieces of surrounding information and generate the map information related to the indoor environment. That is, the SLAM module 53 may collect the surrounding information during navigation through the sensor attached to the cleaning robot 1c and gather the collected pieces of surrounding information to generate the map information related to the indoor environment.

The communication unit 52 may transmit and receive various types of data to and from an external device through a wireless communication network or wired communication network. Here, the wireless communication network refers to a communication network capable of wirelessly transmitting and receiving a signal containing data. For example, the communication unit 52 may transmit and receive a wireless signal between devices via a base station by a communication method such as 3Generation (3G) and 4Generation (4G), and in addition, transmit and receive a wireless signal containing data to and from a terminal within a predetermined distance from the communication unit 52 by a communication method such as a wireless local area network (LAN), wireless fidelity (Wi-Fi), Bluetooth, ZigBee, Wi-Fi Direct (WFD), ultra wideband (UWB), Infrared Data Association (IrDA), Bluetooth Low Energy (BLE), and Near Field Communication (NFC).

The wired communication network refers to a communication network capable of transmitting and receiving a signal containing data through wired communication. For example, although the wired communication network includes Peripheral Component Interconnect (PCI), PCI-express, Universal Serial Bus (USB), and the like, the wired communication network is not limited thereto.

The communication unit 52 may perform connection to at least one other cleaning robot present adjacent to the cleaning robot through a communication network. Here, the communication unit 52 may directly perform connection to at least one other cleaning robot through communication or perform connection to at least one other cleaning robot through an external server. Here, the external server may be present outdoors or present indoors.

In one embodiment, although the external server may be a central server configured to manage a home network that is present indoors, the external server is not limited thereto. Here, any one of IoT devices present indoors may serve as a gateway server of the home network, or the gateway serve may be separately provided. This will be described in detail below.

Here, the at least one other cleaning robot present adjacent to the cleaning robot may be any cleaning robot, regardless of supporting specifications or form, having a communication unit built therein and capable of communicating with an external device, and is not limited to having the same supporting specifications or form as the cleaning robot. For example, cleaning robots 1c, 1d, and 1e that perform cleaning by the joint cleaning method may be cleaning robots having the same supporting specifications and form as illustrated in FIG. 12A or cleaning robots having different supporting specifications and forms as illustrated in FIG. 12B, and may be any cleaning robot as long as the cleaning robot is connected through a communication network. Therefore, the forms and supporting specifications of the cleaning robots which will be described are not limited to those illustrated in the drawings.

The communication unit 52 may transmit and receive wired/wireless signals containing various data to and from at least one other cleaning robot connected thereto. For example, the communication unit 52 may transmit/receive identification information of each of the cleaning robots. Here, the identification information is information with which a cleaning robot may be identified and may include an Internet Protocol (IP) address, a media access control (MAC) address, and the like as well as an identification number and a serial number of the cleaning robot, but is not limited thereto.

For example, when the cleaning robot is paired with another cleaning robot through the Bluetooth communication network, a universally unique identifier (UUID) may be used as identification information. According to an embodiment, a UUID may be converted according to a variable length text encoding method for a Unicode such as universal transformation format (UTF)-8 and used as identification information. Accordingly, the communication unit 52 may identify the cleaning robot using the identification information and connect to the identified cleaning robot by Bluetooth pairing.

The communication unit 52 may transmit/receive information on supporting specifications supported by each of the cleaning robots. Here, the information on supporting specifications refers to information on a cleaning mode supported by a cleaning robot. In other words, the information on supporting specifications refers to information related to specifications of each of the cleaning robots.

For example, only one or more of the above-described various cleaning modes may be supported according to a cleaning robot. Therefore, the cleaning robot 1c according to the disclosed embodiment may recognize supporting specifications supported by each of the cleaning robots, determine a joint cleaning method, and transmit a control command on the basis of the determined joint cleaning method to perform joint cleaning in association with the cleaning robots adjacent thereto. This will be described in detail below.

The communication unit 52 may transmit/receive map information stored in each of the cleaning robots. Here, the map information refers to a map of a region in which cleaning is performed by the cleaning robot.

For example, the SLAM module 53 may collect information on a region in which cleaning is performed, through the 3D sensor, the camera, or the like, and generate map information. The cleaning robot 1c according to the disclosed embodiment may share the map information stored in each of the cleaning robots between the cleaning robots performing joint cleaning through the communication unit 52 to perform joint cleaning using the latest map, and update the map information. This will be described in detail below.

As will be described below, the communication unit 52 may transmit/receive environment information of each region to and from other cleaning robots during joint cleaning. Accordingly, the cleaning robot 1c according to the disclosed embodiment may continuously correct a cleaning method using the environment information to more efficiently perform cleaning.

The communication unit 52 may serve as a master or a slave when the communication unit 52 is connected to another communication unit built in another cleaning robot. Here, the master serves to lead connection between a plurality of cleaning robots that perform joint cleaning and give instructions about results related to a joint cleaning method. The slave serves to follow the joint cleaning method set by the master.

According to an embodiment, a cleaning robot that leads connection through the communication unit may be set as a master, and at least one other cleaning robot connected thereto may be set as a slave. However, the method of setting a master and a slave is not limited to the above-described embodiment, and a master and a slave may be set between the cleaning robots by various other known methods.

Hereinafter, a cleaning robot that serves as a master will be referred to as a master cleaning robot, and a cleaning robot that serves as a slave will be referred to as a slave cleaning robot.

Hereinafter, a case in which the cleaning robot according to the embodiment operates as a master, and at least one other cleaning robot connected thereto through the communication unit operates as a slave will be described. A case in which the cleaning robot according to the embodiment operates as a slave will be described below.

The determiner 54 may determine various types of settings required for the cleaning robot to perform joint cleaning. For example, the determiner 54 may determine a cleaning region to be cleaned by the cleaning robot, a cleaning method, a cleaning mode, and the like.

In one embodiment, the determiner 54 may determine a cleaning method, a cleaning mode, and the like on the basis of a user's control command received through the above-described display 42, input unit 43, user terminal, remote controller, or the like. A program that supports the user determining various types of settings related to cleaning is stored in the memory. Accordingly, the determiner 54 may determine various types of settings required to perform cleaning by reflecting the various types of settings related to cleaning determined by the user.

The determiner 54 may determine a joint cleaning method performed with at least one other cleaning robot. Here, the joint cleaning method refers to a method by which a plurality of cleaning robots jointly perform cleaning. The joint cleaning method includes a group joint cleaning method in which the same region is cleaned by different methods, a sectional joint cleaning method in which a cleaning region is divided and each section is separately cleaned, and a mixed joint cleaning method in which cleaning is performed by mixing the above-described methods.

Supporting specifications may be different between a plurality of cleaning robots. For example, a first robot may support only the dry cleaning mode, a second robot may support only the wet cleaning mode, and the cleaning robot may support only the sterilizing cleaning mode. Here, the determiner 54 may determine the same cleaning region to be jointly cleaned by the cleaning robot 1c, the first cleaning robot, and the second cleaning robot according to the group joint cleaning method.

In one embodiment, the determiner 54 may determine a cleaning method such that, when dry cleaning is performed on a certain region by the first robot, the second cleaning robot performs wet cleaning on the same region in which dry cleaning has been completed, and the cleaning robot performs sterilizing cleaning on the same region in which wet cleaning has been completed. That is, the determiner 54 may determine a joint cleaning method in consideration of supporting specifications between the cleaning robots connected through the communication unit 52.

Alternatively, supporting specifications between the plurality of cleaning robots may be the same. For example, all of the cleaning robot, the first cleaning robot, and the second cleaning robot may support the dry cleaning mode, the wet cleaning mode, and the sterilizing cleaning mode. The determiner 54 may determine a cleaning method such that a cleaning region is divided into sections each of which the respective cleaning robots are in charge of, and the cleaning robots respectively clean the divided sections by the dry cleaning mode, the wet cleaning mode, and the sterilizing cleaning mode.

The determiner 54 may divide a cleaning region by various methods. For example, the determiner 54 may divide the size of the cleaning region in proportion to speeds at which the cleaning robots perform cleaning. In another example, when a region to be cleaned is divided into a plurality of rooms, the determiner 54 may determine each of the cleaning robots to be in charge of cleaning respective rooms. Here, the determiner 54 may determine a cleaning robot that performs cleaning at a high speed to be in charge of cleaning a larger room. Alternatively, the determiner 54 may calculate efficiency by various methods, e.g., determine a cleaning region such that moving routes of the cleaning robots are short on the basis of position information between the cleaning robots, and determine a cleaning region for each of the cleaning robots.

In still another example, the determiner 54 may determine a partial region of a cleaning region to be jointly cleaned, and other partial regions to be separately cleaned by respective cleaning robots. In yet another example, as described above, the determiner 54 may determine the entire cleaning region to be jointly cleaned by the plurality of cleaning robots, and the cleaning methods determined by the determiner 54 are not limited to the above.

As illustrated in FIG. 14, an indoor space may be separated into three regions R1, R2, and R3. Here, the cleaning robot 1c may receive a cleaning performance command related to the three regions R1, R2, and R3 from the user through the above-described input unit, remote controller, user terminal, or the like, and perform cleaning. Alternatively, the cleaning robot 1c may clean the entire regions R1, R2, and R3 of the entire indoor space at time preset by the user.

Here, although the cleaning robot 1c may clean the three regions by itself, the three regions may also be jointly cleaned with other cleaning robots adjacent to the cleaning robot 1c. When joint cleaning is performed, the efficiency of cleaning may be improved and, in a case in which cleaning that is not supported by the cleaning robot needs to be performed, another cleaning robot may perform the cleaning in place of the cleaning robot.

Although supporting specifications of some of the plurality of cleaning robots are the same, supporting specifications of the other cleaning robots may be different. Even in this case, the cleaning methods determined by the determiner 54 are not limited, and the determiner 54 may determine a cleaning region to be divided and each section to be separately cleaned according to the sectional joint cleaning method, determine an entire region to be jointly cleaned according to the group joint cleaning method, or determine the sectional separate cleaning and the group joint cleaning to be performed together. Information on a method of determining a joint cleaning method and an order in which cleaning modes are performed in a joint cleaning method may be preset and stored in the memory.

The controller 55 may be implemented by a processing device or the like configured to perform various types of computations and control processes, such as a processor built in the cleaning robot 1, and may also be implemented by various other known processing devices.

The controller 55 may control the overall operation of the cleaning robot 1. Specifically, the controller 55 may control operations of all of the elements in the cleaning robot 1 such as the display 42 as well as the various types of modules built in the cleaning robot 1. The controller 55 may generate control signals for controlling the elements of the cleaning robot 1 and control operation of each of the above-described elements.

For example, the controller 55 may control, using a control signal, the communication unit 52 transmitting a result of determining a joint cleaning method to at least one other cleaning robot, and enable joint cleaning.

In one embodiment, the controller 55 corrects various types of settings related to cleaning performance on the basis of the environment information received through the communication unit 52 and allows cleaning to be more efficiently performed. Here, the environment information refers to various pieces of information, which is detected by a sensor, related to an environment of a cleaning region. For example, the environment information includes the amount of dust on the floor of the cleaning region, the humidity level of the floor of the cleaning region, the degree of sterilization of the cleaning region, and the like, but is not limited thereto.

In one embodiment, when it is determined that the amount of dust in a specific region is large on the basis of environment information received from another cleaning robot, the controller 55 may transmit a request that dry cleaning be performed one more time in the specific region to the other cleaning robot or control dry cleaning to be performed one more time in the specific region by the cleaning robot itself.

Here, the controller 55 may have the suctioning module e, the cyclone module f, and the dust storage module g, which are shown in FIG. 1, built therein, and perform dry cleaning. The controller 55 may also have the water supply module j, which is shown in FIG. 1, built therein and perform wet cleaning or steam cleaning. That is, various types of modules for performing cleaning may be integrated in the controller 55, and the modules are not limited. The same applies for controllers built in cleaning robots according to different embodiments, which will be described below, and modules built therein are not limited.

That is, because the cleaning robot 1c according to the disclosed embodiment may monitor the entire cleaning region using environment information received from a slave cleaning robot, the overall situation may be reflected in cleaning, and the cleaning may be efficiently performed. When a cleaning region is divided, the cleaning robot 1c may determine a cleaning method from among the sectional separate cleaning, group joint cleaning, and mixed joint cleaning methods so that the cleaning efficiency is improved between the plurality of cleaning robots, and control the plurality of cleaning robots to simultaneously perform cleaning.

In another embodiment, the controller 55 may receive situation information from another cleaning robot through the communication unit 52 and control the operation of the other cleaning robot on the basis of the received situation information. Here, the cleaning situation information includes environment information, cleaning state information, and the like of a region to be cleaned, and the cleaning state information includes information on whether cleaning is being performed or has been completed, or whether an error has occurred. The cleaning robot 1c according to the embodiment may monitor the overall situation of the cleaning region using the situation information and control the cleaning robot and at least one of other cleaning robots on the basis of the overall situation.

The controller 55 may store the date of connection to another cleaning robot and a method of the connection in the memory. Accordingly, the controller 55 may more easily perform connection to the other cleaning robot using the information stored in the memory. For example, when the cleaning robot is paired with another cleaning robot through the Bluetooth communication network, the controller 55 may store information of the connection in the memory and allow the cleaning robots to be automatically connected when being paired later.

The controller 55 may control the communication unit 52 and share the latest map information by updating the map information stored in the memory or transmitting the map information to another cleaning robot.

As described above, a memory 59 may be provided in the cleaning robot 1c. Algorithms or programs for controlling various types of settings required during operation of the cleaning robot may be provided in the memory 59. As described above, map information may be stored in the memory 59, and connection information with another cleaning robot or the like may also be stored therein.

The memory 59 may be implemented by at least one type of storage medium among a flash memory type memory, a hard disk type memory, a multimedia card micro type memory, a card type memory (e.g., a secure digital (SD) or extreme digital (XD) memory), a random access memory (RAM), a static RAM (SRAM), a read-only memory (ROM), an electrically erasable programmable ROM (EEPROM), a PROM, a magnetic memory, a magnetic disk, and an optical disk. However, the memory 59 is not limited thereto, and may be implemented in any different form known in the art.

Instead of only serving as a master as described above, the cleaning robot may also serve as a slave.

Control block diagrams of a master cleaning robot and slave cleaning robots are illustrated in FIG. 13B. Here, although the elements of the cleaning robots are the same as the above-described elements, slave cleaning robots 1d and 1e may receive a joint cleaning method determined by the master cleaning robot through a communication unit 58 and perform cleaning on the basis of the received joint cleaning method using controller 56. That is, a process of determining a joint cleaning method is processed by the master cleaning robot.

A cleaning module 57a of the slave cleaning robot 1d may have the suctioning module e, the cyclone module f, the dust storage module g, and the like, which are shown in FIG. 1, integrated therein and perform dry cleaning. A sterilizing module 57b of the slave cleaning robot 1e may have the water supply module j, which is shown in FIG. 1, integrated therein and perform at least one of wet cleaning and steam cleaning.

The slave cleaning robots 1d and 1e may transmit environment information acquired by a sensor to the master cleaning robot 1c, and even when a region to be cleaned is divided, the master cleaning robot 1c may monitor the entire region to be cleaned.

Hereinafter, an operational flow of a cleaning robot that performs joint cleaning will be described.

Figure 15:
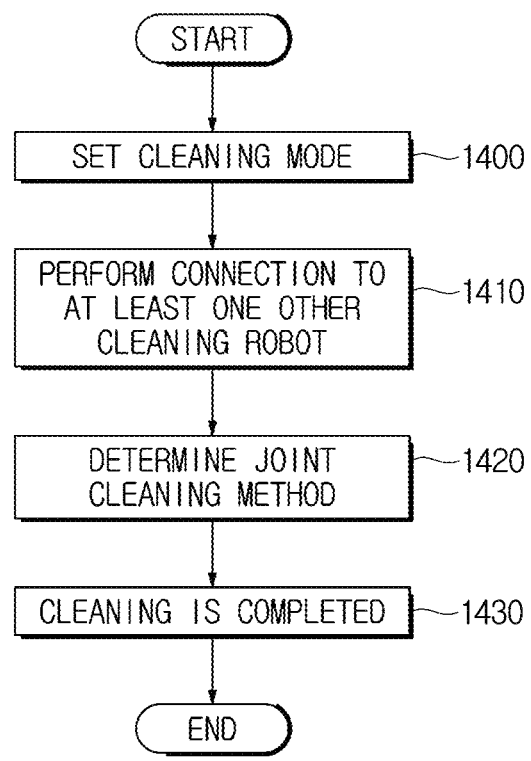
FIG. 15 is a view illustrating an operational flowchart of a cleaning robot that performs joint cleaning according to one embodiment.

FIG. 15 is a view illustrating an operational flowchart of a cleaning robot that performs joint cleaning according to an embodiment.

The cleaning robot may set a cleaning mode (1400). For example, the cleaning robot may receive setting information related to the cleaning mode from the user through the display, the input device provided in the cleaning robot, the remote controller, or the user terminal. Accordingly, the cleaning robot may set the cleaning mode on the basis of the received setting information.

According to an embodiment, when a joint cleaning method is received from the user, another cleaning robot is detected adjacent to the cleaning robot, or a history of being connected to the other cleaning robot is present in the memory, the cleaning robot may set a cleaning mode according to the joint cleaning method.

The cleaning robot may perform connection to at least one other cleaning robot (1410). As described above, the cleaning robot may perform connection to at least one other cleaning robot through direction communication or via a gateway server of a home network.

The cleaning robot may determine a joint cleaning method to be performed with another cleaning robot connected thereto (1420). Here, as described above, the cleaning robot may determine a joint cleaning method by combining at least one of sizes and forms of cleaning regions and supporting specifications of the cleaning robots. For example, the cleaning robot may determine any one of the sectional joint cleaning method, the group joint cleaning method, and the mixed joint cleaning method as the joint cleaning method.

Accordingly, the cleaning robot may perform joint cleaning on the basis of the determined joint cleaning method. Here, when the cleaning robot operates as a master, the cleaning robot may transmit a control command to slave cleaning robots and control so that joint cleaning is performed. The cleaning robot may receive cleaning situation information from the slave cleaning robots through a communication network and continuously monitor a cleaning situation so that additional cleaning is performed when a region that requires more cleaning is present. The cleaning robot may monitor operational states of the slave cleaning robots so that, when an error has occurred in one slave cleaning robot and thus the slave cleaning robot is not operated, the other slave cleaning robot may cover for that slave cleaning robot. When cleaning is completed (1430), the cleaning robot may end connection to other cleaning robots.

In order not to cause discomfort to the user when cleaning is performed by the cleaning robot, the cleaning robot may switch to a quiet mode to regulate noise generated as cleaning is performed. However, when the cleaning robot unnecessarily switches to the noise mode, cleaning performance may be degraded, and the user may rather experience trouble.

Therefore, hereinafter, a cleaning robot that more precisely regulates noise according to a cleaning mode will be described.

Figure 16A:
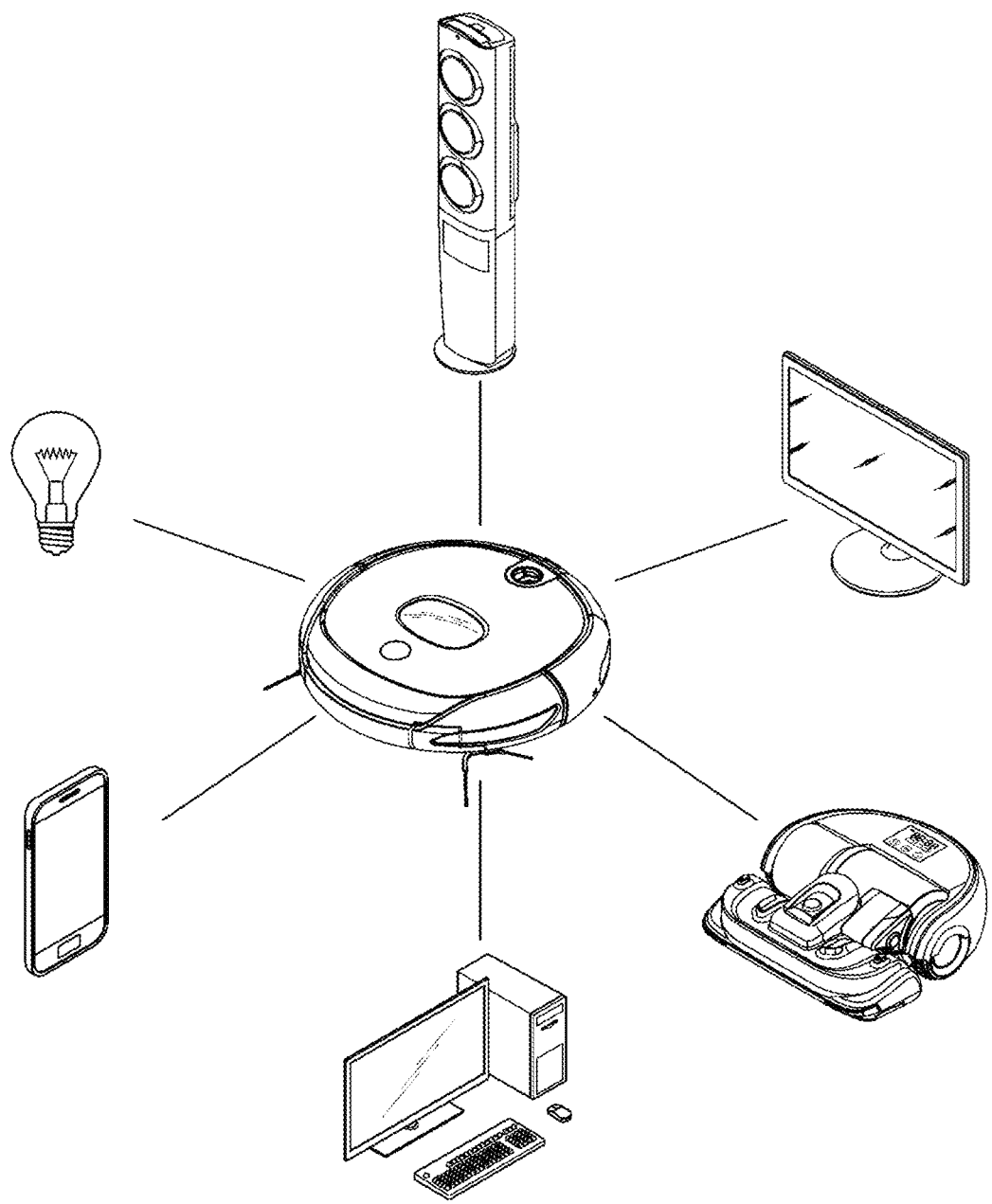
FIGS. 16A and 16B are views illustrating IoT devices directly connected through a home network or a communication network according to different embodiments.
Figure 16B:
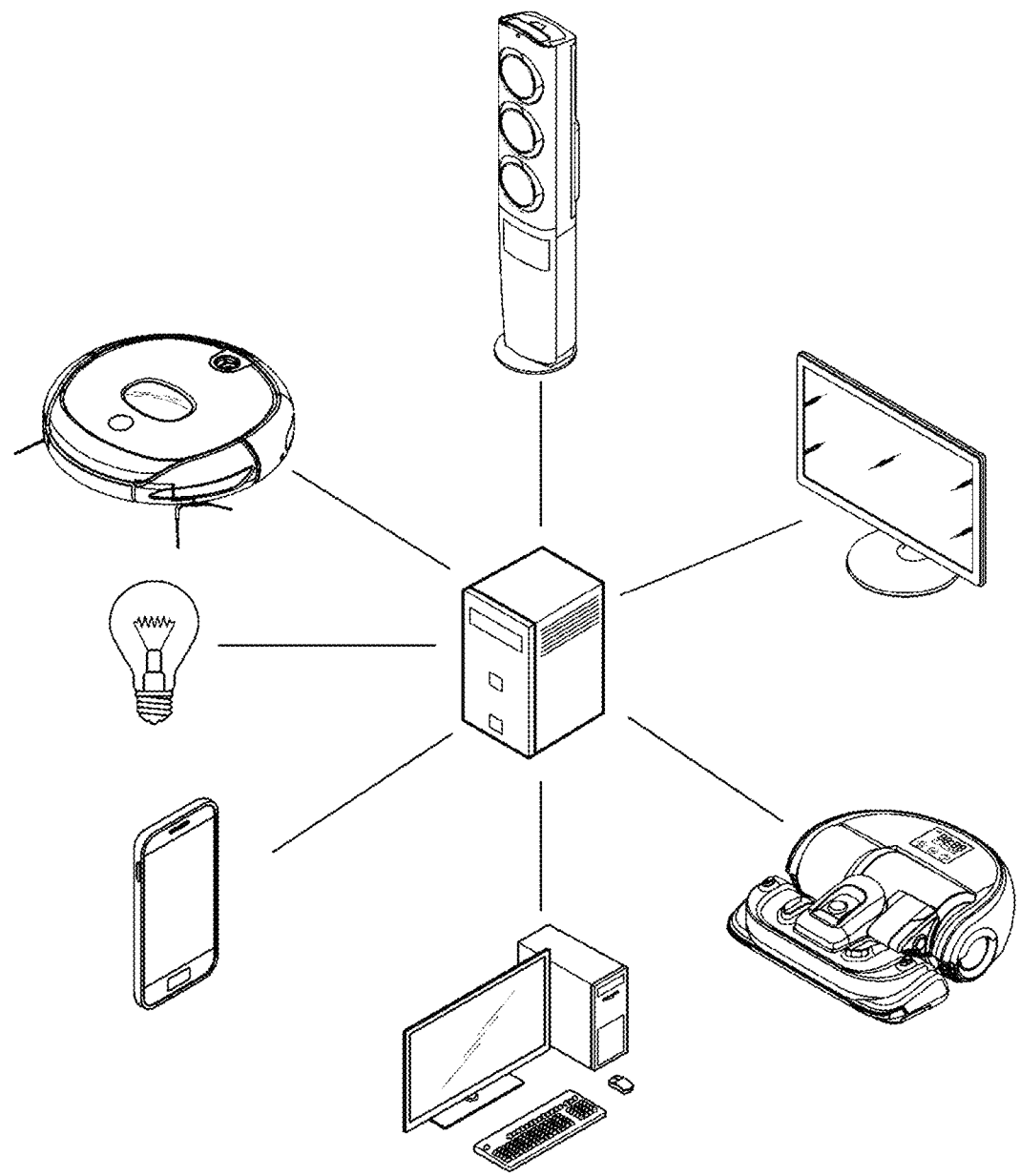
Figure 17:
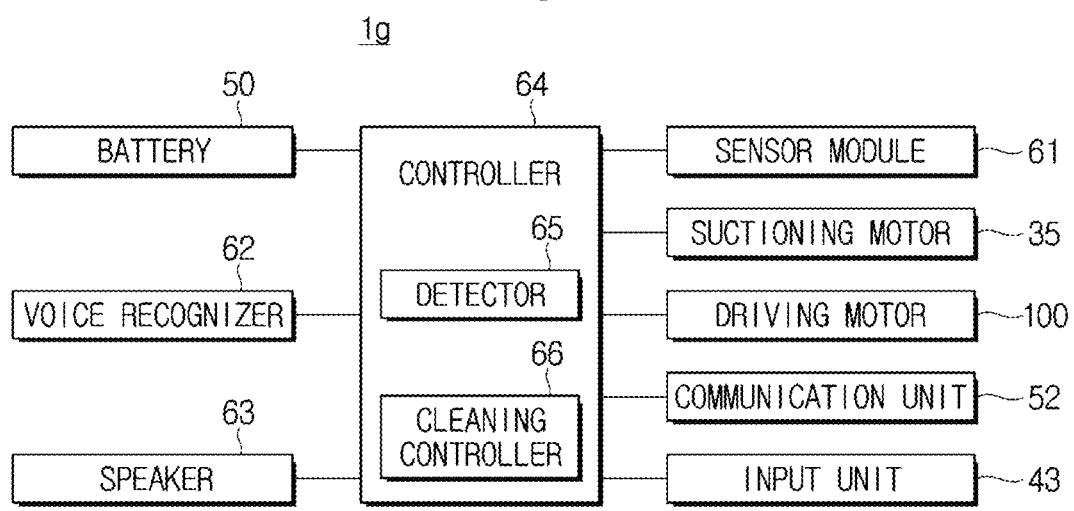
FIG. 17 is a view illustrating a control block diagram of a cleaning robot that detects a user's position and controls a cleaning mode according to one embodiment.
Figure 18:
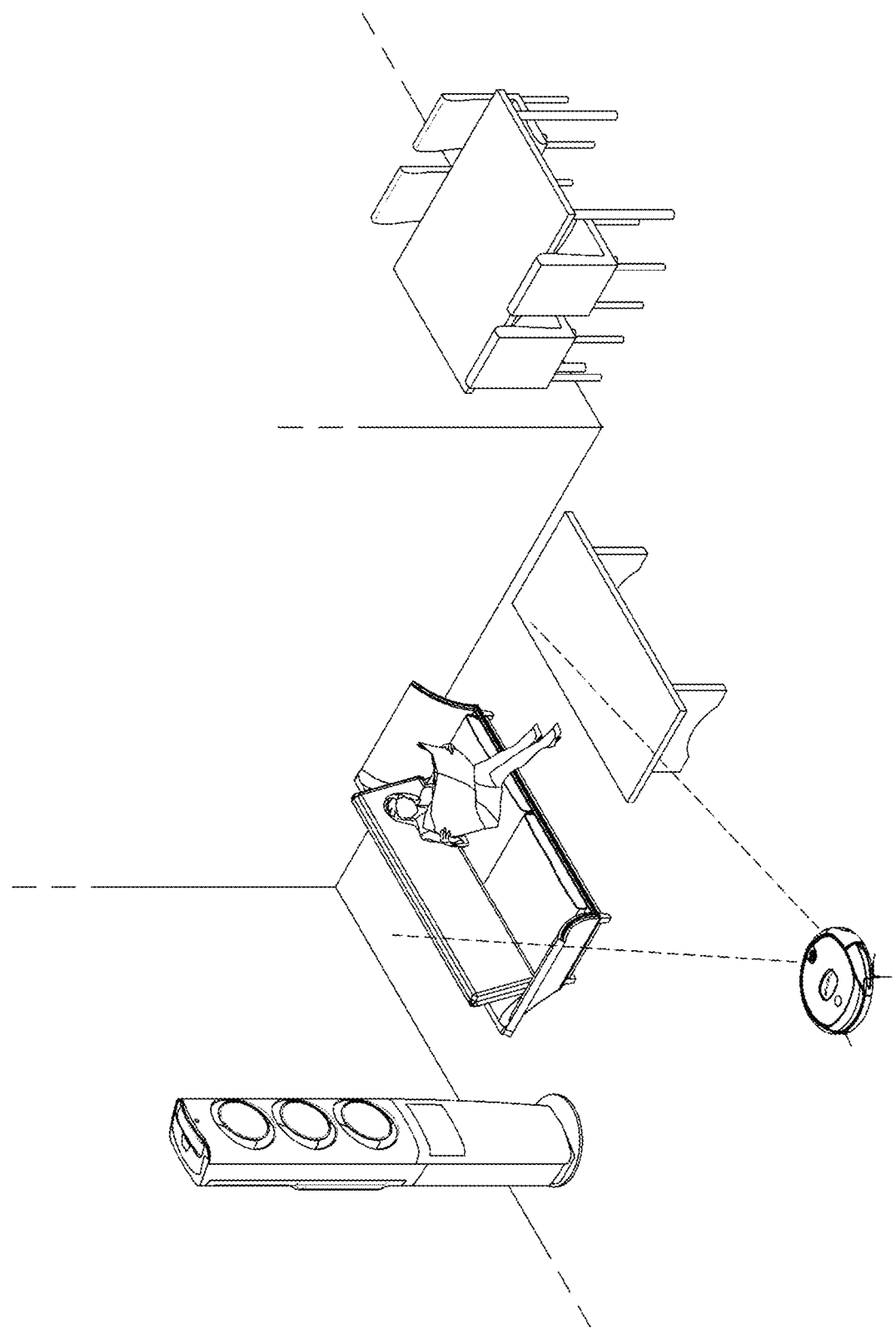
FIG. 18 is a view illustrating an indoor space in which a cleaning robot and an IoT device are provided according to one embodiment.

FIGS. 16A and 16B are views illustrating IoT devices directly connected through a home network or a communication network according to different embodiments, FIG. 17 is a view illustrating a control block diagram of a cleaning robot that detects a position of a user and controls a cleaning mode according to an embodiment, and FIG. 18 is a view illustrating an indoor space in which the cleaning robot and an IoT device are provided according to an embodiment. Hereinafter, the above drawings will be described along with each other to avoid overlapping description.

A cleaning robot 1g according to an embodiment includes the suctioning motor 35, the input unit 43, the battery 50, the communication unit 52, a sensor module 61, a voice recognizer 62, a speaker 63, a controller 64, and a driving motor 100. Here, at least one of the communication unit 52, the sensor module 61, and the controller 64 may be integrated in an SOC built in the cleaning robot 1g, but because a plurality of SOCs may be built in the cleaning robot 1g instead of in only one SOC, embodiments are not limited to at least one of the above being integrated in only one SOC. Also, the above-mentioned elements may be implemented by a processor such as a MCU.

For example, the voice recognizer 62 may be implemented by a microphone. The voice recognizer 62 may convert received voice into an electrical signal. The voice recognizer 62 may derive a voice waveform or convert voice to text. Accordingly, the voice recognizer 62 may receive noise generated from various types of sound sources in addition to the user's voice.

The sensor module 61 has at least one sensor capable of detecting the user built therein. For example, the sensor module may be implemented by sensors capable of detecting the user and a processor such as a MCU configured to control operations of the above-mentioned sensors.

Here, the sensor refers to a sensor capable of detecting the user and recognizing a distance between the user and the sensor or between the user and the cleaning robot to which the sensor is attached, such as a stereo camera, an IR sensor, a heat sensor, a pyro-electric IR (PIR) sensor, and a 3D sensor. The sensor module 61 may have at least one of the above-mentioned sensors included therein and may detect motion of the user in addition to recognizing the position of the user. Here, information detected by a sensor will be referred to as "sensor information."

Because the communication unit 52 is built in the cleaning robot 1, the cleaning robot 1 may be connected to the home network through the communication unit 52. Accordingly, the cleaning robot 1 may transmit and receive various types of signals to and from various IoT devices present in an indoor space. Here, the IoT devices refer to various devices in everyday life, which are connected to the home network through the built-in communication unit and share data.

For example, the IoT devices include any user terminal such as a mobile phone, a computer, a wearable device, and the like in addition to home appliances such as a telephone, a microwave, an air conditioner, a television (TV), a lamp, and a door-lock.

Here, the home network refers to a network that simultaneously provides a path through which data may be transmitted and received to and from all IoT devices in an indoor space and provides a path configured to provide connection with an external Internet network. A gateway server of the home network is a server configured to integrally manage the home network, and any one of the IoT devices may perform an operation of the gateway server, or another server separately provided from the gateway server may perform the operation of the gateway server. As illustrated in FIG. 16A, the cleaning robot may transmit various types of control commands to other IoT devices present in the indoor space through the gateway server of the home network and control operations of the other IoT devices. As illustrated in FIG. 16B, the gateway server of the home network may control operations of the IoT devices through direct communication therewith, but embodiments are not limited to the operations of the IoT devices being controlled through the gateway server of the home network.

Therefore, the communication unit 52 may receive detected information such as the position, motion, and the like of the user detected by the IoT device from the gateway server of the home network or the IoT device.

The controller 64 may control the overall operation of the cleaning robot 1g. Specifically, the controller 64 may control operations of all elements in the cleaning robot 1, such as the communication unit 52, in addition to the various types of modules built in the cleaning robot 1g. The controller 64 may generate control signals for controlling the elements of the cleaning robot 1g and control operation of each of the above-described elements.

Here, as illustrated in FIG. 17, the controller 64 includes a detector 65 and a cleaning controller 66. The cleaning controller 66 may control a cleaning method, a cleaning mode, an order in which cleaning regions are cleaned, and the like, and may control the driving motor 100 to control movement of the cleaning robot 1g to a desired region. For example, the cleaning controller 66 may include the moving module d of FIG. 1. Accordingly, by controlling the driving motor 100, a caster wheel, and the like using a control signal, the cleaning controller 66 may control navigation of the cleaning robot 1g.

The detector 65 may detect the user on the basis of at least one piece of sensor information acquired by at least one IoT device present in the indoor space and the sensor module. For example, the detector 65 may receive sensor information acquired by a sensor of an IoT device through the communication unit 52 or use sensor information embedded in the cleaning robot 1g to detect a position in the indoor space at which the user is present, a state of the user, and the like.

Referring to FIG. 18, an IoT device such as an air conditioner may be provided in addition to the cleaning robot in the indoor space. Also, a sensor may be built in sofa on which the user sits. Accordingly, the detector 65 may use sensor information acquired by various sensors present in the indoor space and derive a state of the user in addition to the distance between the user and the cleaning robot.

The controller 64 may use at least one of the sensor information received through the communication unit 52 and the sensor information detected by the sensor module to control the cleaning controller 66. In other words, the controller 64 may control cleaning performance on the basis of at least one of the distance between the user and the cleaning robot detected by the above-described elements.

For example, when the distance between the user and the cleaning robot becomes smaller than a predetermined level, the controller 64 controls the cleaning controller 66 using a control signal to switch to the quiet mode.

The controller 64 may control cleaning performance on the basis of at least one of the distance between the user and the cleaning robot, the user's action, and the user's position detected by the above-described elements, and a result received through the voice recognizer 62.

For example, when it is determined according to the sensor information that the distance between the user and the cleaning robot has become smaller than the predetermined level and the user is currently on a bed, the controller 64 may determine that the user is currently sleeping or taking a rest and control regions other than the bedroom to be cleaned first while switching to the quiet mode.

In another example, as illustrated in FIG. 18, the user may be reading a newspaper while sitting on the sofa. Here, the user may be detected by a sensor module built in an IoT device such as an air conditioner or the sensor module built in the cleaning robot.

In still another example, when the user is watching a TV while sitting on the sofa, a voice recognizer built in an IoT device or the voice recognizer 62 of the cleaning robot 1g may receive TV sound. Accordingly, the detector 65 may combine results detected or received by the above-described elements and control the cleaning performance.

In one embodiment, when the distance between the user and the cleaning robot is smaller than the predetermined level according to sensor information and there is surrounding noise, as a result of recognition by the voice recognizer 62, the controller 64 may switch to the quiet mode using a control signal.

In another embodiment, the controller 64 may control the level of the quiet mode in proportion to the level of the surrounding noise. Cleaning performance is degraded as the controller 64 switches to the quiet mode and noise generated from the cleaning robot is decreased. Here, it is more difficult for the user to perceive noise generated from the cleaning robot while cleaning is performed as the surrounding noise is louder. Accordingly, the cleaning robot 1g according to the embodiment regulates the level of the quiet mode according to the level of the surrounding noise to prevent disturbing the user and improve the efficiency of cleaning performance.

In still another example, when the distance between the user and the cleaning robot is smaller than the predetermined level and the user is not moving according to the sensor information, and the user's voice or surrounding noise is not recognized, the controller 64 may determine that the user is taking a rest. Accordingly, the controller 64 may control a cleaning region to be cleaned except for a region adjacent to that in which the user is present or a room in which the user is present. Alternatively, the controller 64 may adjust the order in which cleaning is performed such that, in the cleaning region, the region adjacent to that in which the user is present or the room in which the user is present is cleaned later. The way in which the controller 64 controls cleaning is not limited.

Hereinafter, an operational flow of a cleaning robot that controls cleaning performance on the basis of the position and state of the user will be described.

Figure 19:
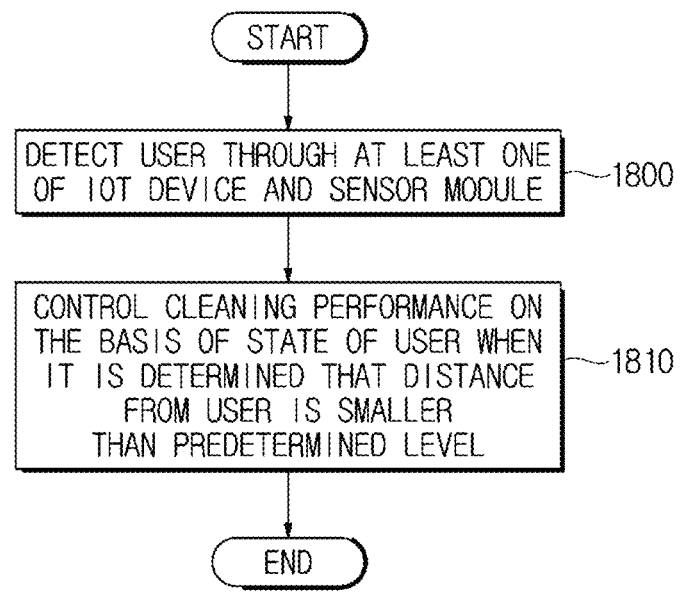
FIG. 19 is a view illustrating an operational flowchart of a cleaning robot that detects a user's position and controls a cleaning mode according to one embodiment.

FIG. 19 is a view illustrating an operational flowchart of a cleaning robot that detects the user's position and controls a cleaning mode according to an embodiment.

The cleaning robot may detect at least one of a position and a state of the user by using at least one of an IoT device and a sensor module (1800). For example, the cleaning robot may detect the position and the state of the user by various sensors capable of detecting the user, such as a stereo camera, a 3D sensor, and a PIR sensor.

In one embodiment, the cleaning robot may determine that a moving object, among objects detected from the surroundings by a 3D sensor, corresponds to the user. In another example, the cleaning robot may detect the user by processing image information acquired by a stereo camera. In still another example, the cleaning robot may detect the user on the basis of IRs radiated from the inside of the user's body by a PIR sensor. The way in which the user is detected is not limited.

Alternatively, the cleaning robot may receive the position and the state information of the user detected by an IoT device through a communication network. For example, the above-described sensor may also be built in the IoT device. The cleaning robot may receive the position and the state information detected by the IoT device and detect the position and the state of the user on the basis of the received position and state information. Accordingly, the distance between the user and the cleaning robot may be derived by comparing the current position of the cleaning robot and the position of the user.

When it is determined that the distance between the user and the cleaning robot is smaller than the predetermined level, the cleaning robot may control cleaning performance on the basis of the user's state (1810). For example, when it is determined that the distance between the cleaning robot and the user is smaller than the predetermined level while cleaning is performed, the cleaning robot may switch to the quiet mode to prevent the user from being disturbed by noise. Accordingly, the cleaning robot according to the embodiment may enhance convenience of the user by performing cleaning that does not influence the user's living.

In another example, when it is determined that the distance between the cleaning robot and the user is smaller than the predetermined level while cleaning is performed, the cleaning robot may more specifically determine the user's state and control the cleaning performance instead of immediately switching to the quiet mode.

In one embodiment, the cleaning robot may receive noise, voice, and the like emitted from a surrounding sound source through a voice recognizer. When the user's voice is received, the cleaning robot may determine that the cleaning robot should be switched to the quiet mode in the vicinity of the user and control operation, e.g., simultaneously adjust an output of the suctioning motor and an output of the driving motor, to prevent the user from being disturbed by noise.

Alternatively, the cleaning robot may regulate the level of the quiet mode according to the level of the user's voice. That is, the cleaning robot may control operations of the devices built therein so that cleaning is performed in the extent to which the user is not disturbed by the operation of the cleaning root. In still another example, the cleaning robot may regulate the level of the quiet mode according to the level of noise emitted from a surrounding sound source.

The cleaning robot may also adjust a cleaning region itself on the basis of the current position of the user. For example, when it is determined that the user is currently beside a desk or on a bed, the cleaning robot may change the order in which cleaning regions are cleaned such that regions except for the region or room in which the user is present is cleaned first.

Hereinafter, an operational flow of a cleaning robot that detects a user while performing cleaning and switches a cleaning mode or changes a cleaning method will be described in more detail.

Figure 20:
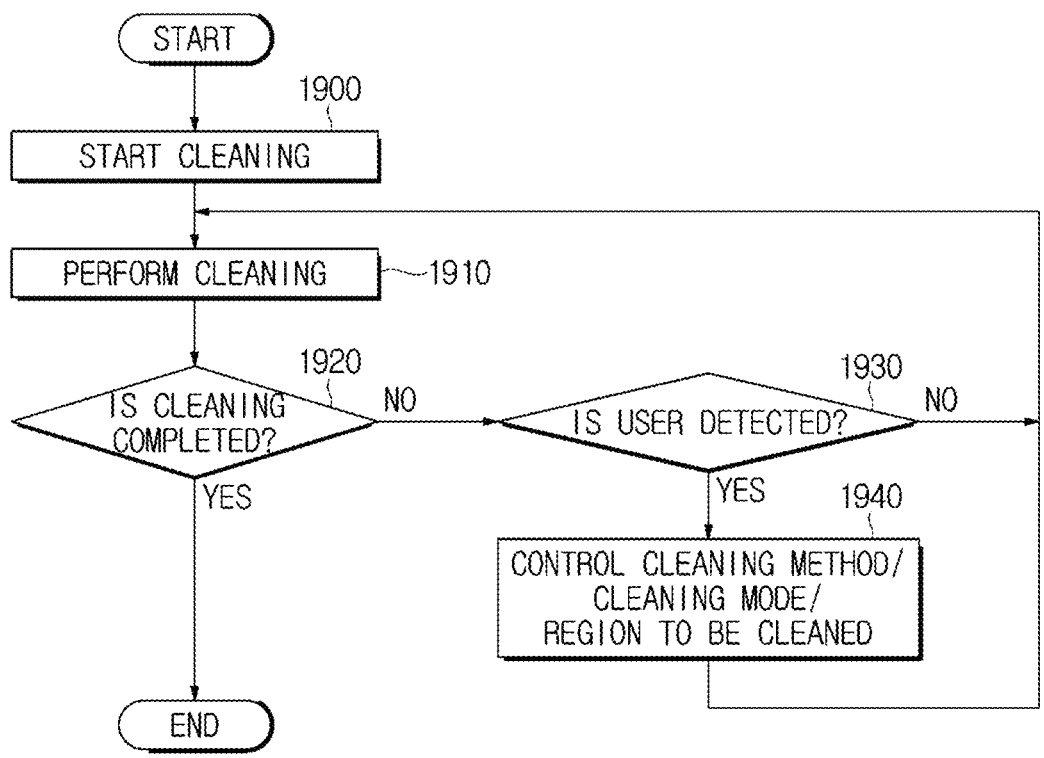
FIG. 20 is a view illustrating an operational flowchart of a cleaning robot that detects a user's position while performing cleaning and controls a cleaning mode according to one embodiment.
Figure 21:
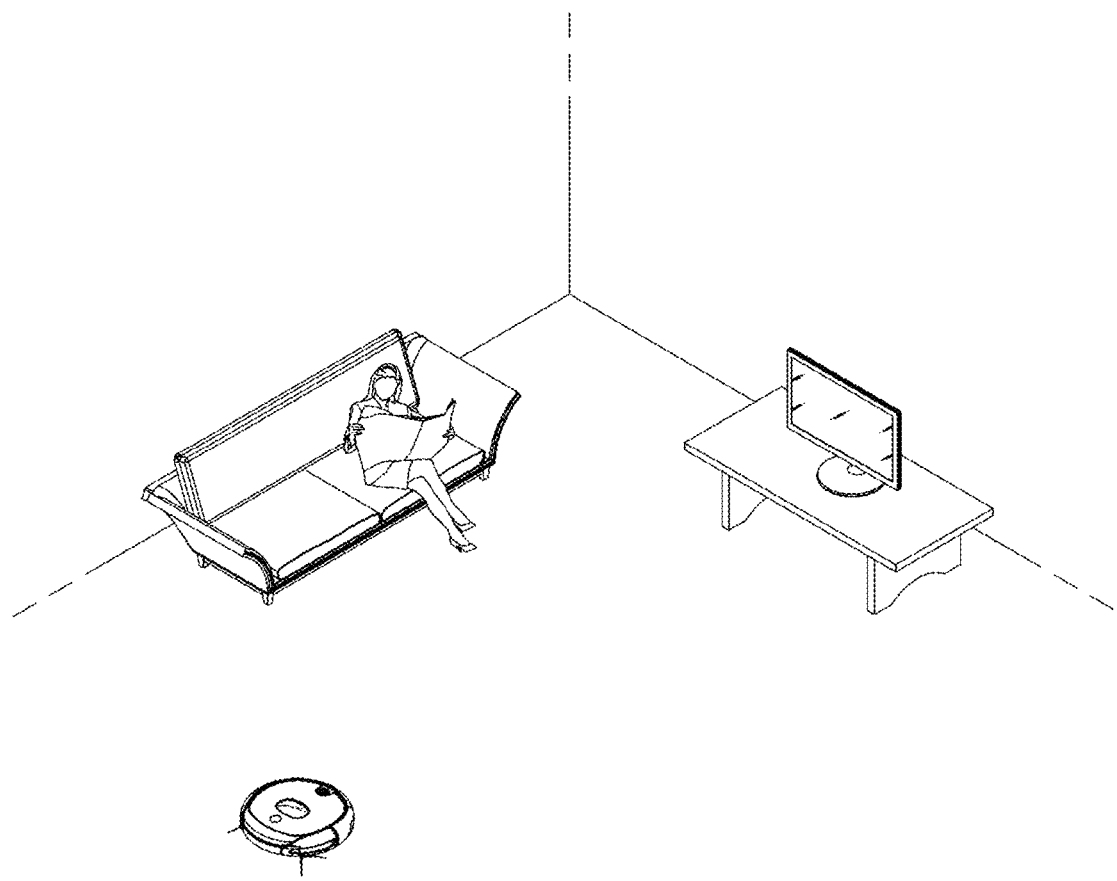
FIG. 21 is a view for describing a case in which surrounding noise is detected and a level of a quiet mode is regulated according to one embodiment.
Figure 22:
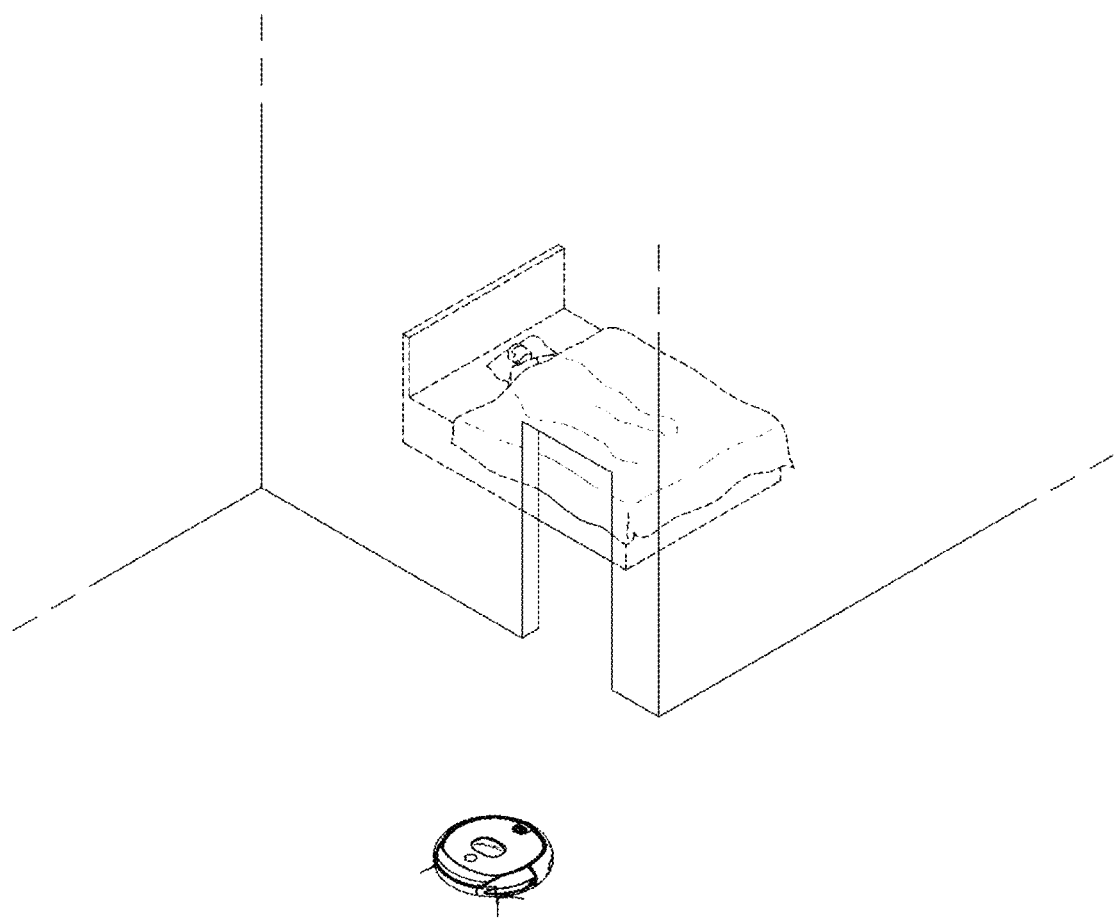
FIG. 22 is a view for describing a case in which a state of a user is detected and a cleaning region is changed according to one embodiment.

FIG. 20 is a view illustrating an operational flowchart of a cleaning robot that detects a position of the user while performing cleaning and controls a cleaning mode according to an embodiment, FIG. 21 is a view for describing a case in which surrounding noise is detected and the level of the quiet mode is regulated according to an embodiment, and FIG. 22 is a view for describing a case in which a state of the user is detected and a cleaning region is changed according to an embodiment.

The cleaning robot may start to perform cleaning (1910). For example, the cleaning robot may start to perform cleaning when the cleaning robot receives an execution command from the user through the input unit or receives an execution command from an IoT device through the communication unit. The cleaning robot may also start cleaning at time preset by the user. The way in which the cleaning robot starts to perform cleaning is not limited.

Accordingly, the cleaning robot may perform cleaning (1910). The cleaning robot may perform cleaning according to various cleaning modes and set the order in which regions of the entire cleaning region are cleaned. For example, when a cleaning region is divided into a plurality of rooms, the cleaning robot may set the order in which the rooms are cleaned according to various methods, and then perform cleaning on the basis of the set order. In another example, when a cleaning region corresponds to a single room, the cleaning robot may set a direction in which cleaning will be performed according to various methods, and then perform cleaning on the basis of the set direction.

When the entire cleaning region has been cleaned, the cleaning robot may complete cleaning. Accordingly, the cleaning robot may move to the charging station according to a battery power level or move to a pre-designated region.

However, before cleaning is completed (1920), the cleaning robot may detect the user while a region to be cleaned is being cleaned (1930). For example, the cleaning robot may detect the user in association with an IoT device or through a sensor module built therein. Because this is the same as the above description, detailed description thereof will be omitted.

The cleaning robot may control an operation of performing cleaning according to whether the user is detected. When the user is not detected, the cleaning robot may perform cleaning in a region to be cleaned in a set cleaning mode without additionally controlling the operation.

However, when the user is detected, the cleaning robot may control a cleaning method, a cleaning mode, and a region to be cleaned so that an influence on the user is small (1940).

Here, the cleaning robot may control the operation of performing cleaning on the basis of at least one of the distance between the user and the cleaning robot, the current position of the user, a sound input through a microphone, and motion of the user.

For example, when the distance between the user and the cleaning robot becomes smaller than the predetermined level, the cleaning robot may be switched to the quite mode, and the user may be prevented from being affected by noise.

However, when the cleaning robot is switched to the quiet mode, the cleaning performance of the cleaning robot is degraded. Accordingly, even when the distance between the user and the cleaning robot is smaller than a predetermined distance, the cleaning robot may determine whether the user is moving or surrounding noise is generated, and regulate the level of the quiet mode or adjust the cleaning order. Here, the predetermined distance may be set by the user or preset when the cleaning robot is designed.

For example, when the distance between the user and the cleaning robot is smaller than the predetermined level, and motion of the user is not detected, the cleaning robot may determine that the user is taking a rest or sleeping and control other sections in which the user is not present to be cleaned first.

In another example, when the distance between the user and the cleaning robot is smaller than the predetermined level, motion of the user is not detected, and it is detected that the user is currently on the sofa or bed, the cleaning robot may control other sections in which the user is not present to be cleaned first. The way in which the cleaning robot controls cleaning is not limited.

When the distance between the user and the cleaning robot becomes smaller than the predetermined level, the cleaning robot may set the level of the quiet mode according to the level of the surrounding noise input thereto. For example, when the user is doing dishes, the cleaning robot may set the level of the quiet mode according to the level of the surrounding noise generated due to doing dishes.

In still another example, referring to FIG. 21, when TV sound is detected by a voice recognizer, the cleaning robot may set the level of the quiet mode according to the level of the TV sound. Accordingly, the cleaning robot may prevent causing disturbance to the user watching TV while improving cleaning performance.

In yet another example, referring to FIG. 22, the cleaning robot may recognize, using a sensor built in the bed, that the user is currently on the bed. Accordingly, the cleaning robot may exclude the room in which the user is currently present from a region to be cleaned or set the room to be cleaned last.

For convenience of the user, the cleaning robot according to the disclosed embodiment regulates the indoor environment in addition to switching to the quiet mode according to the position and the state of the user. Hereinafter, a cleaning robot that controls an indoor environment on the basis of an indoor environment map will be described.

Figure 23:
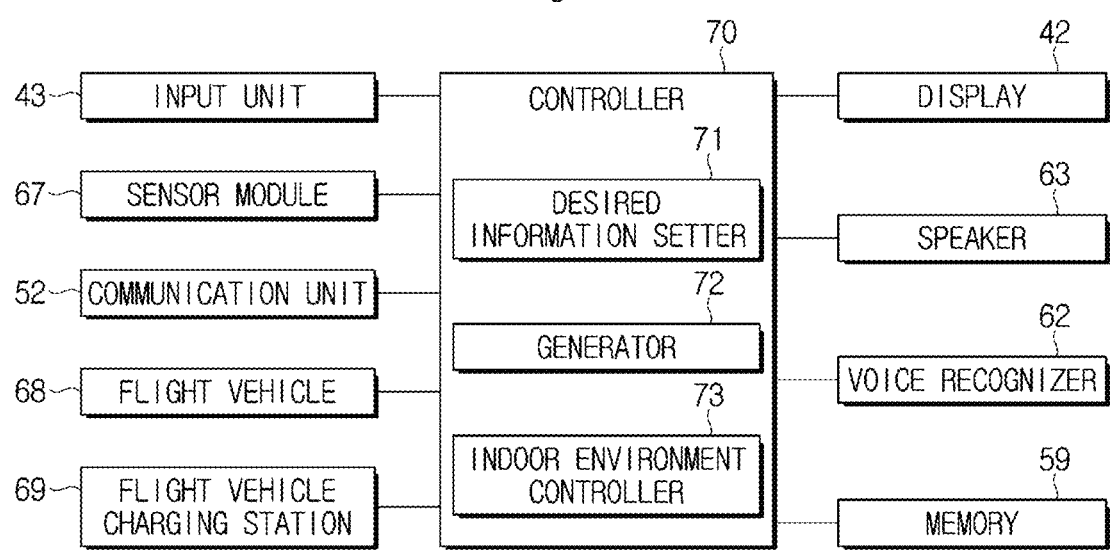
FIG. 23 is a view illustrating a control block diagram of a cleaning robot that regulates an indoor environment on the basis of an environment map according to one embodiment.
Figure 25:
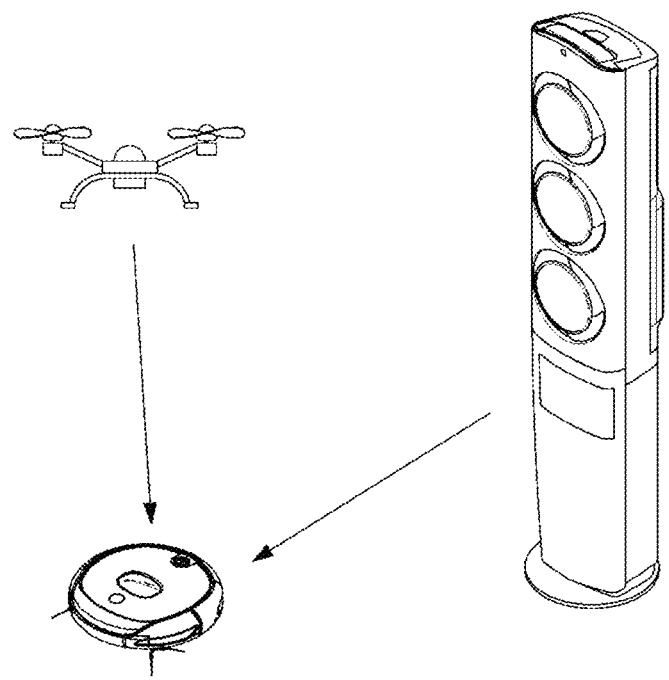
FIG. 25 is a view for describing a case in which environment information is collected by a cleaning robot, a flight vehicle, and an IoT device according to one embodiment.

FIG. 23 is a view illustrating a control block diagram of a cleaning robot that regulates an indoor environment on the basis of an environment map according to an embodiment, FIG. 24 is a view illustrating a flight vehicle to which a sensor module is attached according to an embodiment, and FIG. 25 is a view for describing a case in which environment information is collected by the cleaning robot, the flight vehicle, and an IoT device according to an embodiment.

As illustrated in FIG. 23, a cleaning robot 1*h* includes the display 42, the input unit 43, the communication unit 52, the memory 59, the voice recognizer 62, the speaker 63, a sensor module 67, a flight vehicle 68, a flight vehicle charging station 69, and a controller 70. Here, the communication unit 52, the memory 59, the sensor module 67, and the controller 70 may be integrated in an SOC built in the cleaning robot, but as described above, embodiments are not limited to the communication unit 52, the memory 59, the sensor module 67, and the controller 70 being integrated in only one SOC.

Because the display 42, the input unit 43, the communication unit 52, the memory 59, the voice recognizer 62, and the speaker 63 are the same as those described above, descriptions thereof will be omitted.

The flight vehicle 68 refers to an object capable of flying to a target area by receiving a control command from the cleaning robot 1*h*. For example, the flight vehicle 68 includes a drone at which a sensor module is mounted. As illustrated in FIG. 24(a), the flight vehicle 68 may have a sensor module mounted on a lower portion thereof and acquire environment information of an area in which the sensor module 67 is located.

The sensor module 67 may be implemented by a substrate on which various sensors capable of acquiring environment information and a processor such as a MCU are integrated. The sensor module will be described in detail below. The sensor module 67 may be mounted on a lower end portion of the flight vehicle 68 by a lift. Accordingly, the flight vehicle 68 may control the position of the sensor module 74 by adjusting the height of the lift as well as adjusting the height at which the flight vehicle 68 is flying.

The flight vehicle charging station 69 may be provided in the cleaning robot 1h. In one embodiment, the flight vehicle charging station 69 may be provided at an upper surface of a main body of the cleaning robot 1h.

A battery may be insufficient for the flight vehicle 68 to acquire environment information while flying over the entire indoor space of the house. To complement this, the flight vehicle charging station 69 at which the battery built in the flight vehicle is charged is provided in the cleaning robot 1h, and the flight vehicle 68 may be charged. When the flight vehicle 68 is being charged, the cleaning robot 1h may move while the flight vehicle 68 is mounted thereon.

A fixing body may be provided to prevent the flight vehicle 68 from being damaged due to being detached from the cleaning robot 1h while the cleaning robot 1h is moving. That is, the flight vehicle 68 and the cleaning robot 1h may be fixed to each other by the fixing body. More specifically, the controller 70 may control the operation of the fixing body using a control signal and fix the flight vehicle to the main body of the cleaning robot 1h. The controller 70 may have the flight vehicle module p, which is shown in FIG. 1, built therein and control the overall operation of the flight vehicle.

The controller 70 may control the overall operation of the cleaning robot 1h. Specifically, the controller 70 may control operations of all elements in the cleaning robot 1h, such as the display 42, the flight vehicle 68, and the fixing body, in addition to the various types of modules built in the cleaning robot 1b. For example, the controller 70 may generate control signals for controlling the elements of the cleaning robot 1h and control operation of each of the above-described elements.

The controller 70 may be implemented by a processing device or the like configured to perform various types of computations and control processes, such as a processor built in the cleaning robot 1b, and may also be implemented by various other known processing devices.

The controller 70 includes a desired information setter 71, a generator 72, and an indoor environment controller 73.

The desired information setter 71 may set desired information on the indoor environment. The desired information on the indoor environment refers to information on the indoor environment desired by the user, and refers to various desired levels related to the indoor environment such as indoor temperature, air cleanliness, and intensity of illumination. The desired information setter 71 may receive information related the indoor environment from the user through the input unit 43, the communication unit 52, and the like, and set desired information. The information related to the indoor environment may be received from the user by other methods, and the method in which the information related to the indoor environment is received from the user is not limited.

Here, the information related to the indoor environment refers to information on environment settings desired by the user. For example, in the case of temperature, the input unit 43 may receive 25° C. as the desired temperature from the user, but may also receive parameters such as "very cool," "cool," "pleasant," "warm," and "very warm" as the desired temperature. Then, the desired information setter 71 may set a value corresponding to each of the parameters. That is, because the user does not have to input each of the specific environmental parameter values, convenience of the user may be improved.

In one embodiment, the desired information setter 71 may set 19° C. as a temperature corresponding to "very cool," and set 23° C. as a temperature corresponding to "cool." The temperatures are not limited. Here, an environment corresponding to each of the parameters may be set by the user or preset when the cleaning robot 1h is designed.

The generator 72 may acquire indoor environment information and generate an indoor environment map. For example, indoor map information acquired through the SLAM module or a communication network is stored in the memory 59 of the cleaning robot. Here, the generator 72 may map indoor environment information acquired using various types of methods to map information to generate an indoor environment map.

For example, the indoor environment information may be acquired using at least one of at least one IoT device, the sensor module 67 built in the cleaning robot, and the sensor module mounted on the flight vehicle.

In one embodiment, various sensors capable of acquiring indoor environment information may be built in an IoT device. The sensors may include a temperature sensor, a humidity level sensor, a gas sensor, a dust sensor, a noise sensor, an illumination sensor, an odor sensor, a radon level sensor, and the like.

The temperature sensor refers to a sensor configured to detect temperature of an object or surrounding air. The temperature sensor may detect a temperature and convert the detected temperature into an electrical signal. The temperature sensor includes, according to a measurement method, a contact type temperature sensor that detects temperature on the basis of a resistance value that is changed or a voltage that is generated due to a temperature difference, and a non-contact type temperature sensor that emits IR energy radiated from a heat source, and the type of temperature sensor integrated in the sensor module is not limited.

The humidity level sensor refers to a sensor that uses physical and chemical phenomena of moisture present in the air to detect a humidity level. For example, according to a method in which a humidity level is detected, the humidity sensor includes a psychrometer sensor, a hair hygrometer sensor, a lithium chloride hygrometer sensor, and the like, and the type of humidity sensor integrated in the sensor module is not limited.

The gas sensor refers to a sensor that detects a specific chemical substance included in gas and detects gas concentration on the basis of the detected specific chemical substance. Specifically, the gas sensor refers to a sensor that detects a specific chemical substance included in gas to measure concentration and converts the measured concentration into an electrical signal in proportion to the concentration.

The gas sensor includes, according to a detection method, a type using a change in solid physical properties due to absorption or reaction of gas, a type using combustion heat, a type using an electrochemical reaction, a type using a physical property value, and the like, and the type of gas sensor integrated in the sensor module is not limited.

The dust sensor refers to a sensor that detects the amount of floating dust. For example, the dust sensor measures the amount of dust on the basis of a pattern of scattered light that is differently scattered due to the size of dust, includes a side-scattered light type and a near-IR front-scattered light type, and the type of dust sensor integrated in the sensor module is not limited.

The noise sensor refers to a sensor that measures a change in capacitance due to a sound pressure and detects the level of noise. The noise sensor includes, according to a detection method, a capacitive type and a piezoelectric type, and the type of noise sensor integrated in the sensor module is not limited.

The illumination sensor refers to a sensor that detects brightness of light, converts the detected brightness into an electrical signal, and measures the intensity of illumination on the basis of the electrical signal. For example, the illumination sensor may measure the intensity of illumination on the basis of an output current that changes according to the intensity of light.

The odor sensor refers to a sensor that detects an odor and digitizes the intensity of an odor and the degree of foul smell. Here, the odor sensor may generate a chemical reaction with a substance within an odor and output a value thereof as an electrical signal. The radon level sensor refers to a sensor that measures radon, which is an inert gas element that emits radiation. The sensors may also include other sensors capable of acquiring the indoor environment information and are not limited.

As described above, the sensor module 67 may be formed of sensor capable of acquiring the indoor environment information and a processor such as a MCU configured to process values output from the above-described sensors. Here, the sensor module 67 may be mounted on the cleaning robot 1h, mounted on the flight vehicle 68, or mounted on both the cleaning robot 1h and the flight vehicle 68.

As illustrated in FIG. 25, the generator 72 may receive environment information from an IoT device such as an air conditioner, receive environment information using the sensor module 67 mounted on the cleaning robot, or receive environment information from the sensor module mounted on the flight vehicle 68 to generate an indoor environment map. Here, to generate a more accurate indoor environment map, the generator 72 may combine pieces of indoor environment information acquired from the above-described devices.

For example, there may be a difference between pieces of indoor environment information received from the IoT device and the sensor module 67 built in the cleaning robot. In one embodiment, the indoor temperature may be measured as 26° C. by an air conditioner while being measured as 25° C. by the sensor module 67. Here, when an error between the pieces of indoor environment information acquired from the both devices is within a predetermined level, the generator 72 may select any one of the two pieces of information. However, when the error between the pieces of indoor environment information exceeds the predetermined level, the generator 72 may request for re-measurement of the indoor environment information. Here, the predetermined level may be set for each piece of environment information, determined by the user, or determined when the cleaning robot h1 is designed.

In another example, indoor environment information may be acquired from an IoT device, the sensor module 67 built in the cleaning robot, and the sensor module 74 mounted on the flight vehicle 68. Here, the generator 72 may control the flight of the flight vehicle 68 such that indoor environment information is acquired at an intermediate position between the IoT device and the cleaning robot 1h.

Here, the generator 72 may select a piece of indoor environment information determined to be the most accurate from among the three pieces of indoor environment information respectively acquired from the above devices and map the selected piece of indoor environment information to map information.

In one embodiment, the relationship between a value output from the IoT device, a value output from the sensor module 67 built in the cleaning robot 1h, and a value output from the sensor module 74 mounted on the flight vehicle 68 may be indicated as "value output from the IoT device<value output from the sensor module 74 mounted on the flight vehicle 68<value output from the sensor module 67 built in the cleaning robot 1h." The relationship between the output values may be indicated as "value output from the sensor module 67 built in the cleaning robot 1h<value output from the sensor module 74 mounted on the flight vehicle 68<value output from the IoT device."

Here, the generator 72 may select the value output from the sensor module mounted on the flight vehicle 68, which corresponds to an intermediate value, and map the selected output value to map information to generate indoor environment information.

In another example, the relationship between the output values may be indicated as "value output from the sensor module 74 mounted on the flight vehicle 68<value output from the sensor module 67 built in the cleaning robot 1h<value output from the IoT device."

Here, the generator 72 may select the value output from the sensor module 67 built in the cleaning robot 1h, which is closest to the value output from the sensor module 74 built in the flight vehicle 68, and generate indoor environment information on the basis of the selected output value. The generator 72 may perform the above-described processes for the parameters such as temperature information and odor information that constitute the environment information and select values determined to be the most accurate.

Accordingly, the indoor environment controller 73 may compare the indoor environment map acquired by the generator 72 and the desired information related to the indoor environment received from the user and perform a process of regulating the indoor environment. Here, the indoor environment controller 73 controls the indoor environment to be regulated in association with an IoT device as well as the cleaning robot.

For example, the indoor environment controller 73 transmits a control command to an air conditioner through a communication network and controls an operation of the air conditioner so that the indoor temperature desired by the user is reached. In another example, the indoor environment controller 73 transmits a control command to an indoor lamp and controls the intensity of illumination so that the indoor brightness desired by the user is achieved.

Alternatively, the indoor environment controller 73 controls the devices in the cleaning robot 1h to achieve an environment in which the amount of indoor dust or the humidity level is at a level desired by the user, and embodiments are not limited thereto. For example, at least one of the air purification module m, the humidification module n, and the dehumidification module o, which are shown in FIG. 1, may be built in the cleaning robot 1h. Accordingly, the indoor environment controller 73 may regulate the indoor environment so that the humidity level desired by the user is achieved using the humidification module n. Embodiments are not limited thereto. In one embodiment, when a desired humidity level set by the user is 40%, and the actual humidity level is 70%, the indoor environment controller 73 may lower the humidity level using the dehumidification module o.

That is, although the indoor environment controller 73 may lower the humidity level by controlling an operation of a dehumidifier located in the vicinity thereof through a communication network, because, as described above, the modular system may be applied to the cleaning robot 1h, and various modules may be integrally built therein, the humidity level may also be lowered using the dehumidification module o mounted on the cleaning robot 1h. The way in which the humidity level may be lowered is not limited.

Hereinafter, an operational flowchart of a cleaning robot that collects environment information and regulates the indoor environment will be described.

Figure 26:
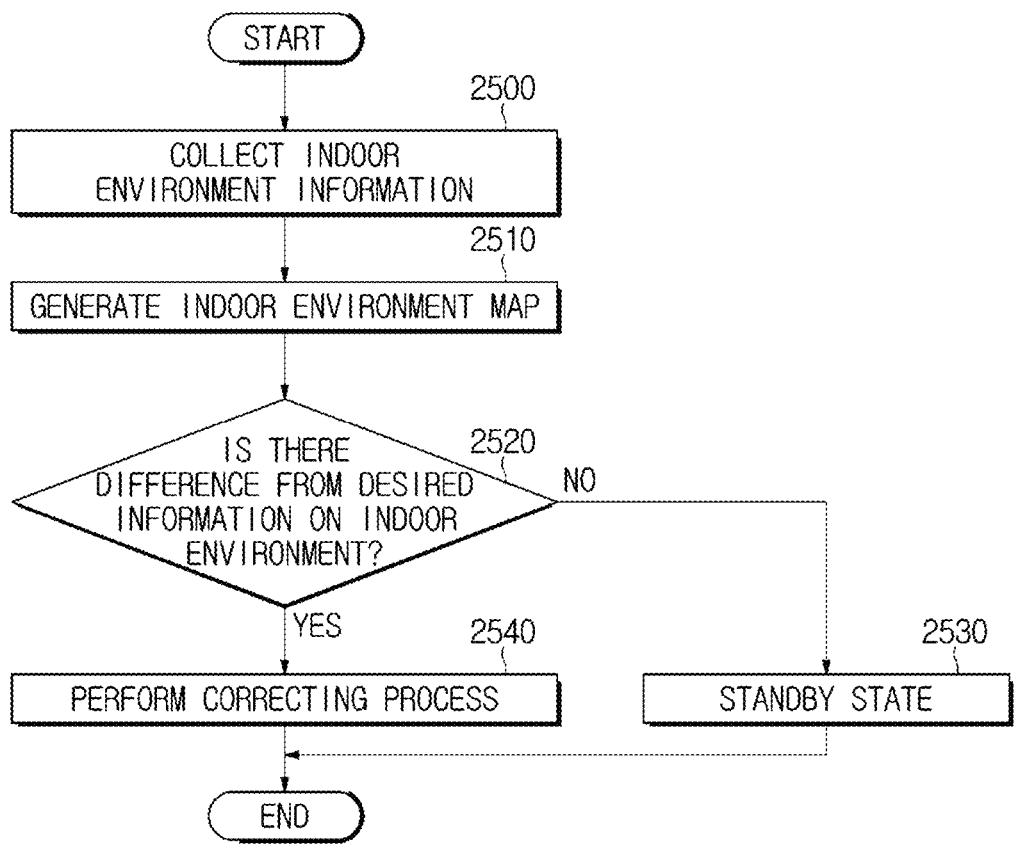
FIG. 26 is a view illustrating an operational flowchart of a cleaning robot that collects indoor environment information and regulates an indoor environment according to one embodiment.
Figure 27:
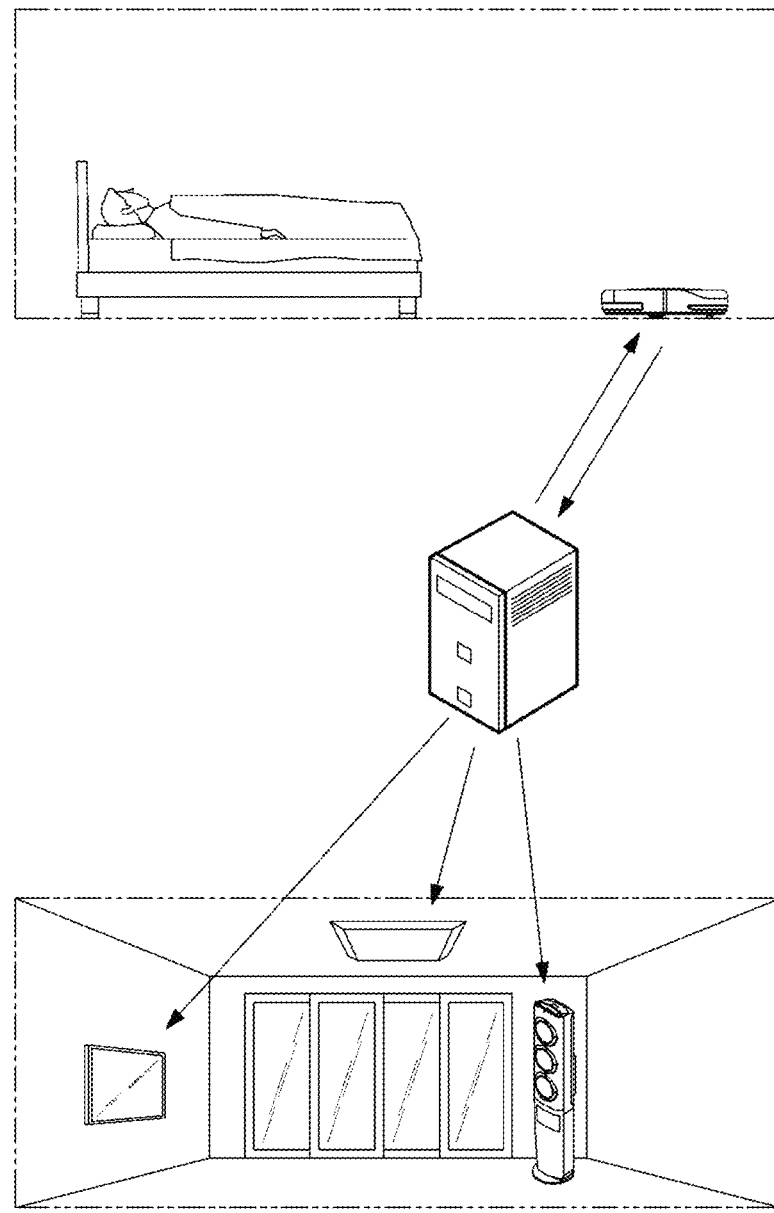
FIG. 27 is a view for describing a case in which a state of a user is detected and an indoor environment is regulated according to one embodiment.

FIG. 26 is a view illustrating an operational flowchart of a cleaning robot that collects indoor environment information and regulates the indoor environment according to an embodiment, and FIG. 27 is a view for describing a case in which a state of the user is detected and the indoor environment is regulated according to an embodiment.

The cleaning robot may collect indoor environment information using sensors capable of detecting the indoor environment (2500). The types of sensors include various sensors capable of detecting the indoor environment as described above and are not limited.

Here, the cleaning robot may collect environment information by using at least one of a sensor mounted on a main body, a sensor mounted on a flight vehicle, and a sensor mounted on an IoT device or combining the sensors.

By mapping the collected environment information to map information stored in the memory, the cleaning robot may generate an indoor environment map (2510). Accordingly, the cleaning robot may specifically recognize the current state of the indoor environment.

The cleaning robot may receive desired information related to the indoor environment from the user (2520). For example, the cleaning robot may receive desired information related to the indoor environment from an IoT device such as an input unit, a remote controller, and a user terminal. Here, when, as a result of recognizing from an environment map, the desired information related to the indoor environment is the same as the actual indoor environment or a difference therebetween is within the range of a predetermined level, the cleaning robot may switch to a standby state without performing a process of correcting the indoor environment (2530).

However, when the difference between the desired information related to the indoor environment and the actual indoor environment exceeds the range of the predetermined level, the cleaning robot may perform a correcting process so that the indoor environment is composed corresponding to the desired information related to the indoor environment.

Here, in addition to controlling the devices in the cleaning robot, the cleaning robot may control operations of IoT devices through a home network as illustrated in FIG. 27 and perform the correcting process (2540).

For example, the cleaning robot may perform a process of reducing dust or eliminating bacteria in the indoor space through a cleaning mode. As illustrated in FIG. 27, the cleaning robot may perform a process of decreasing or increasing the indoor temperature in association with an IoT device through the home network. Also, the cleaning robot may perform a process of decreasing or increasing the intensity of illumination in the indoor space in association with an indoor lamp through the home network. The method in which the indoor environment is regulated by manipulating the cleaning robot and an IoT device is not limited.

Hereinafter, a cleaning robot that performs an indoor security operation will be described.

Figure 28:
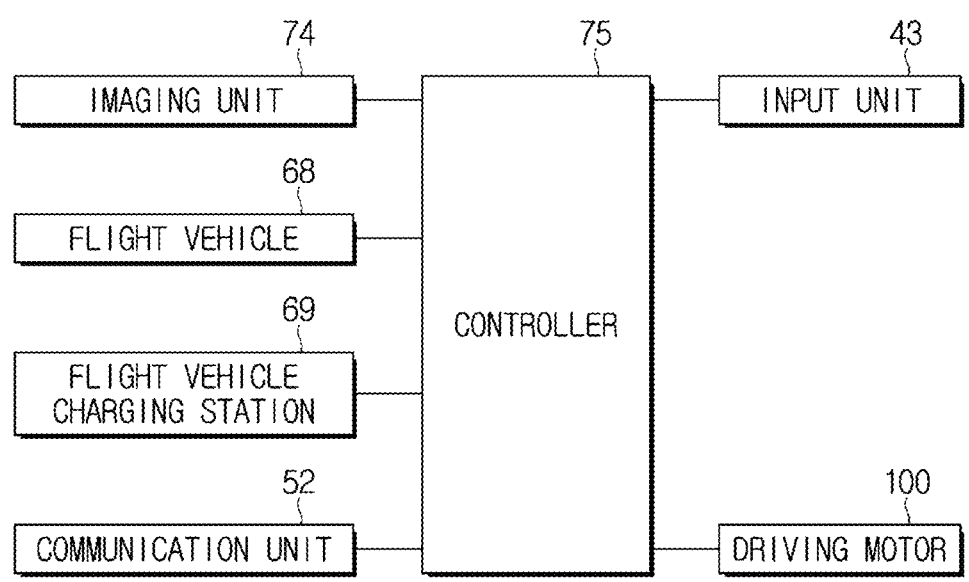
FIG. 28 is a view illustrating a control block diagram of a cleaning robot that acquires and provides indoor image information according to one embodiment.
Figure 34:
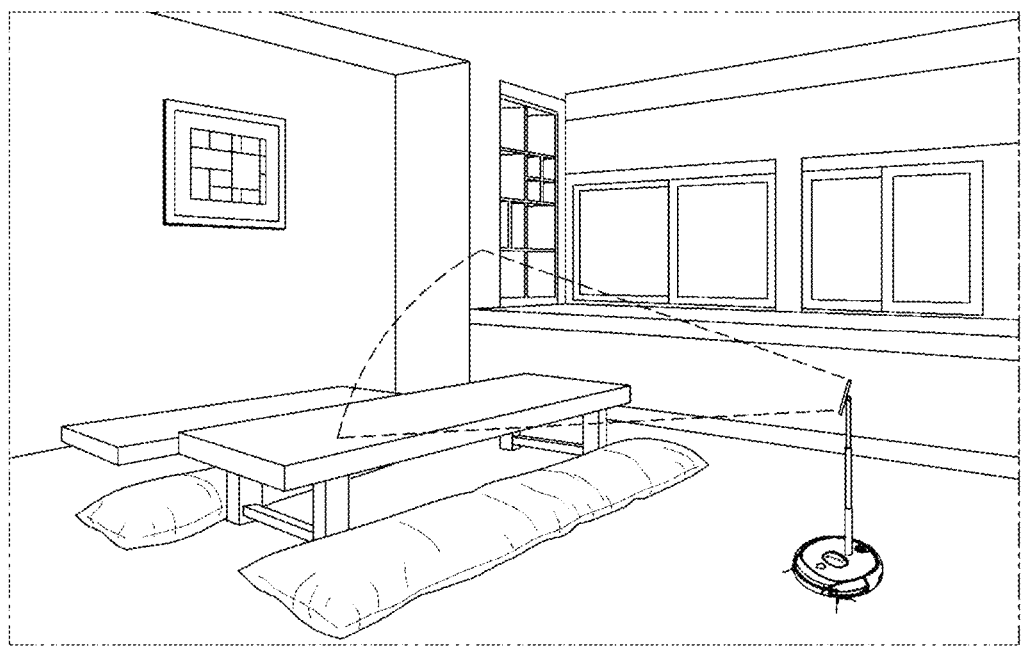
FIG. 34 is a view for describing a case in which image information is acquired by an imaging unit implemented in a bar shape according to one embodiment.
Figure 35:
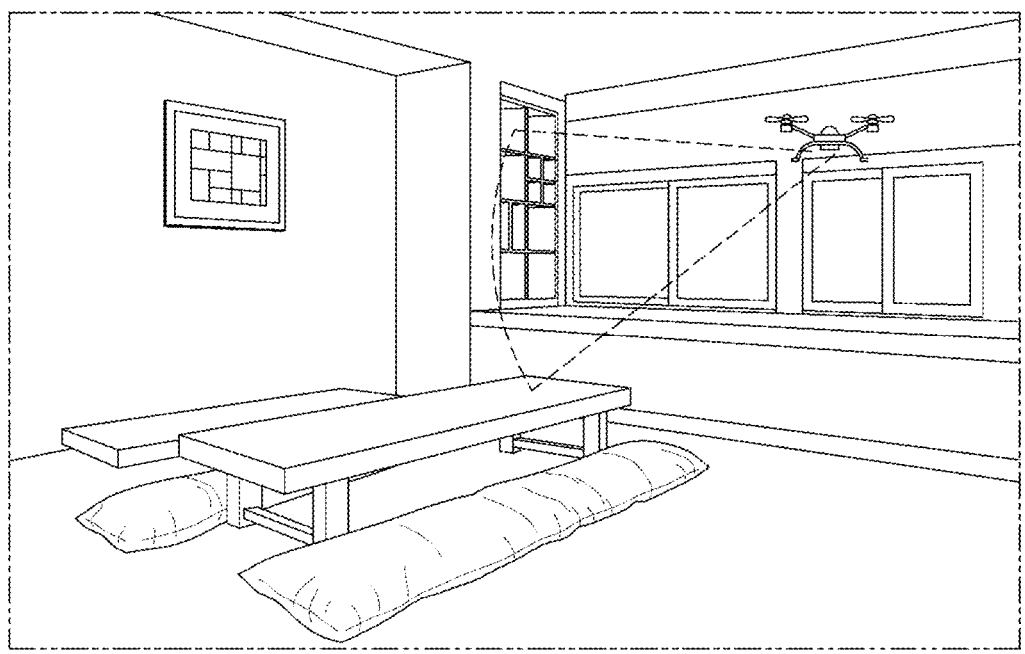
FIG. 35 is a view for describing a case in which image information is acquired by a flight vehicle according to one embodiment.

FIG. 28 is a view illustrating a control block diagram of a cleaning robot that acquires and provides indoor image information according to an embodiment, FIG. 29 is a view for describing a case in which image information is acquired according to a limited field of view according to an embodiment, and FIGS. 30A, 30B, 31, 32, 33A, 33B and 33C are views illustrating imaging units implemented according to different embodiments. FIG. 34 is a view for describing a case in which image information is acquired by an imaging unit implemented in a bar shape according to an embodiment, and FIG. 35 is a view for describing a case in which image information is acquired by a flight vehicle according to an embodiment.

Referring to FIG. 28, a cleaning robot 1i may include the input unit 43, the communication unit 52, the flight vehicle 68, the flight vehicle charging station 69, an imaging unit 74, and a controller 75. Here, at least one of the communication unit 52 and the controller 75 may be integrated in an SOC built in the cleaning robot 1i, but as described above, embodiments are not limited to at least one of the above being integrated in only one SOC.

The imaging unit 74 acquires image information in which a specific region is formed into an image. For example, the imaging unit 74 may be implemented by a camera module. The imaging unit 74 may be mounted on one surface of the cleaning robot 1i or mounted on the flight vehicle 68. The imaging unit 74 may be implemented in various forms and be mounted on one surface of the cleaning robot 1i or mounted on the flight vehicle 68.

Figure 29A:
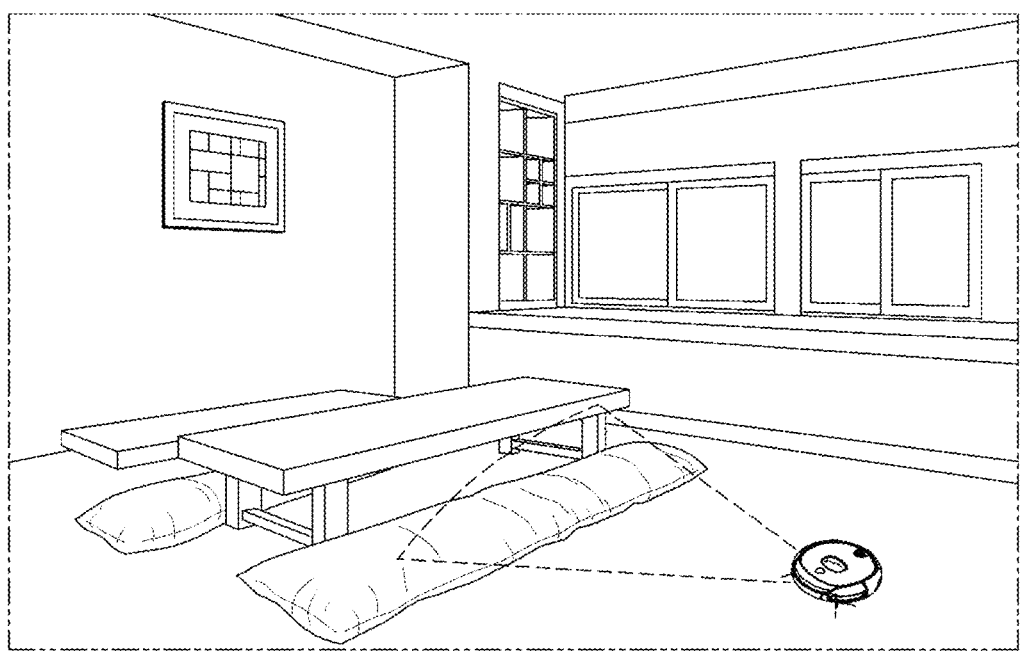
FIGS. 29A and 29B are views for describing a case in which image information is acquired according to a limited field of view according to one embodiment.
Figure 29B:
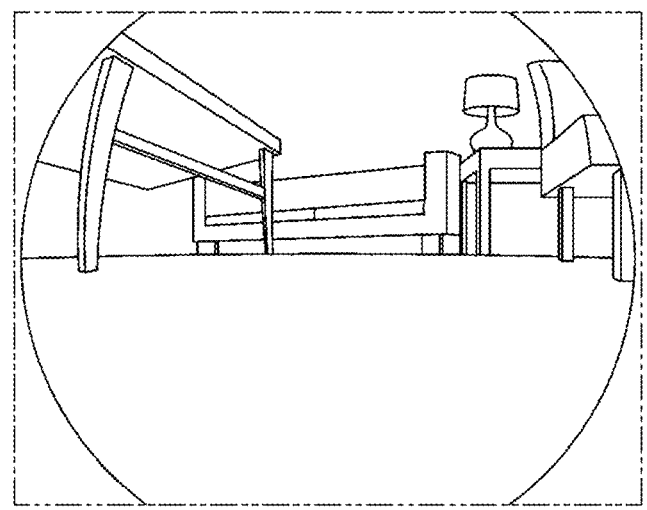

Here, when the height, the direction, or the like of the imaging unit 74 mounted on the cleaning robot 1i is not adjusted, only image information related to a limited area and field of view may be acquired as illustrated in FIGS. 29A and 29B. Therefore, hereinafter, the form in which the image information is implemented for image information desired by the user to be acquired will be described.

Figure 30A:
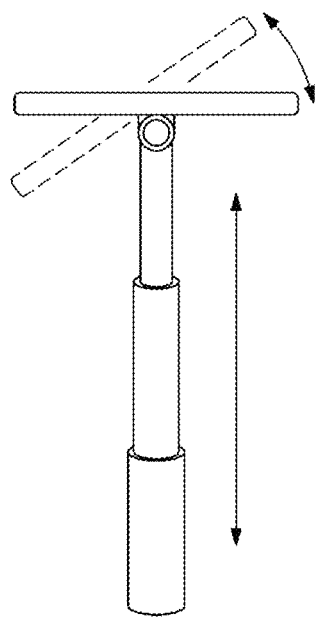
FIGS. 30A, 30B, 31, 32, 33A, 33B, and 33C are views illustrating imaging units implemented according to different embodiments.
Figure 30B:
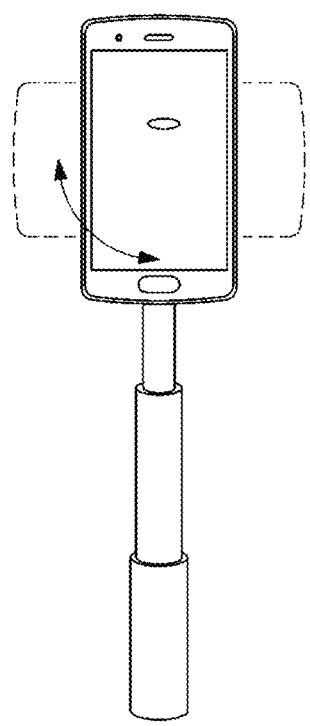

For example, as illustrated in FIGS. 30A and 30B, the imaging unit 74 is implemented in a bar shape and has four degrees of freedom. Here, the four degrees of freedom refers to decrees of freedom of height, rotation, slope, and tilting. Four motors may be built in the imaging unit 74 for the four degrees of freedom to be adjusted. A damper structure may be applied to the imaging unit 74 to prevent vibration that occurs when the cleaning robot moves.

Figure 31:
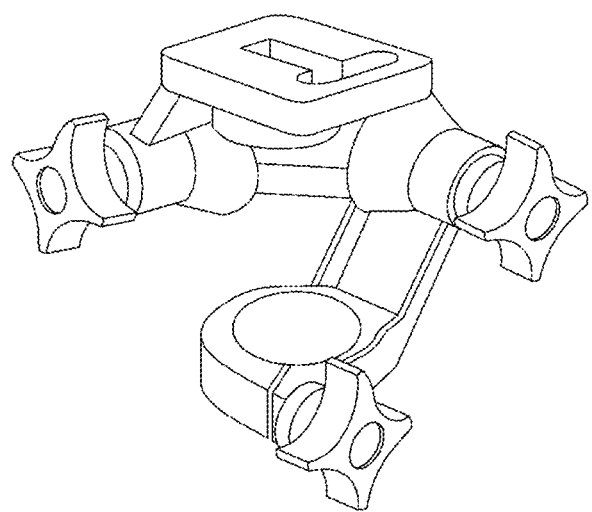

The imaging unit 74 may be implemented in the form in which a triangular support stand is attached to the bar. Referring to FIG. 31, the imaging unit may be implemented in the form in which the triangular support stand is attached to the bar and a camera is mounted in the support stand. Here, the support stand of the imaging unit 74 may be adjusted using an actuator.

Figure 32:
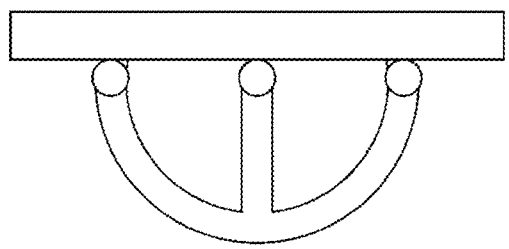

In another example, as illustrated in FIG. 32, the imaging unit 74 may be implemented using a tension method in which a wire is pulled. In this case, because a motor configured to pull a wire is disposed close to the main body of the cleaning robot, there is an advantage in that the volume and size of the imaging unit 74 may be reduced. Also, because the center of mass of the imaging unit 74 becomes closer to the cleaning robot, there is an advantage in that damage to the imaging unit 74 may be prevented.

Figure 33A:
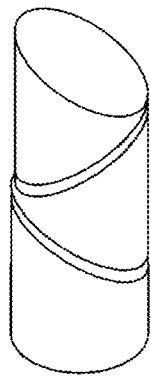
Figure 33B:
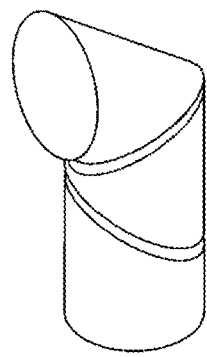
Figure 33C:
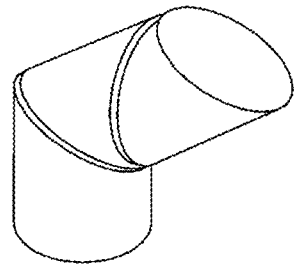

In still another example, as illustrated in FIGS. 33A, 33B, and 33C, the height, the slope, the rotation, and the tilting of the imaging unit 74 may be controlled by rotating two columns having asymmetrical slopes. The imaging unit 74 may also be implemented in various other forms to capture an image in various directions and heights and acquire image information, and is not limited to those illustrated in the drawings. That is, the imaging unit 74 may be implemented in various forms as described above and be mounted on at least one surface of the cleaning robot.

Referring to FIG. 34, image information may be acquired over a wider field of view by the imaging unit 74 implemented in a bar shape. However, when the imaging unit 74 is mounted on the cleaning robot 1*i*, the range in which the imaging unit 74 may be implemented is inevitably limited. Therefore, as illustrated in FIG. 35, the imaging unit 74 may be mounted on the flight vehicle 68. Referring to FIG. 35, the imaging unit 74 may be mounted on the lower end of the flight vehicle 68 and acquire image information while flying over the entire indoor space of the house.

The battery may be insufficient for the flight vehicle 68 to acquire image information while flying over the entire indoor space of the house. To complement this, the flight vehicle charging station 69 at which the battery built in the flight vehicle is charged is provided in the cleaning robot 1*h*, and the flight vehicle 68 may be charged. When the flight vehicle 68 is being charged, the cleaning robot 1*h* may move while the flight vehicle 68 is mounted thereon. The charging station 69 may charge the battery of the flight vehicle 68 by wired or wireless charging, and a method in which the battery of the flight vehicle 68 is charged is not limited.

Here, the controller 75 may transmit a guide signal such as an IR signal through an IR sensor, an ultrasonic signal, a beacon signal, and the like to the flight vehicle 68 and control the flight vehicle 68 to be seated on the flight vehicle charging station 69.

The imaging unit 74 may be connected to the controller 75, and the controller 75 may receive image information acquired by the imaging unit 74 and control the communication unit 52 to provide the received image information to the user. The communication unit 52 may be provided in the cleaning robot 1*i*. Here, because the communication unit 52 is the same as that described above, detailed description thereof will be omitted.

The communication unit 52 may transmit and receive a signal containing various pieces of data to and from a user terminal through a communication network. For example, by receiving a remote connection request from the user terminal and performing connection, the communication unit 52 allows the cleaning robot 1*i* and the user terminal to be connected to each other.

The communication unit 52 may also transmit and receive a signal containing data to and from the flight vehicle through a wireless communication network. For example, the communication unit 52 may transmit a control command to the flight vehicle through the wireless communication network. The communication unit 52 may receive image information from the imaging unit 74 mounted on the flight vehicle 68.

The controller 75 may control the overall operation of the cleaning robot 1*i*. Because general description on the controller 75 is the same as that given above, the general description will be omitted.

The controller 75 may control an operation of the imaging unit 74 using a control signal and control acquisition of image information. The controller 75 may also control the communication unit 52 using a control signal and transmit and receive data to and from an external device, the flight vehicle 68, and the like.

The controller 75 may control the devices in the cleaning robot 1*i* so that at least one operation that is being performed is stopped corresponding to a remote connection request from the user, using a control signal. For example, when the remote connection request is received from a user terminal, the communication unit 52 may connect to the user terminal through a communication network. The controller 75 stops an operation current being performed by using a control signal and controls the devices in the cleaning robot 1*i* according to a signal received from the user terminal so that an operation of acquiring image information is performed.

The controller 75 may control the operation of the driving motor 100 of the cleaning robot 1*i* and control the cleaning robot 1*i* to move to an area selected by the user. Alternatively, the controller 75 may control the operation of the flight vehicle 68 and control the flight vehicle 68 to move to an area selected by the user.

That is, the controller 75 may acquire image information on a region to be captured according to remote controlling of the user terminal in association with the controller 75 through the communication unit 52. Here, an application capable of controlling the operation of the cleaning robot 1*i* by being in association with the cleaning robot 1*i* may be stored in the user terminal. Here, the version of the application may be continuously updated. The update may be performed according to the user's request, an application distributor's request, or a predetermined cycle.

Accordingly, the user may input a manipulation command of the cleaning robot 1*i* by using an interface displayed on a display of the user terminal. The controller 75 may receive the manipulation command through the communication unit 52 and control the operation of the cleaning robot 1*i* corresponding to the received manipulation command.

Here, when another task is being performed, the controller 75 may stop the other task to perform capturing according to remote controlling of the user. The controller 75 may store performance information related to the other task in the memory and resume the task when the remote connection with the user terminal is completed.

As described above, the controller 75 may control the cleaning robot 1*i* according to the remote controlling input by the user through the application and perform capturing. Here, the user may directly order remote manipulation of the cleaning robot or set an area of interest through the user terminal.

For example, the user may set a capturing plan through the application. Map information acquired by a 3D sensor, a camera, or the like may be stored in the cleaning robot. The user terminal may receive the map information through the communication unit 52 and display an area of interest on the display. Then, the user may set the area of interest from the map information. Here, the user may reserve capturing the area of interest through the application in a specific time slot. The user may also set an area of interest through the application by priority.

For example, the user terminal may display map information on the display. The user terminal may set one or more sections selected by the user from among the displayed map information as an area of interest and transmit information thereon to the communication unit. Here, the user may also set a capturing height, a capturing angle, and a capturing time of the imaging unit. When a plurality of sections are selected, the user may also set the capturing order related to the plurality of sections. That is, the user terminal sets a capturing plan through an application by using various methods.

The controller 75 may reflect the capturing plan set by the user in controlling the operation of the cleaning robot 1i, acquire image information, and transmit the acquired image information to the user terminal. Accordingly, even when the user is outside, the user may receive the indoor image information.

In addition, the controller 75 may transmit the acquired image information to an IoT device in real time through the communication unit 52 and support a telepresence function. Here, the telepresence refers to a virtual video conference system between users. That is, the controller 75 may receive image information of another user from an IoT device through the communication unit 52 and display the received image information on the display 42. Accordingly, the cleaning robot according to the embodiment may provide various services such as teleconsultation through video connection with a doctor as well as a real-time conference.

Hereinafter, an operational flow of a cleaning robot that acquires indoor image information will be described.

Figure 36:
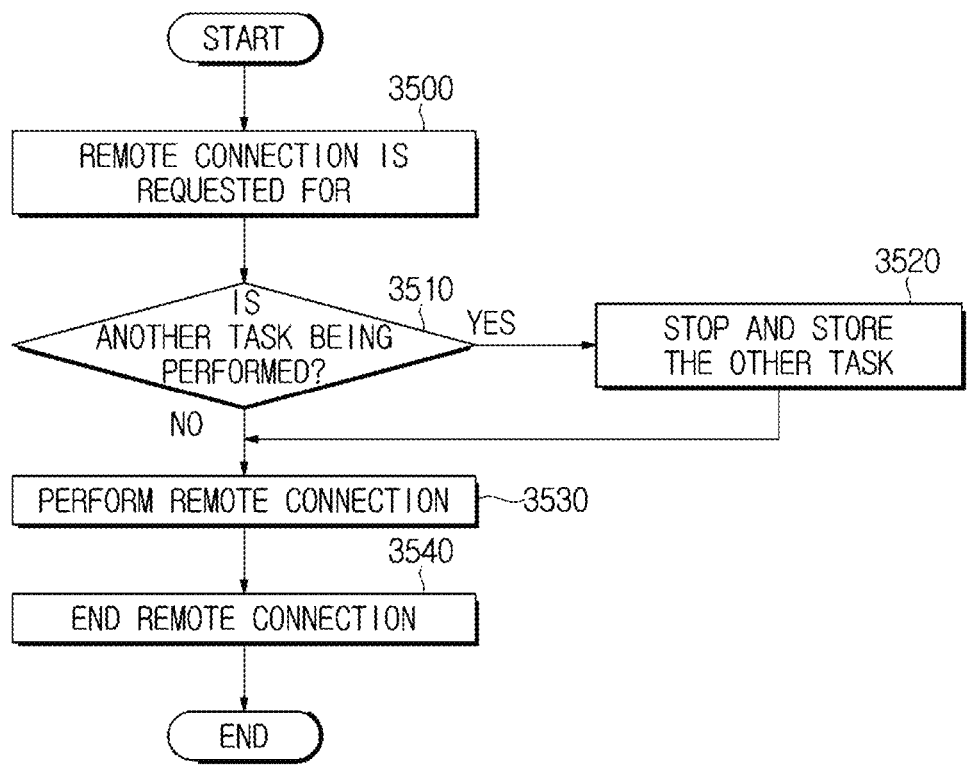
FIG. 36 is a view illustrating an operational flowchart of a cleaning robot that acquires image information through remote connection according to one embodiment.
Figure 37:
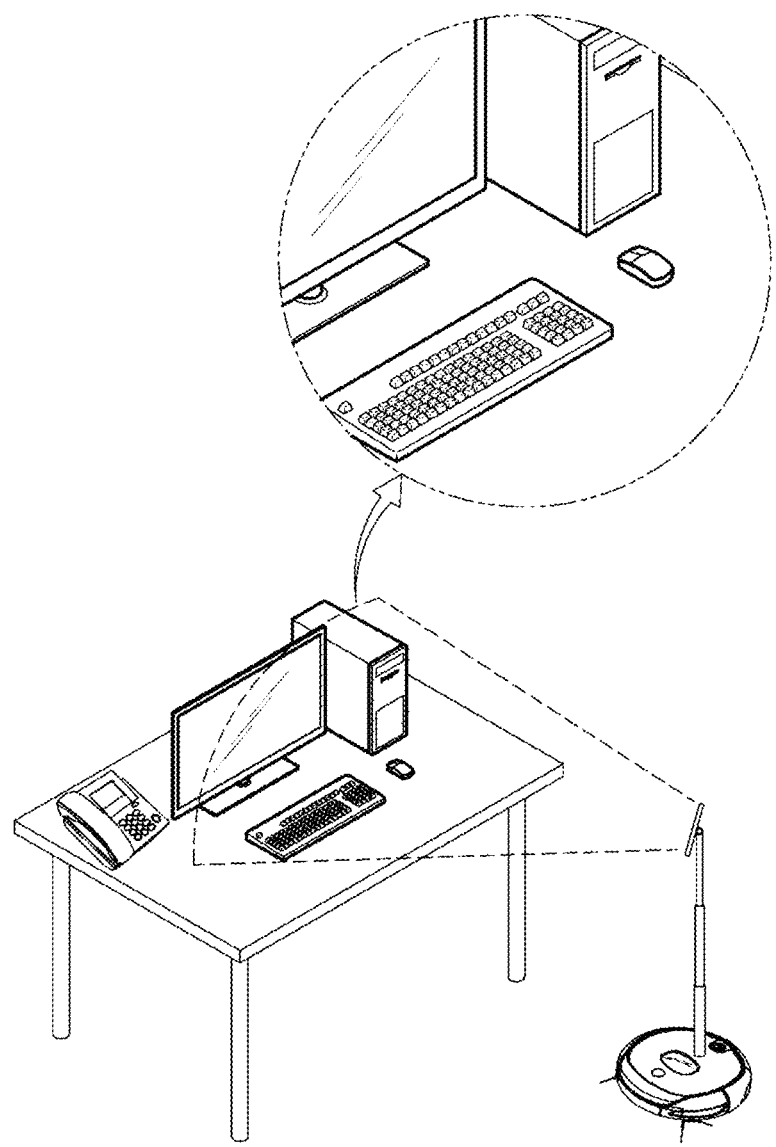
FIG. 37 is a view for describing a case in which image information of a desired region is acquired by an imaging unit implemented in a bar shape according to one embodiment.

FIG. 36 is a view illustrating an operational flowchart of a cleaning robot that acquires image information through remote connection according to an embodiment, and FIG. 37 is a view for describing a case in which image information of a desired region is acquired by the imaging unit implemented in a bar shape according to an embodiment.

The cleaning robot may receive a remote connection request from the user (3500). Here, the user may transmit the remote connection request to the cleaning robot through an IoT device such as a user terminal.

Here, according to whether the cleaning robot is performing another task, connection to the IoT device may be immediately performed or performed after stopping the other task (3510). For example, when another task such as a cleaning task is being performed, the cleaning robot may stop the task being currently performed and store a processing result of the task that was currently performed and information on a task that should be performed later (3520). Accordingly, after the remote connection of the user is ended, the cleaning robot may resume the stopped task without a separate command.

When there is no task being currently performed or a currently-performed task is stopped, the cleaning robot may perform remote connection with an IoT device through a communication network (3530). Accordingly, the cleaning robot may acquire image information related to a desired area according to remote controlling of the user and transmit the acquired image information. In addition to acquiring image information for indoor security, the user may also recognize a position to be checked through the image information and recognize where a left item is placed, as illustrated in FIG. 37.

Hereinafter, a cleaning robot that has a voice recognition module mounted therein and performs an indoor security operation will be described.

Figure 38:
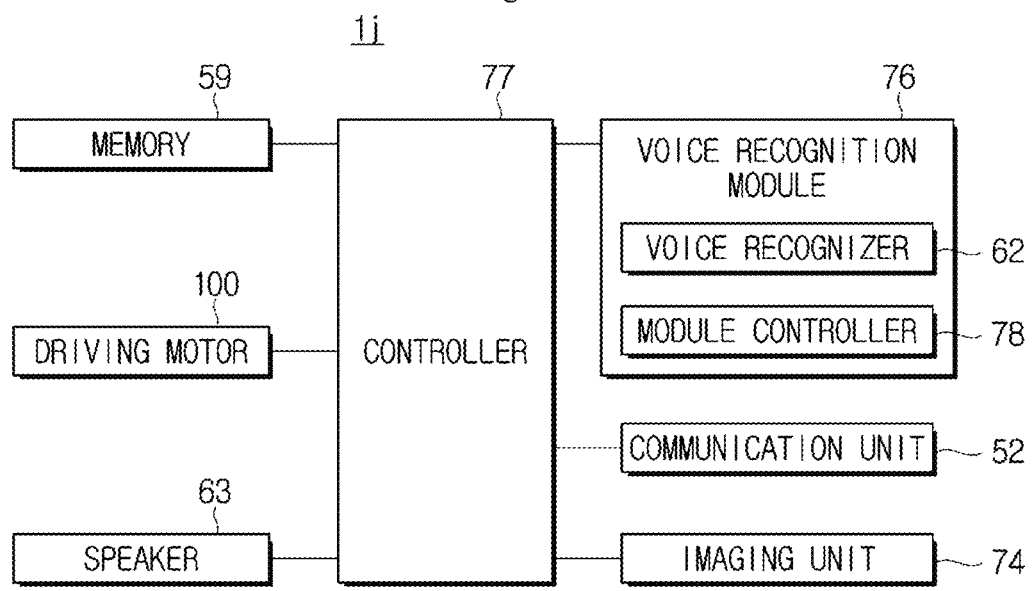
FIG. 38 is a view illustrating a control block diagram of a cleaning robot that detects sound and performs a process corresponding to the detected sound according one embodiment.

FIG. 38 is a view illustrating a control block diagram of a cleaning robot that detects sound and performs a process corresponding to the detected sound according an embodiment.

The communication unit 52, the memory 59, a voice recognition module 76, the imaging unit 74, a controller 77, and the driving motor 100 may be provided in a cleaning robot 1j. Here, at least one of the communication unit 52, the memory 59, and the controller 77 may be integrated in an SOC built in the cleaning robot 1j, but as described above, embodiments are not limited to at least one of the above being integrated in only one SOC.

The voice recognition module 76 may include the voice recognizer 62 configured to recognize voice and identify a point from which the recognized voice is generated, and a module controller 78 configured to control the overall operation of the voice recognition module 76.

The voice recognizer 62 may recognize voice. As described above, the voice recognizer may be implemented using a microphone and may convert received voice into an electrical signal. The voice recognizer 62 may derive a voice waveform or convert voice to text.

The voice recognizer 62 may identify a point from which voice is generated. For example, the voice recognizer 62 may be arranged in an array form and implemented using a microphone. Accordingly, the microphones arranged in the array form may recognize a direction in which voice is input when the voice is received and identify a point from which the voice is generated on the basis of the recognized direction.

The module controller 78 may control the overall operation of the voice recognition module 76. For example, the module controller 78 may derive a recognition result related to the voice recognized by the voice recognizer 62. Here, the module controller 78 may derive the recognition result through data stored in the memory or derive the recognition result through a voice recognition server disposed outside.

Arithmetic processing and a large amount of data are required to derive the recognition result related to the received voice. Therefore, the module controller 78 may be connected to the voice recognition server disposed outside through the communication unit and to transmit a voice waveform or text and receive a recognition result corresponding thereto.

Here, the external voice recognition server is a server that is present outside the cleaning robot, and may be a gate server of a home network or a server present outside the house, but is not limited thereto.

A recognition result corresponding to main voice may be stored in the memory 59. Accordingly, the module controller 78 may derive a recognition result related to the voice using the data stored in the memory 59 without requiring to be connected to the external voice recognition server through the communication unit. Accordingly, the cleaning robot 1j according to the embodiment may prevent overload of a communication network and more rapidly derive a recognition result.

The module controller 78 may store voice received by the voice recognizer 62 in the memory. Accordingly, the module controller 78 transmits the voice stored in the memory to the user terminal. This will be described in detail below.

A voice corresponding to each recognition result may be mapped and stored in the memory 59. For example, when a sound is determined as a sound of a doorbell as a result of recognition, the module controller 78 may output a voice saying "Who is it" through the speaker. Here, the voice may be the user's voice or a pre-stored voice of a person. That is, because a voice suitable for each situation is mapped and stored in the memory 59, the module controller 78 may output a voice suitable according to a situation through the speaker. That is, the module controller 78 may output a preset voice corresponding to a recognition result related to the voice. Here, the voice suitable for each of the situations may be preset when the cleaning robot 1j is designed, and stored in the memory.

The controller 77 may control the overall operation of the cleaning robot 1j. In addition to various types of modules built in the cleaning robot 1*j*, the controller 77 may control operations of all elements in the cleaning robot 1*j*, such as the speaker 63. The controller 77 may generate control signals for controlling the elements of the cleaning robot 1*j* and control the operation of each of the above-described elements.

For example, the controller 77 may control the speaker 63 and output a voice corresponding to a recognition result derived by the module controller 78. Further, the controller 77 may be linked to the communication unit 52 and transmit image information acquired by the imaging unit 74 to the user terminal.

The controller 77 may contact predetermined contact information on the basis of a recognition result derived by the module controller 78. Here, the predetermined contact information includes a phone number, an ID in a messenger application, or the like. That is, the controller 77 may make a wired phone call to a predetermined phone number, or send a message or make internet call through the messenger application. Here, the contact information may be set through the input unit of the cleaning robot 1*j* or through an application or the like installed in the user terminal.

Hereinafter, an operational flow of a cleaning robot that detects a sound and performs a process corresponding to the detected sound will be described.

Figure 39:
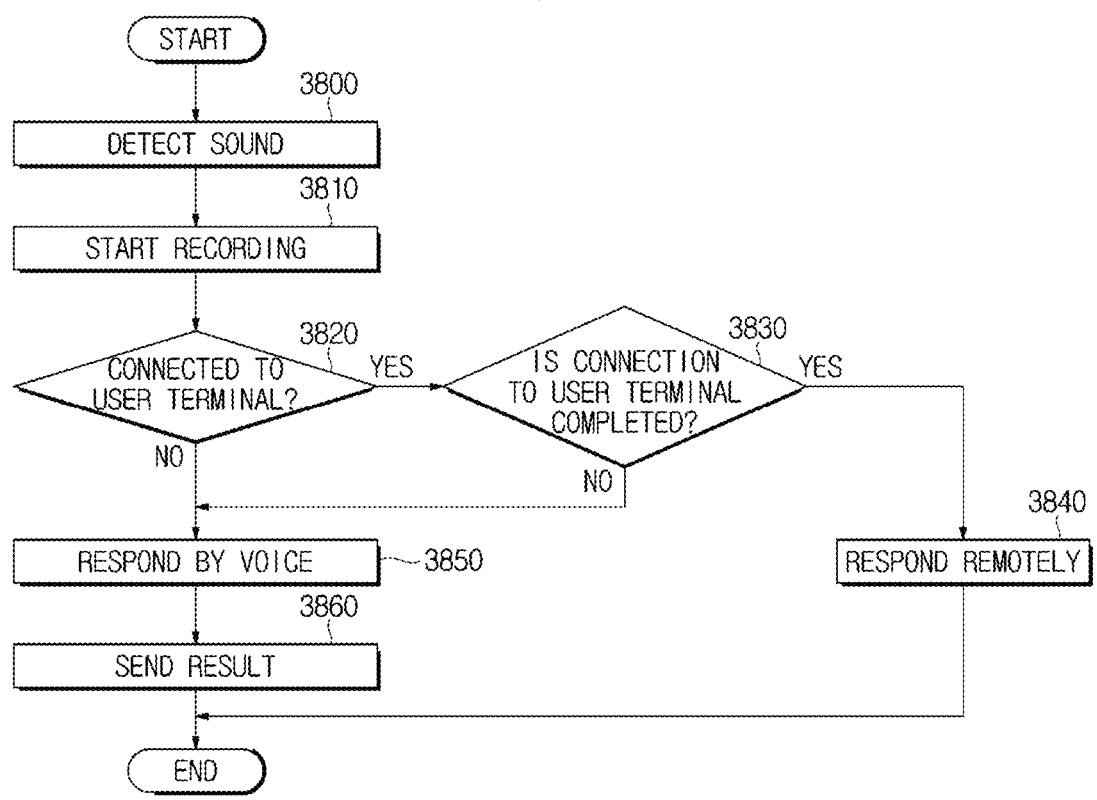
FIG. 39 is a view illustrating an operational flowchart of a cleaning robot that detects a sound and performs a process corresponding to the detected sound according to one embodiment.
Figure 40:
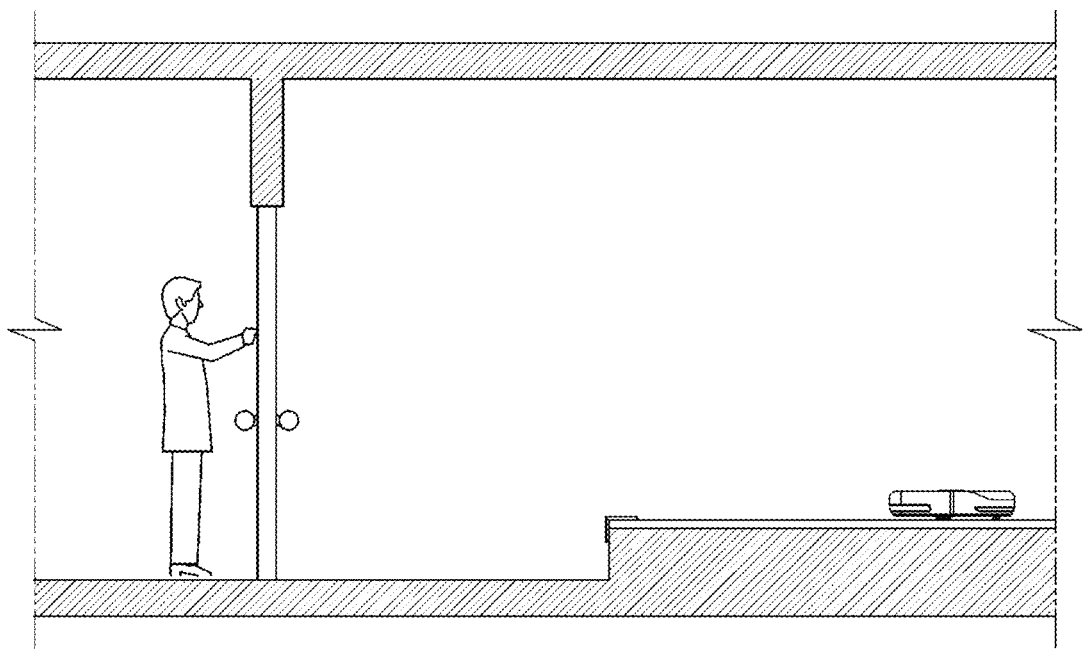
FIG. 40 is a view for describing an operation of a cleaning robot in response to a sound detected from a front door according to one embodiment.

FIG. 39 is a view illustrating an operational flowchart of a cleaning robot that detects a sound and performs a process corresponding to the detected sound according to an embodiment, and FIG. 40 is a view for describing an operation of the cleaning robot in response to a sound detected from a front door according to an embodiment.

The cleaning robot may detect a sound through the voice recognizer (3800). Here, the sound includes all sounds generated from various sound sources, such as noise, in addition to voice produced by the user.

Here, the cleaning robot may acquire direction information of the sound by the voice recognizer arranged in the array form. Accordingly, the cleaning robot may identify the direction information of the sound, i.e., the point from which the sound source is generated, and move to the vicinity of the above-mentioned point.

For example, as illustrated in FIG. 40, the cleaning robot may detect a sound generated from the front door. Accordingly, the cleaning robot may move to the vicinity of the front door, record the generated sound, and transmit the recorded sound to the user terminal through a communication network.

The cleaning robot may record the sound generated from the point to which the cleaning robot has moved by using the voice recognition module (3810). Accordingly, the cleaning robot may transmit the recorded data to the user terminal.

A response process of the cleaning robot may be different according to whether a remote response service is supported (3820). The remote response service corresponds to a service in which a remote response of the user is supported by remote connection with the user terminal. The support of the remote response service may be preset by the user or preset when the cleaning robot is designed.

In one embodiment, the cleaning robot may perform connection with the user terminal through a communication network (3830). Accordingly, when connection with the user terminal is completed, the cleaning robot may be operated according to a control command received from the user terminal. Accordingly, even when the user is present outside, the user may deal with emergency situation by remote response through the user terminal (3840).

When not being connected with the user terminal, the cleaning robot may be connected through the speaker built therein or a communication network and output predetermined voice through a speaker present in the indoor space (3850). Here, the output voice may be preset according to the type of sound or a point from which sound is identified. That is, by outputting a voice suitable for a situation, the cleaning robot may appropriately prepare for contingency.

Accordingly, by transmitting a result of response through the predetermined voice to the user terminal (3860), the cleaning robot may assist the user to recognize a state of the indoor space.

In addition to detecting sound by the voice recognition module and performing a process corresponding to the detected sound, the cleaning robot according to an embodiment may also detect the voice of the user to improve convenience of the user and provide a process corresponding to the detected voice.

Hereinafter, a cleaning robot that detects a degree of a state of the user and performs an operation suitable for the result of detection will be described.

Figure 41:
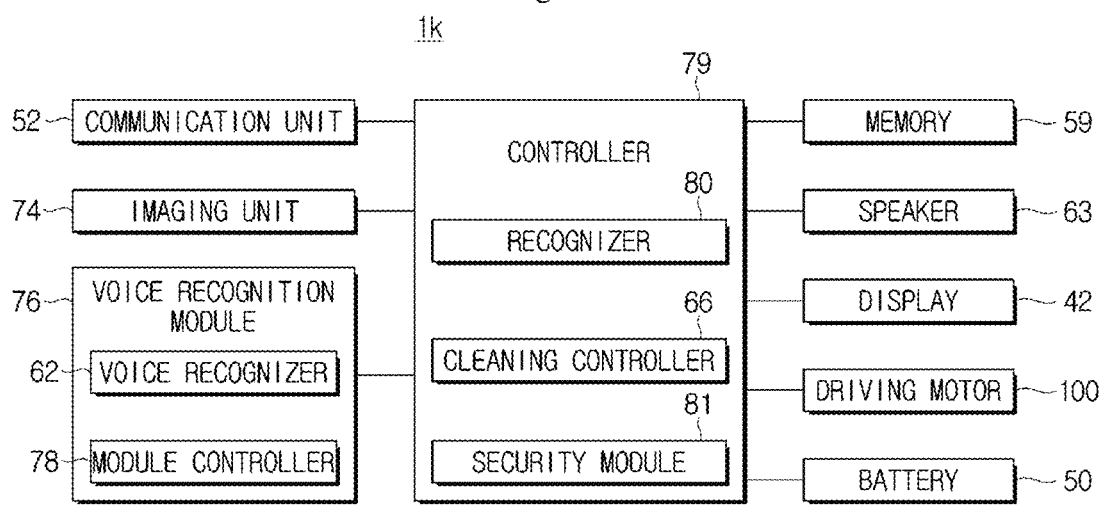
FIG. 41 is a view illustrating a control block diagram of a cleaning robot that performs a process corresponding to a voice recognition result according to one embodiment.
Figure 42:
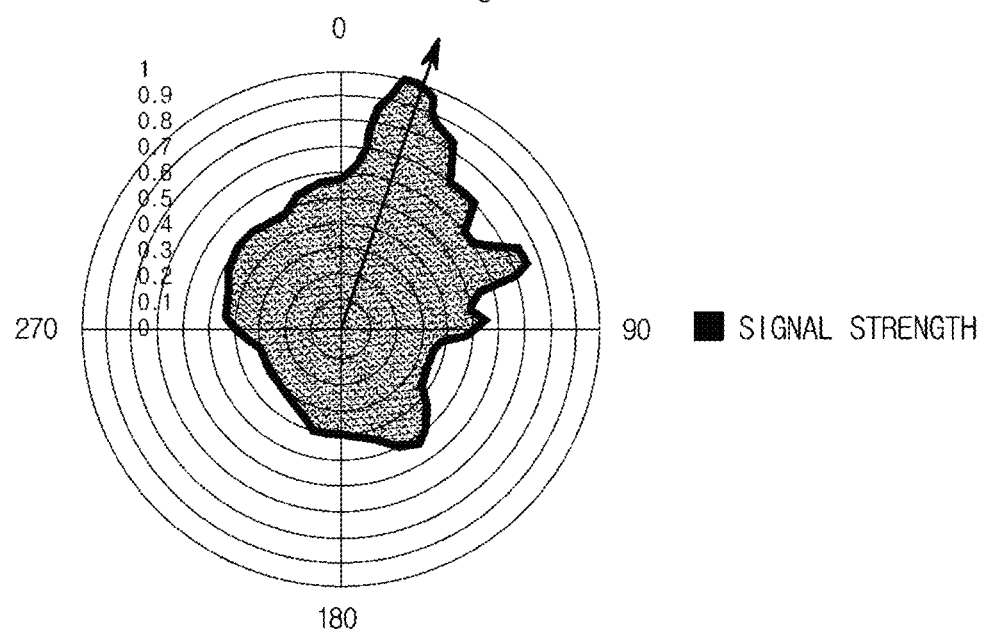
FIG. 42 is a view illustrating a radiation pattern output from an IoT device according to one embodiment.

FIG. 41 is a view illustrating a control block diagram of a cleaning robot that performs a process corresponding to a voice recognition result according to an embodiment, and FIG. 42 is a view illustrating a radiation pattern output from an IoT device according to an embodiment.

Referring to FIG. 41, a cleaning robot 1*k* includes the battery 50, the communication unit 52, the memory 59, the speaker 63, the imaging unit 74, the voice recognition module 76, the imaging unit 74, the display 42, a controller 79, and the driving motor 100. Here, the communication unit 52, the memory 59, the voice recognition module 76, and the controller 79 may be integrated in an SOC built in the cleaning robot 1*k*, and may be operated by a processor. However, because a plurality of SOCs may be built in the cleaning robot 1*k* instead of in only one SOC, embodiments are not limited to the above elements being integrated in only one SOC.

The controller 79 may control the overall operation of the cleaning robot 1*k*. Because general description on the controller 79 is the same as that given above, the general description will be omitted.

The controller 79 may include a cleaning controller 66 and a recognizer 80. The cleaning controller 66 may control the overall operation related to cleaning, and the recognizer 80 may receive a command from the user and recognize the position of the user.

The recognizer 80 may receive various types of call signals and recognize the position of the user from the call signals. Here, the call signal refers to a signal that calls the cleaning robot 1*k* for the user to transmit a command to the cleaning robot 1*k*. For example, the call signal includes a wireless signal transmitted from an IoT device such as a user terminal, in addition to the voice or motion of the user.

The recognizer 80 may recognize the user's call signal by being in association with the elements in the cleaning robot 1*k* and recognize the user's position. In one embodiment, the recognizer 80 may recognize the user's voice through the voice recognition module 76. Here, a voice used as a call signal may be preset and stored in the memory 59.

The recognizer 80 may identify a position of a sound source, i.e., the position of the user, by the voice recognizer 62 arranged in the array form, in addition to recognizing predetermined voice. Then, the controller 79 may control the driving motor 100 using a control signal and control the cleaning robot 1*k* to be moved to the vicinity of the point at which the user is present.

In another example, the recognizer 80 may detect the user's motion through the imaging unit 74 and recognize a call signal. Here, motion used as a call signal may be preset and stored in the memory 59. Accordingly, when the recognizer 80 recognizes a call signal, the controller 79 may derive the position of the user from the image information. Then, the controller 79 may control the driving motor 100 using a control signal and control the cleaning robot 1k to move to the vicinity of the point at which the user is present.

In still another example, the user may manipulate an IoT device such as a user terminal and transmit a wireless signal. Here, the recognizer 80 may recognize the position of the user who is manipulating the IoT device on the basis of the wireless signal received through the communication unit 52.

For example, when the communication unit 52 receives a wireless signal from an IoT device through the Bluetooth communication network, the recognizer 80 may calculate a radiation pattern radiated from an antenna of the IoT device. Radiation power is power emitted as the antenna radiates a signal and here, the radiation pattern refers to radiation power of the antenna of the IoT device being shown as a function of direction as signals are transmitted and received between the IoT device and the communication unit 52.

The recognizer 80 may use the radiation pattern and recognize a direction in which the IoT device is disposed. For example, in FIG. 42, the cleaning robot 1k is disposed at the center of the radiation pattern, and an IoT device that transmits a call signal is disposed in a direction of the radiation pattern at which the signal strength is the highest. Here, the signal strength refers to received signal strength indication (RSSI). Accordingly, when the recognizer 80 recognizes the position of the user from a call signal, the controller 79 may control the driving motor 100 using a control signal and control the cleaning robot 1k to move to the vicinity of the point at which the user is present. The recognizer 80 may also recognize a direction in which a wireless signal is output and a position thereof by using various other known methods, and the recognizer 80 is not limited by the above description.

The controller 79 may receive the user's voice through the voice recognition module 76 and provide a service corresponding to a recognition result related to the received voice. For example, in addition to a voice command related to cleaning performance, the controller 79 may receive a voice command or the like related to an IoT device and provide a service corresponding thereto. That is, in addition to operating the cleaning robot 1k according to a voice recognition result, the controller 79 may also transmit a control command to an IoT device through the home network and operate the IoT device.

Here, when the use of all services by all users is authenticated, a problem in terms of security may arise. Accordingly, a security module 81 may be provided in the controller 79 to limit use authority for each service.

The security module 81 may combine at least one of voiceprint recognition and voice recognition and perform security certification of a user. Here, the security module 81 may use at least one of the imaging unit 74 and the voice recognition module 76 to register at least one of voice and face for each user and set use authority for each user. The use authority, which is an authority related to a service that the user may receive, may be set together when at least one of voice and face of a user is registered at an initial stage and may be changed later through a security certification process.

The controller 79 may determine whether the user has an authority to receive a service corresponding to a recognition result related to the voice and determine whether to provide the service to the user on the basis of a determined result. Accordingly, when the user has the use authority, the controller 79 may provide the service corresponding to the voice recognition result.

When the user does not have the use authority, the security module 81 may register the use authority of the user through a security certification process. Here, the security certification process may be performed by at least one of the user's voice and voiceprint recognition.

For example, when the user requests for a schedule to be checked, the controller 79 may perform real-time mirroring with a schedule management application installed in the user terminal through the communication unit 52, recognize the user's schedule, and output the recognized schedule through the speaker 63. When the user transmits a request for a change to be made in schedule management, the controller 79 may recognize the request through the voice recognition module 76, reflect a change made by the user in the schedule management, transmit the schedule management to the user terminal to update the schedule management.

In another example, when the user transmits a request for a change to be made in an alarm time, the controller 79 may recognize the request and transmit information on a change to a wearable device through the communication unit 52 to change a setting of an alarm application installed in the wearable device. Embodiments are not limited thereto.

Hereinafter, an operational flow of the cleaning robot that performs the security certification process will be described.

Figure 43:
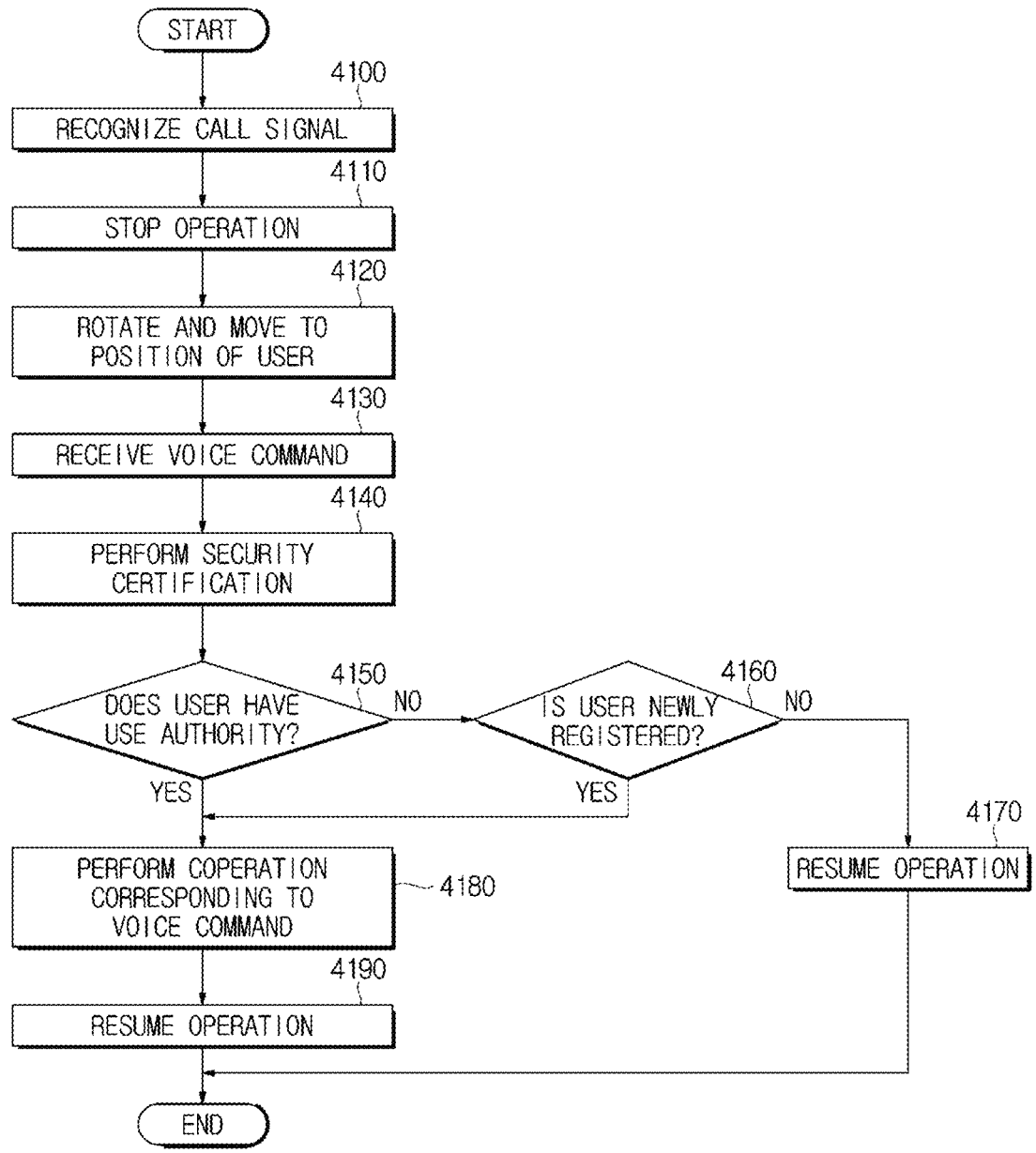
FIG. 43 is a view illustrating an operational flowchart of a cleaning robot that is operated after going through security certification according to one embodiment.
Figure 44:
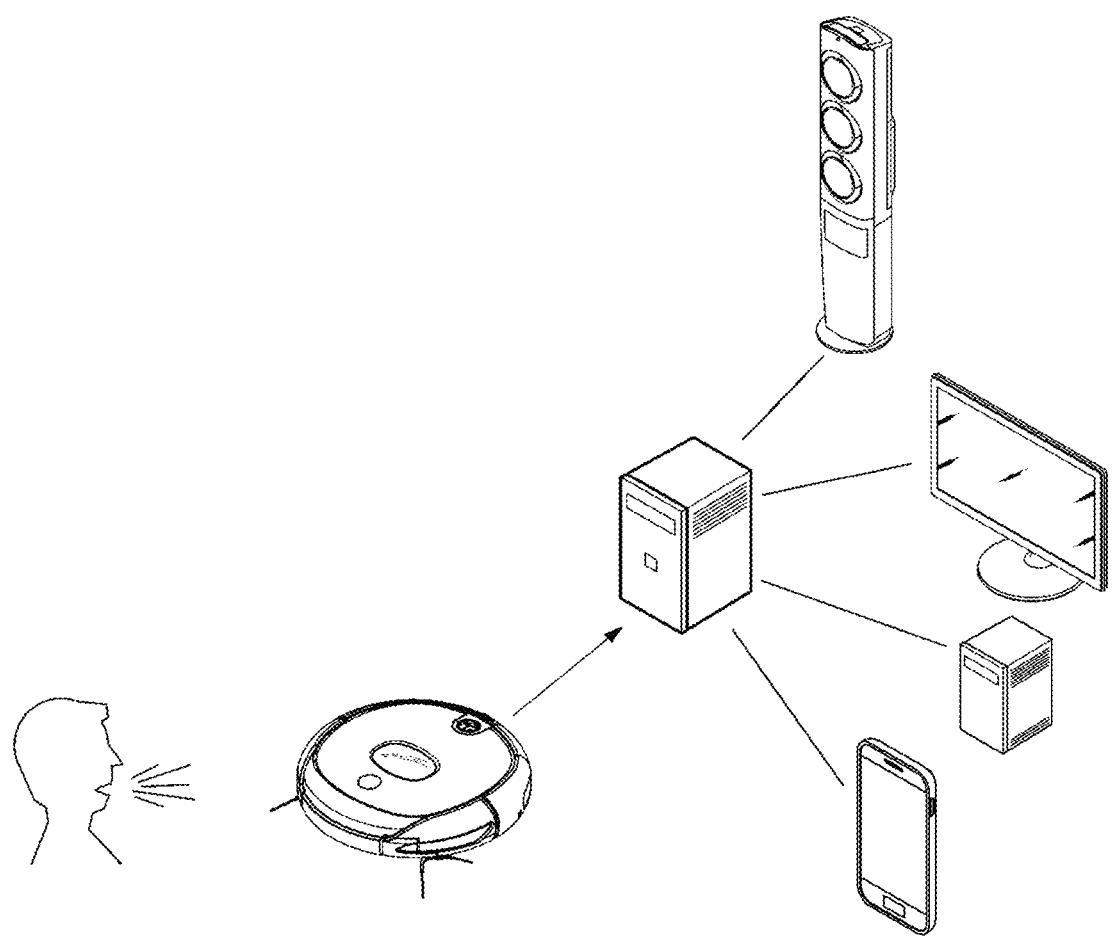
FIG. 44 is a view for describing a case in which a cleaning robot and an IoT device are controlled by receiving a voice command from a user according to one embodiment.

FIG. 43 is a view illustrating an operational flowchart of a cleaning robot that is operated after going through security certification according to an embodiment, and FIG. 44 is a view for describing a case in which the cleaning robot and an IoT device are controlled by receiving a voice command from the user according to an embodiment.

The cleaning robot may recognize a call signal (4100). The user may transmit various types of call signals to transmit a voice command to the cleaning robot, and the cleaning robot may recognize the call signal.

For example, the call signal includes a wireless signal of an IoT device in addition to the voice and motion of the user. Here, when a call signal is recognized, the cleaning robot may stop an operation being performed (4110), and store a processing result and the like related to the operation to resume the operation later.

When the cleaning robot recognizes a call signal, because the cleaning robot needs to approach the user and receive a voice command, the position of the user needs to be identified. Here, by recognizing the user's voice using the voice recognizer arranged in the array form, the cleaning robot may recognize the position of the user. In another example, the cleaning robot may recognize motion of the user through the imaging unit and recognize the position of the user. As described above, the cleaning robot may recognize the position of the user on the basis of the strength of a signal radiated by an antenna of an IoT device. The position of the user may be recognized using various known methods.

Accordingly, the cleaning robot may rotate and move toward a position at which the user's voice may be recognized (4120). When the cleaning robot reaches a position at which the user's voice may be recognized, the cleaning robot may output voice requesting for a voice command to be input through the speaker or display a pop-up message the requests for a voice command to be input through the display.

The cleaning robot may receive a voice command from the user through the voice recognition module (4130). Here, the cleaning robot may use data stored in the memory to derive a voice recognition result corresponding to the voice command from the user or transmit a voice command to an external server, and may receive the voice recognition result corresponding to the voice command from the user.

Here, the cleaning robot may perform security certification to determine whether the user has an authority to use a service corresponding to the voice recognition result (4140). Here, the cleaning robot may set a service use authority for each user to prevent personal services from being provided to many unspecified persons and prevent the many unspecified persons from indiscreetly viewing personal information. For example, when the user desires to view a personal schedule and the like stored in the user terminal by a voice command, the cleaning robot may perform security certification to check whether the user has a use authority related to viewing the personal schedule and protect privacy.

When it is determined that the user has a use authority (4150), the cleaning robot may perform an operation corresponding to the voice command and provide the service to the user (4180). Here, as illustrated in FIG. 44, in addition to providing a service through the cleaning robot, the cleaning robot may provide a service through an IoT device connected through the home network. When the operation is completely performed, the cleaning robot may resume the operation that was previously stopped (4190).

When it is determined that the user does not have a use authority (4160), the cleaning robot may perform a registration process. Accordingly, when the use authority is registered, the cleaning robot may perform operation corresponding to the voice command and provide the service to the user. When the use authority is not registered, the cleaning robot may not provide the service corresponding to the voice command and resume the previously stopped operation (4170).

Hereinafter, a cleaning robot that determines a state of the user according to biometric information of the user and performs a process corresponding to a determined result will be described.

Figure 45:
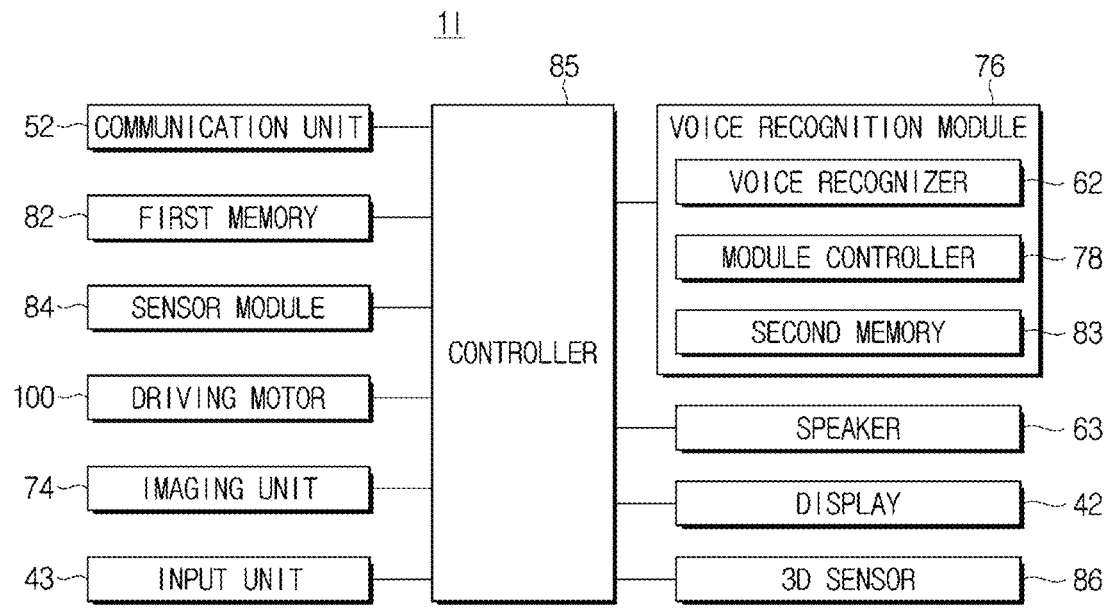
FIG. 45 is a view illustrating a control block diagram of a cleaning robot that determines a state of a user on the basis of biometric information of the user according to one embodiment.
Figure 46:
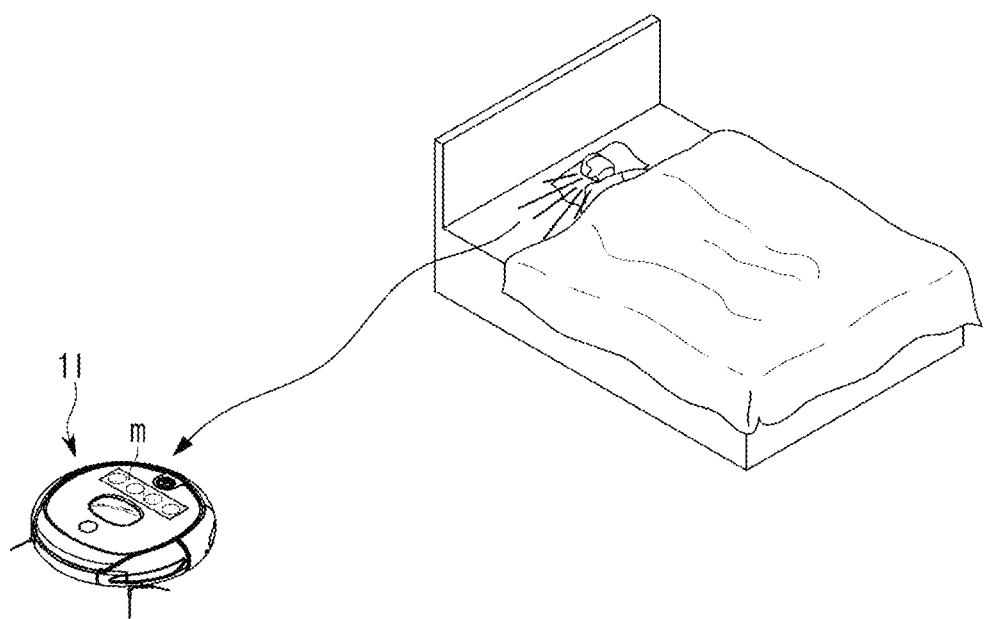
FIG. 46 is a view for describing a case in which a voice command is received from a user through voice recognizers arranged in an array form according to one embodiment.

FIG. 45 is a view illustrating a control block diagram of a cleaning robot that determines a state of the user on the basis of biometric information of the user according to an embodiment, and FIG. 46 is a view for describing a case in which a voice command is received from the user through the voice recognizer arranged in the array form according to an embodiment.

A cleaning robot 1*l* includes the display 42, the input unit 43, the communication unit 52, the imaging unit 74, the voice recognition module 76, the speaker 63, a first memory 82, a sensor module 84, a controller 85, a 3D sensor 86, and the driving motor 100. Here, the communication unit 52, the voice recognition module 76, the first memory 82, the sensor module 84, and the controller 85 may be integrated in an SOC built in the cleaning robot 1*l*, and may be operated by a processor. However, because a plurality of SOCs may be built in the cleaning robot 1*l* instead of in only one SOC, embodiments are not limited to the above elements being integrated in only one SOC.

The voice recognition module 76 may include the voice recognizer 62, the module controller 78, and a second memory 83. Here, as described above, the voice recognizer 62 may be implemented by a microphone arranged in the array form. Accordingly, the voice recognizer 62 may identify a point from which a voice is generated. In a specific example, referring to FIG. 46, a microphone m arranged in the array form may be mounted on one side surface of the cleaning robot 1*l*. Accordingly, the microphone m arranged in the array form may recognize a direction in which the voice is input when the voice is received and identify a point from which the voice is generated on the basis of the recognized direction.

Here, the module controller 78 may control the overall operation of the voice recognition module 76. Because general description on the module controller 78 is the same as that given above, the general description will be omitted.

The module controller 78 may analyze the user's voice received by the voice recognizer 62 and detect an abnormal symptom. For example, the module controller 78 may analyze the user's voice and determine whether the user is in an emergency situation, is asking for help, is screaming, or the like. Here, the user's voice is recorded in the second memory 83 of the module controller 78, or data related to a voice pattern that generally changes when the user is in an emergency situation is stored in the second memory 83 of the module controller 78. Accordingly, the module controller 78 may detect whether an abnormal symptom occurred to the user even without being in association with an external server. Embodiments are not limited to the above, and the module controller 78 may also derive an analysis result related to a voice through the voice recognition server and detect an abnormal symptom.

When an abnormal symptom is detected from the user, the controller 85 may control the operation of the driving motor 100 and control the cleaning robot to move to a point identified as a position at which the user is present. The operation related to the controller 85 will be descried below.

The sensor module 84 may acquire biometric information of the user. Here, the sensor module 84 may be formed of at least one sensor capable of acquiring various pieces of information related to the living body of the user such as a heartbeat, a body temperature, and motion of the user and a processor such as a MCU configured to control operations of the above-described sensors. The sensor module 84 may acquire biometric information of the user and transmit the acquired biometric information to the controller 85.

The communication unit 52 may transmit and receive data to and from an external device through a communication network. Because general description on the configuration of the communication unit 52 is the same as that given above, the general description will be omitted.

The input unit 43 may receive various types of control commands related to the cleaning robot from the user. Here, the input unit 43 may be provided in a dial form at one surface of the cleaning robot. Alternatively, when the display 42 is implemented as a touchscreen type, the display 42 may serve as the input unit 43.

The first memory 82 may be provided in the cleaning robot 1*l*. Here, the first memory 82 may be implemented as a single memory together with the second memory 83, but embodiments are not limited thereto.

Data for determining a degree of a state of the user according to the biometric information is stored in the first memory 82. For example, biometric information of the user acquired at ordinary times by the sensor module 84 may be stored in the first memory 82. In another example, average state information by age or by age group may be stored in the first memory 82. Here, age information of the user received from the user through the above-described input unit 43 may also be stored in the memory 82. In addition, various pieces of data required to determine a degree of a state of the user are stored in the first memory 82.

Response plans according to degrees of states are stored in the first memory 82. Here, the response plans refer to response plans using at least one of an operation performed by the cleaning robot 1*l* and an operation of at least one IoT device connected through the home network according to a degree of a state of the user.

The controller 85 may control the overall operation of the cleaning robot 1*l*. Specifically, the controller 85 may control operations of all elements in the cleaning robot 1 such as the display 42 and the speaker 63 in addition to the various types of modules built in the cleaning robot 1*l*. The controller 85 may generate control signals for controlling the elements of the cleaning robot 1*l* and control operations of each of the above-described elements.

The controller 85 may use biometric information of the user to determine a degree of a state of the user. For example, the controller 85 may compare biometric information of the user at ordinary times stored in the first memory 82 with biometric information of the user acquired by the sensor module 84 and determine a degree of a state of the user according to a degree of change. In another example, the controller 85 may compare acquired biometric information of the user with that of a general user and determine a degree of a state of the user in stages according to a degree of change.

As described above, state information by age or by age group may be stored in the first memory 82. The cleaning robot 1*l* may receive an age of the user through the input unit 43. Accordingly, the controller 85 may compare the state information by age with the state information acquired by the sensor module and determine a degree of a state of the user.

Biometric history information input by the user may be stored in the first memory 82. Here, the biometric information refers to information on a chronic disease, anything significant, medical history that each user has. In one embodiment, the user may input his or her biometric history information through the input unit 42 or an application installed in the user terminal.

The controller 85 may control devices in the cleaning robot 1*l* on the basis of a response plan corresponding to a determined degree of a state. The controller 85 according to an embodiment may set response plans in stages according to degrees of states to provide a response currently appropriate to the user and allow the user to avoid an emergency situation.

For example, when a change in the user's body is detected as a result of determining a degree of a state, the controller 85 may control the speaker 63 and output a voice that asks the user about his or her current state. Accordingly, the controller 85 may select any one of response plans stored in the first memory 82 on the basis of a result of recognizing the user's voice input through the voice recognizer 62 and control the operation of the cleaning robot 1*l* according to the selected response plan.

Alternatively, the controller 85 may select a response plan according to a result of determining a degree of a state and control the operation of the cleaning robot 1*l* according to the selected response plan. In one embodiment, according to whether a state of the user exceeds a predetermined level by a certain degree as a result of determining a degree of a state, the controller 85 may be linked to a home network server through the communication unit 52 and control operations of various IoT devices present in the indoor space.

For example, when body temperature of the user exceeds a predetermined first level, the controller 85 turns on an air conditioner in association with the home network server and allows wind at suitable temperature to be blown by the air conditioner. In another example, when body temperature of the user exceeds a predetermined second level, the controller 85 may control on/off of a lamp in association with the home network server, and notify of an emergency situation to the outside by siren and request for help. In still another example, when body temperature of the user exceeds a predetermined third level, the controller 85 may attempt contacting predetermined contact information or send a short message service (SMS) message or an instant message.

Alternatively, when body temperature exceeds a predetermined fourth level, the controller 85 may freely deal with the situation according to a response plan stored in the first memory 82, e.g., perform all of the above-described operations. Here, the response plan may be preset by the user or when the cleaning robot 1*l* is designed. The response plan may be updated through the communication unit 52.

Even when an abnormal symptom is not detected, the controller 85 may control the sensor module 84 according to a predetermined cycle and periodically acquire biometric information of the user. Here, the predetermined cycle may be preset by the user or when the cleaning robot 1*l* is designed.

The controller 85 may use various types of devices capable of detecting the user, such as the imaging unit 74 or the 3D sensor 86, to recognize a position of the use, and control the driving motor for the cleaning robot 1*l* to move to the vicinity of the point at which the user is present. Accordingly, the controller 85 may determine a state of the user from the biometric information acquired by the sensor module 84 and, when the state is determined as normal, the controller 85 may store the acquired biometric information and acquired time information in the memory.

In one embodiment, the controller 85 may map time information, which is related to the time at which the biometric information is acquired, to the acquired biometric information, generate log data, and store the log data in the memory. The log data may also be stored in an external server instead of being stored only in the first memory 82, and the location in which the log data is stored is not limited.

Hereinafter, an operational flow of a cleaning robot in which response plans are set according to degrees of states of the user will be briefly described.

Figure 47:
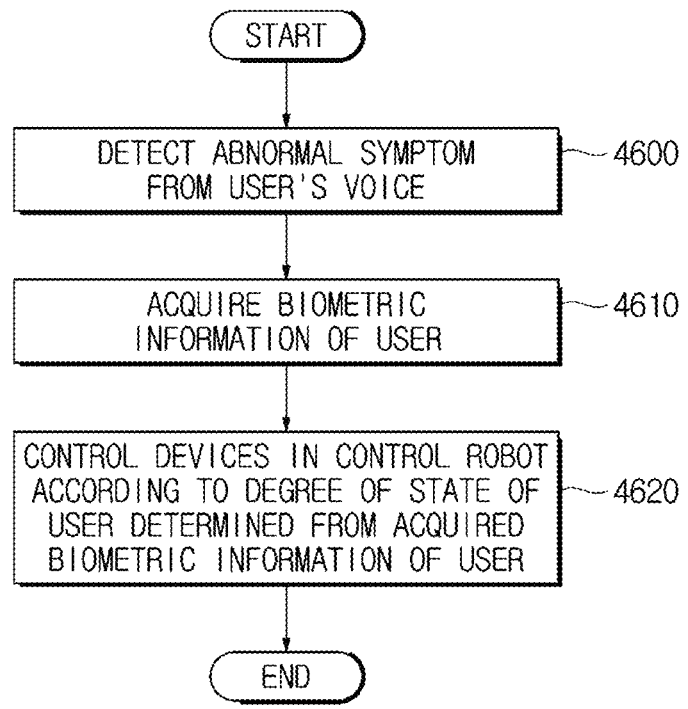
FIG. 47 is a view illustrating an operational flowchart of a cleaning robot that is operated according to a state of a user determined on the basis of biometric information of the user according to one embodiment.

FIG. 47 is a view illustrating an operational flowchart of a cleaning robot that is operated according to a state of the user determined on the basis of biometric information of the user according to an embodiment.

Referring to FIG. 47, the cleaning robot may detect an abnormal symptom from the user's voice (4600). For example, the cleaning robot may compare voice of the user at ordinary times stored in the memory with voice of the user input through the microphone arranged in the array form and, and detect occurrence of an abnormal symptom when a significant change occurs in a voice waveform. Alternatively, information on an average voice waveform when an abnormal symptom occurs may be pre-stored in the cleaning robot, and the cleaning robot may detect occurrence of an abnormal symptom on the basis of the above-mentioned information stored in the memory.

In one embodiment, information on an abrupt voice and a voice waveform when asking for help may be stored in the memory. That is, information on main features of a voice waveform when an abnormal symptom occurs from the user may be stored in the memory. In addition, information on various features that may be derived from voice may be stored in the memory, and the form of information stored in the memory is not limited to the form of a waveform.

The cleaning robot may recognize direction information of the voice input through the microphone implemented in the array form. Accordingly, the cleaning robot may recognize the point from which the user's voice is generated and move to the recognized point using the driving motor and a wheel.

Accordingly, the cleaning robot may acquire biometric information of the user through the sensor module (4610). Here, the biometric information includes various pieces of information, such as heartbeat, blood sugar, and body temperature, from which a state of the user's body may be recognized. The sensor module is formed by various known sensors such as a heartbeat sensor and an IR sensor capable of recognizing the state of the user's body and a control device such as a processor capable of controlling the above-mentioned sensors.

The cleaning robot may determine a degree of a state of the user from the biometric information of the user acquired by the sensor module, and control devices in the cleaning robot on the basis of a response plan in accordance with a determined result (4620). A response plan corresponding to a determined result related to a degree of a state of the user may be stored in the memory of the cleaning robot or an external server. When the response plan is stored in the memory, the cleaning robot may search for a response plan corresponding to the determined result from the memory and perform an operation on the basis of a found result. In another example, the cleaning robot may connect to an external server through a communication network, search for a response plan corresponding to a determined result, and perform an operation on the basis of a found result.

Alternatively, some response plans corresponding to a determined result related to a degree of a state of the user may be stored in the memory, and the remaining response plans may be stored in an external server. Accordingly, when, as a result of searching from information stored in the memory, a response plan according to a determined result does not exist, the cleaning robot may connect to an external server. There is no limitation.

Hereinafter, an operational flowchart of a cleaning robot that checks a state of the user according to a predetermined cycle will be described.

Figure 48:
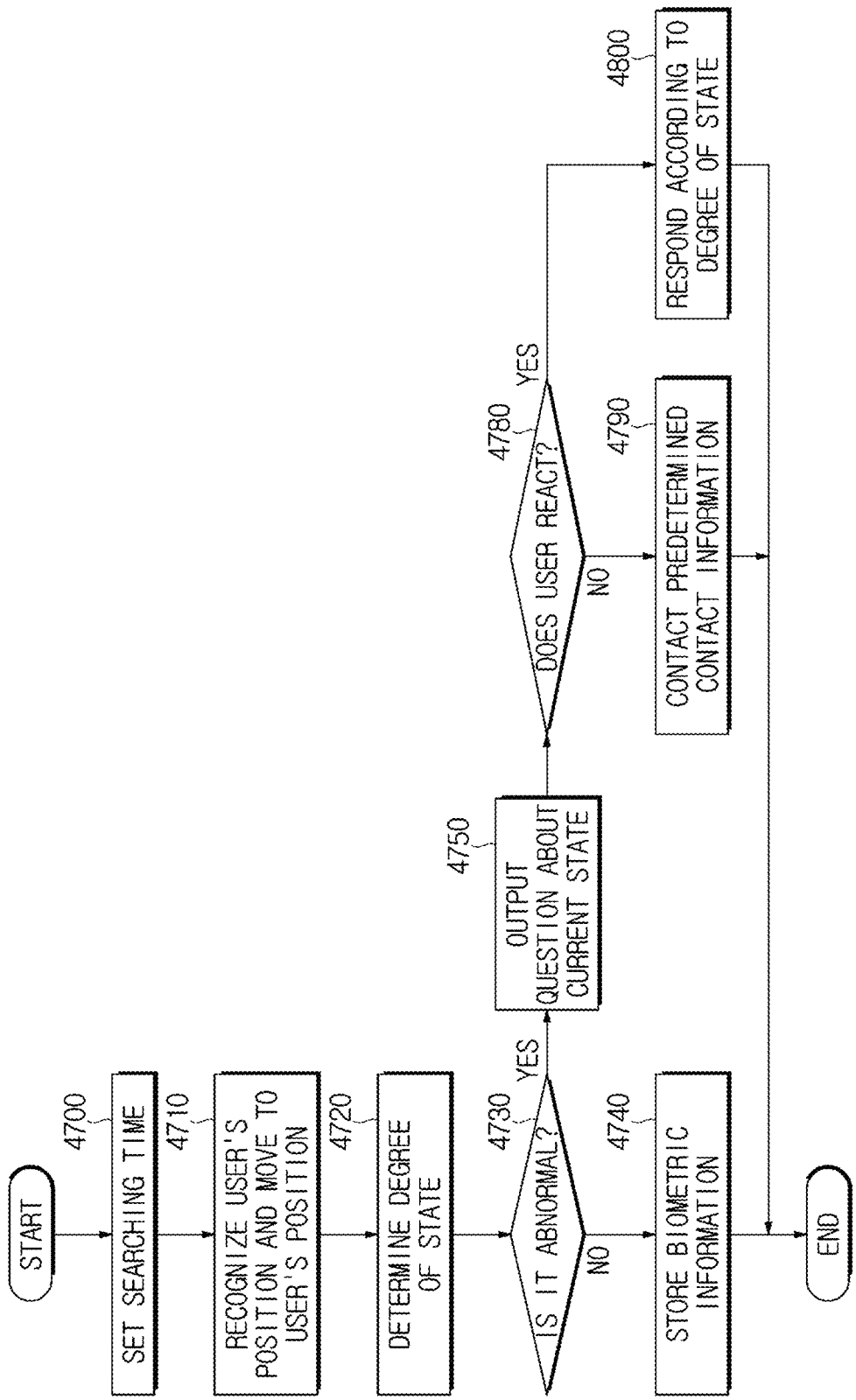
FIG. 48 is a view illustrating an operational flowchart of a cleaning robot that determines a state of the user according to a set searching time according to one embodiment.
Figure 50:
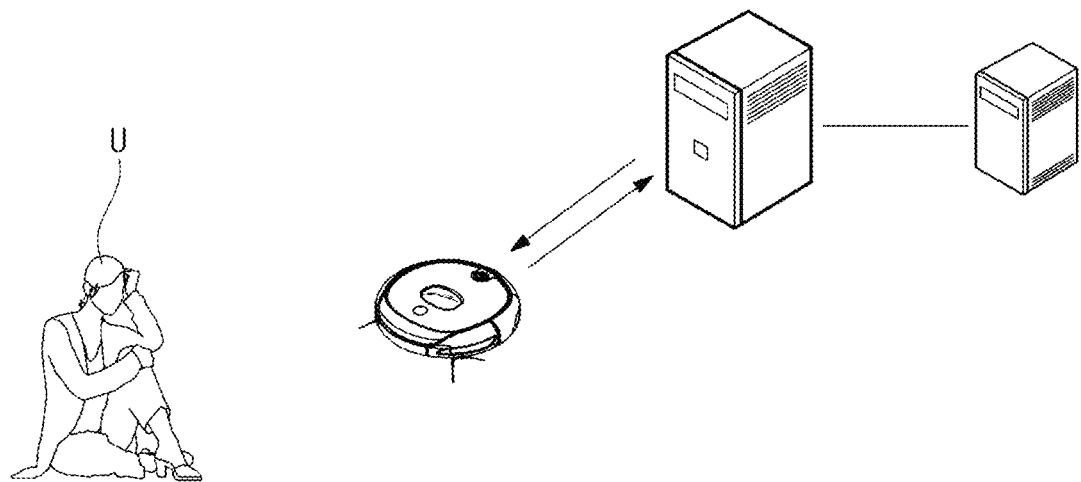

FIG. 48 is a view illustrating an operational flowchart of a cleaning robot that determines a state of the user according to a set searching time according to an embodiment, and FIGS. 49 and 50 are views for describing a response plan through a home network when a user is in an emergency situation according to different embodiments.

The cleaning robot may receive setting on a searching time of a user state from the user (4700). For example, the cleaning robot may receive a searching time through an input unit or a display implemented as a touchscreen type. In another example, the cleaning robot may receive a searching time from a user terminal through a communication network. The method in which the cleaning robot receives a searching time is not limited. Here, the searching time may be set as a specific time slot such as 1:00 or 2:30 or may be set as a specific cycle such as every 30 minutes or every 2 hours.

The cleaning robot may use a device capable of detecting the user such as a 3D sensor and an imaging unit to recognize the position of the user and move to a point at which the user is present (4710). Accordingly, the cleaning robot may acquire biometric information of the user through the sensor module and determine a degree of a state of the user on the basis of the acquired biometric information (4720).

The cleaning robot may determine whether the user's state is abnormal on the basis of a determined result (4730). When the user's state is determined as normal as a result of determination, the cleaning robot may store the acquired biometric information and information on time at which the biometric information is acquired (4740). Here, the cleaning robot may store the information in the memory built therein or an external server. The location in which the information is stored is not limited. Although the leaning robot may store the biometric information and the time information as log data, embodiments are not limited thereto.

When the user's state is determined as abnormal as a result of determination, the cleaning robot may output a question about the current state by voice through the speaker (4750). Accordingly, the cleaning robot may vary a response plan according to whether the user responds to the question, i.e., whether the user reacts to the question (4780). When the use reacts, the cleaning robot determines that the situation is not critical. Accordingly, when it is determined that the user has a chronic disease as a result of recognizing biometric history information of the user, the cleaning robot may contact a doctor through predetermined contact information or send a message (4790).

Embodiments are not limited thereto, and other than above, referring to FIG. 49, the cleaning robot may control on/off of a lamp through the gateway server of the home network, operate a siren, or control an operation of an IoT device present in the indoor space, such as an air conditioner.

In still another example, the cleaning robot may recognize the user's voice through the voice recognition module and provide a service that corresponds to a recognized result. In one embodiment, even when the user's body temperature is determined as exceeding a predetermined level and being abnormal, the cleaning robot may turn on the air conditioner through the gateway server of the home network when the user's reaction is detected.

Alternatively, the cleaning robot may inform of an action that the user should take on the basis of a determined result according to a degree of a state of the user. For example, when the user's body temperature is determined as exceeding a predetermined level and being abnormal while the indoor temperature is determined as being at an optimal level, the cleaning robot may determine that the user has fever due to cold or the like. Accordingly, the user may output a response plan such as "Ice pack needs to be applied" through the speaker.

When the user's reaction is not detected, the cleaning robot may respond according to a degree of a state of the user (4800). When a degree of a state of the user is determined as having a significant difference from the state of the user at ordinary times, the cleaning robot may determine that the state cannot be improved by only the cleaning robot itself or operations of a plurality of IoT devices in the indoor space, and request for help to the outside.

For example, the cleaning robot may attempt to make a phone call or send a message using a network of emergency contacts or the like stored in the memory built in the cleaning robot or an external server. In another example, the cleaning robot may control on/off of a lamp, turn on a siren, or send an emergency signal to a security office to inform of an emergency situation to the outside.

The cleaning robot may be operated according to a preset response plan, i.e., unlock the door-lock at the front door by being linked to the gateway server of the home network to facilitate entering the house from the outside.

The above-described various response plans may be preset and stored in the memory of the cleaning robot or an external server, and the cleaning robot may use these to perform an operation according to a response plan.

Emotional analysis results in accordance with states of the user and response plans in accordance with the emotional analysis results may also be stored in the memory of the cleaning robot or an external server. Accordingly, the cleaning robot may use an emotional analysis result of the user and perform an operation of mitigating a symptom of the user. For example, the cleaning robot may transmit at least one of the user's biometric information and the user's voice to an external server and receive an analysis result and a response plan corresponding thereto.

As an example, when it is determined that the user is enraged as a result of determining the user's emotional state, the cleaning robot may be linked to IoT devices through the gateway server of the home network and adjust temperature, intensity of illumination, humidity level, or the like of the indoor space. The cleaning robot may operate according to various response plans, e.g., connect to a web server through the gateway server and support a streaming service for music suitable for the user's emotional state, have conversation with the user, or the like.

In another example, when the user is determined as having a mental disease on the basis of the user's history information, the cleaning robot may contact predetermined contact information, e.g., a guardian, or send a message to the guardian.

The cleaning robot according the embodiment may also determine the user's state and provide multimedia services as well as a service based on a determined result.

Hereinafter, a cleaning robot that supports various multimedia functions in addition to the cleaning function will be described.

Figure 51:
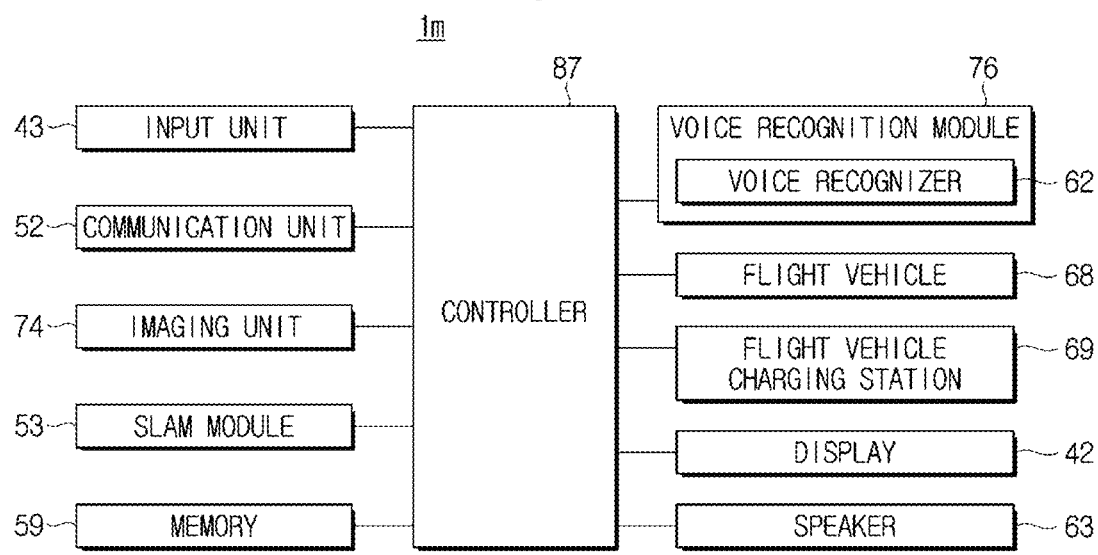
FIG. 51 is a view illustrating a control block diagram of a cleaning robot that provides multimedia services according to one embodiment.
Figure 52:
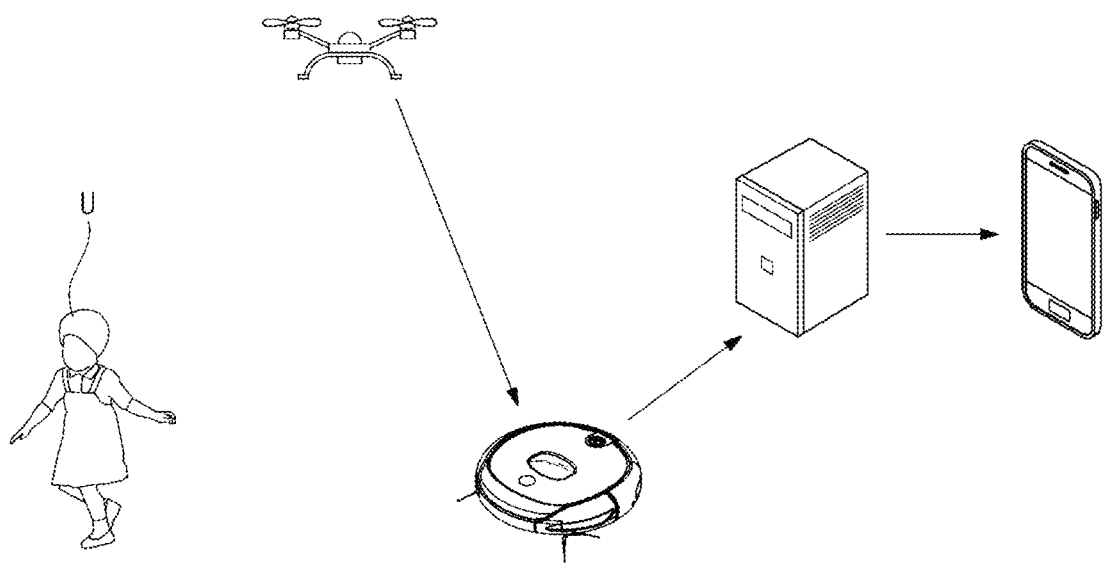
FIG. 52 is a view for describing a case in which a user is followed by a flight vehicle and image information is acquired according to one embodiment.
Figure 53:
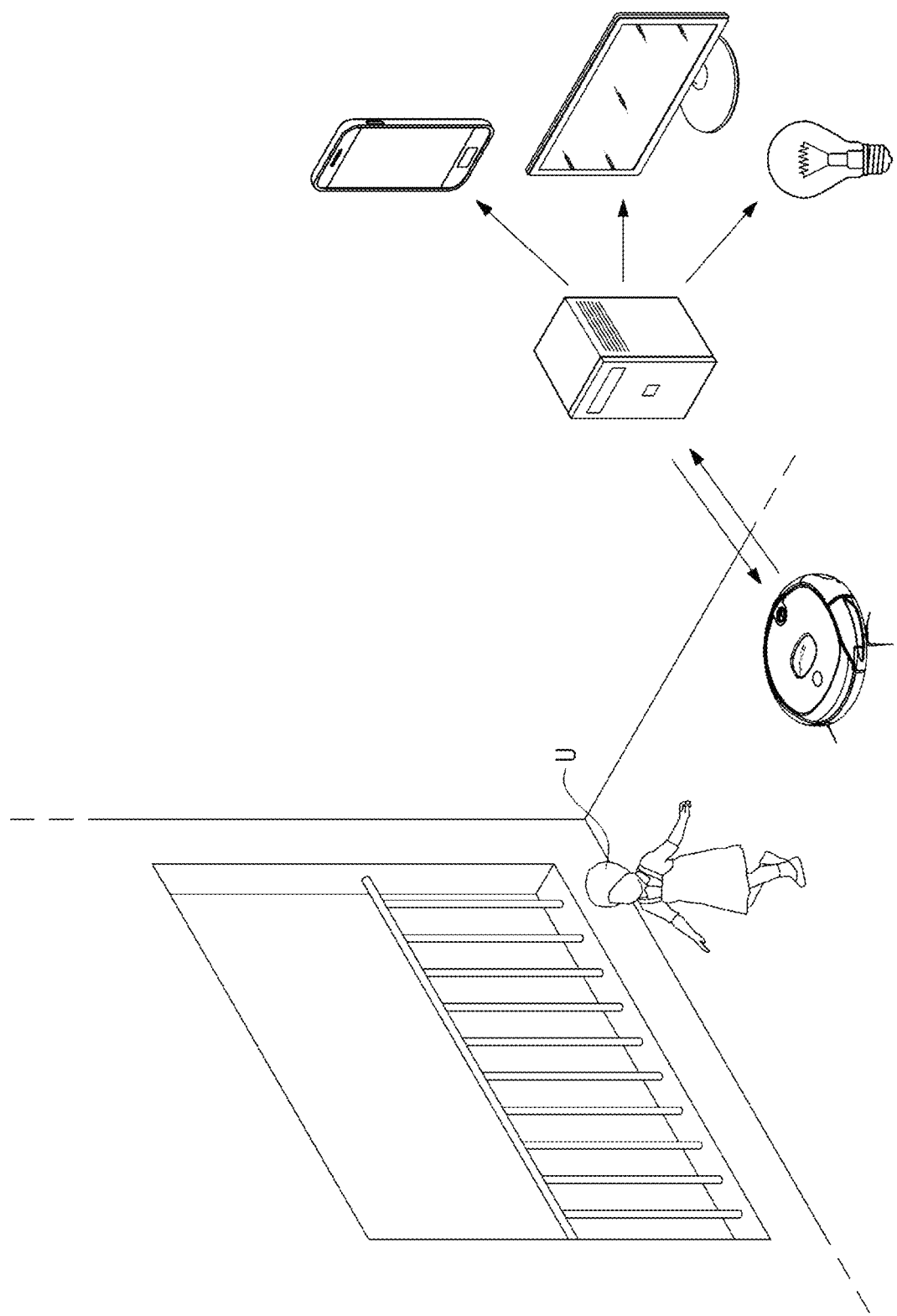
FIG. 53 is a view for describing a case in which the possibility of an occurrence of danger of a user is detected and a process corresponding thereto is processed according to one embodiment.
Figure 54:
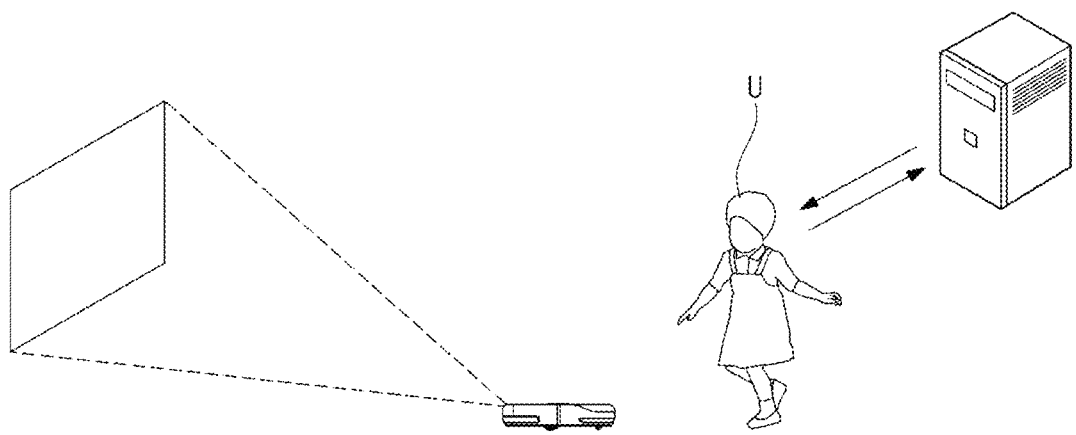
FIG. 54 is a view for describing a case in which various types of images are displayed by a beam projector according to one embodiment.
Figure 55:
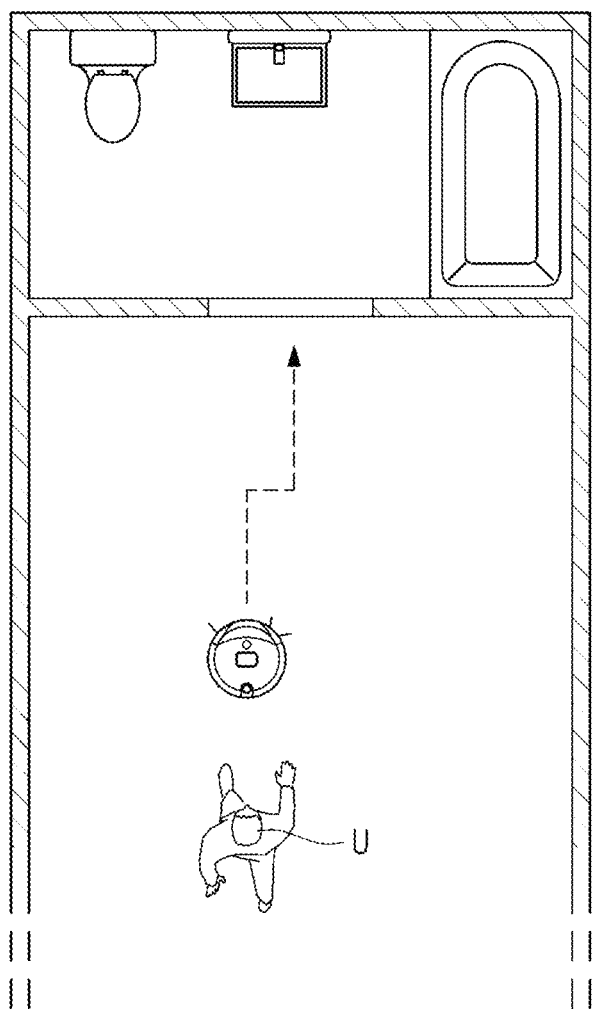
FIG. 55 is a view for describing a cleaning robot that provides a path to a specific area or room according to one embodiment.

FIG. 51 is a view illustrating a control block diagram of a cleaning robot that provides multimedia services according to an embodiment, FIG. 52 is a view for describing a case in which the user is followed by a flight vehicle and image information is acquired according to an embodiment, and FIG. 53 is a view for describing a case in which the possibility of an occurrence of danger of the user is detected and a process corresponding thereto is processed according to an embodiment. FIG. 54 is a view for describing a case in which various types of images are displayed by a beam projector according to an embodiment, and FIG. 55 is a view for describing a cleaning robot that provides a path to a specific area or room according to an embodiment.

A cleaning robot 1*m* may include the input unit 43, the communication unit 52, the imaging unit 74, the SLAM module 53, the memory 59, the voice recognition module 76, the flight vehicle 68, the flight vehicle charging station 69, the display 42, the speaker 63, and a controller 87. Here, at least one of the above-described elements may be integrated in an SOC built in the cleaning robot 1*m*, but because a plurality of SOCs may be built in the cleaning robot 1*m* instead of in only one SOC, embodiments are not limited to at least one of the above being integrated in only one SOC.

In addition to various types of control commands related to the cleaning robot 1*m*, the input unit 43 may also receive various types of control commands related to various IoT devices linked to the cleaning robot 1*m* from the user. For example, the input unit 43 may receive an object whose image information is attempted to be acquired from the user.

In one embodiment, when the display 42 is implemented as a touchscreen type, the display 42 may serve as the input unit 43. Here, from image information acquired by the imaging unit 74, the user may touch an object to be captured or draw a border line. As well be described below, other than the input unit 43, an object may also be selected by a user terminal connected through the communication unit 52.

Because general description on the communication unit 52 is the same as that given above, detailed description on the communication unit 52 will be omitted. The communication unit 52 may exchange data with an IoT device located in the indoor space or exchange data with a user terminal located outside through a communication network.

For example, as described above, applications for providing various types of services related to the cleaning robot 1*m* may be installed in the user terminal. Accordingly, the user terminal may display image information acquired by the cleaning robot 1*m* through an application and provide a user interface (UI) through which the user may select an object to be followed from the image information. Accordingly, the user may select an object through the UI, and the user terminal may transmit information on the selected object to the communication unit through the communication network. Then, the cleaning robot 1*m* may recognize the information on the selected object.

The imaging unit 74 may acquire image information on the object. Because general description on the imaging unit 74 is the same as that given above, general description on the imaging unit 74 will be omitted.

The imaging unit 74 may use a tracing algorithm and trace an object included in the image information. Here, the tracing algorithm refers to a technology for tracing a specific object by image processing from image information. The tracing algorithm may be implemented by various known technologies. As described above, the imaging unit 74 may be mounted on a flight vehicle, a bar, or the like and be implemented so that a lens thereof follows movement of an object.

For example, referring to FIG. 52, the imaging unit 74 may be mounted on a flight vehicle. Accordingly, the flight vehicle may follow a user U, acquire image information, and transmit the acquired image information to the cleaning robot. Then, the communication unit 52 may transmit the image information to a user terminal through the gateway server of the home network.

The voice recognition module 76 may be provided in the cleaning robot 1*m*. Because detailed description on the voice recognition module 76 is the same as that given above, the detailed description thereof will be omitted.

The voice recognition module 76 may receive a voice of an object selected by the user through the voice recognizer 62. Accordingly, as described above, the voice recognition module 76 may derive a voice recognition result related to a voice received through the memory or the voice recognition server.

The controller 87 may control the overall operation of the cleaning robot 1*m*. Because general description on the controller 87 is the same as that given above, the general description thereof will be omitted. For example, the controller 87 may control a motor built in the flight vehicle or bar using a control signal and cause the imaging unit 74 to follow movement of an object.

The controller 87 may control an operation of the cleaning robot 1*m* and perform a process corresponding to a situation that occurs according to movement of an object. Hereinafter, a case in which an object is a person, as an example of the object, will be described.

An indoor space of the house may be polluted as the object moves. The controller 87 may detect pollution that occurs as the object moves from image information, and control the operation of the cleaning robot 1*m* to perform appropriate cleaning.

For example, potable water filled in a cup may be spilled as the object moves. Then, the controller 87 may use a wet cleaning head and clean a polluted region detected from image information according to the wet cleaning mode. In another example, dust on a bookshelf or the like may fall on the floor as the object moves. Then, the controller 87 may use a dry cleaning head and clean a polluted area detected from image information according to the dry cleaning mode. That is, the cleaning robot 1*m* according to the embodiment may provide the cleaning function, which is the original function of the cleaning robot 1*m* itself, in addition to multimedia functions.

Alternatively, an object may move to a danger area. For example, when an object is an infant, a kitchen space, an area next to a window, and the like may be set as danger areas. Accordingly, the controller 87 may control devices in the cleaning robot 1*m* and provide warning to the infant or take a response action.

In one embodiment, when the infant approaches an area next to a window as illustrated in FIG. 52, the controller 87 may output a warning message to the infant U through the speaker 63. Alternatively, the controller 87 may output a warning message through a speaker or the like mounted on an IoT device through the communication unit 52. In another embodiment, the controller 87 may contact or send a message to a user terminal located outside through the communication unit 52. Accordingly, the user may recognize an emergency situation and take quick action.

In still another example, the controller 87 may perform an operation corresponding to a recognized result related to the voice of the object being traced in image information. For example, when it is determined that the object desires to watch a specific program as a result of recognition, the controller 87 may turn on a TV through the gateway server of the home network and connect to a communication network to control the above-mentioned specific program to be downloaded. Here, as illustrated in FIG. 54, the controller 87 may display the above-mentioned program through a device capable of displaying various pieces of information such as a beam projector of the cleaning robot 1*m*.

Other than above, the controller 87 may support a sound source streaming service through the speaker 63 of the cleaning robot 1*m* or a speaker of an IoT device or support a book-reading service through a text-to-speech (TTS) function built in the cleaning robot 1*m* or an IoT device. That is, instead of simply supporting only the cleaning function, the cleaning robot 1*m* may provide various multimedia services.

In yet another example, an object may be a person who is visually impaired, and as illustrated in FIG. 55, the object may request for a path to a toilet by voice. Then, the controller 87 may combine map information recognized by the SLAM module 53 and a position of the object being followed by the imaging unit 74, and provide the path to the toilet through the speaker 63. Here, a process according to each situation is implemented as a program or algorithm and stored in the memory 59 of the cleaning robot 1*m* or an external server.

Hereinafter, an operational flow of the cleaning robot according to the embodiment will be described.

Figure 56:
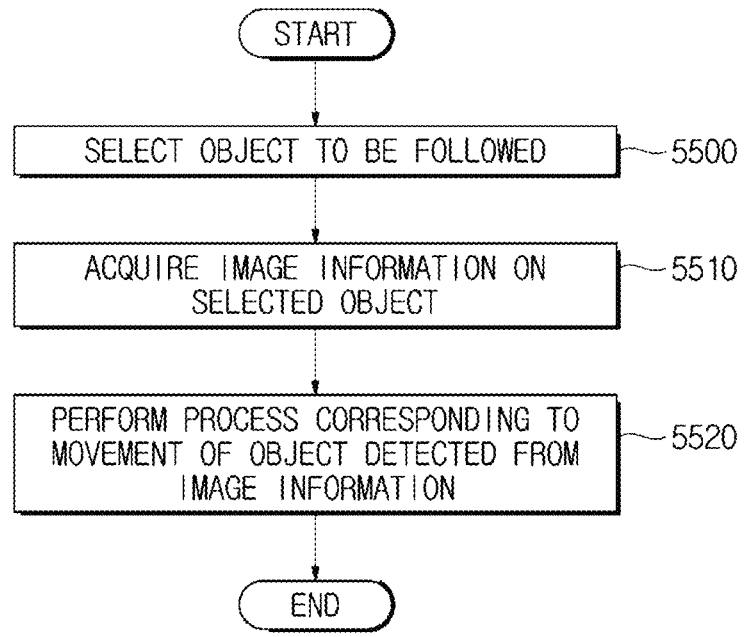
FIG. 56 is a view illustrating an operational flowchart of a cleaning robot that follows an object and acquires image information according to one embodiment.

FIG. 56 is a view illustrating an operational flowchart of the cleaning robot that follows an object and acquires image information according to an embodiment.

The cleaning robot may receive information on an object to be followed from the user through the input unit or communication network (5500). For example, the cleaning robot may display image information on the display of the cleaning robot or on a display of a user terminal located outside and connected through a communication network or an IoT device. Accordingly, the user may select an object to be followed by using various methods from the display. Here, the cleaning robot may receive history information on the object such as age or medical history of the object selected through the input unit or communication network from the user.

When there is a history of following the object and acquiring image information, the cleaning robot may store the record so that the user does not need to input detailed information of the object when the user selects the object again. For example, an image of the object may be pre-stored in the cleaning robot, and the user may set name, title, or the like related to the object, and set history information of the object together. Accordingly, the cleaning robot may display a list of objects through at least one of the above-described displays. Then, the user may select an object to be followed from the list of objects without requiring to select an object from image information. In this way, the user may more conveniently select an object.

The cleaning robot may follow the selected object and acquire image information in which the object is included (5510). The cleaning robot may adjust left/right, top/bottom/, height of an imaging unit, e.g., a camera, to follow movement of the object.

The cleaning robot may transmit the image information acquired by following the object to a user terminal through a communication network. Accordingly, even when the user is outside, the user may receive the image information on the object. Particularly, when the object is an infant, the user may check the infant even from outside to prevent any accident.

For example, the cleaning robot may control the flight vehicle at which the imaging unit is mounted so that the flight vehicle follows the infant and acquire image information on the infant. The cleaning robot may receive the image information from the flight vehicle and transmit the received image information to the user terminal. Accordingly, the user may check the image information through the user terminal and prepare for any danger. In this way, the user's anxiety when the infant is left alone in the indoor space may also be eased.

The cleaning robot may detect movement of the object from the image information and take response action according to an occurred situation on the basis of the detected movement of the object (5520). For example, when, on the basis of history information of the object, it is determined that a problem may occur as the object moves, the cleaning robot may be operated according to a response plan corresponding thereto.

For example, a response plan may vary according to history information of an object. For example, in the case in which an object is an infant who is N years old or younger, when it is determined that the object is moving to the kitchen on the basis of map information of the indoor space stored in the memory, the cleaning robot may perform an operation such as outputting a voice warning through the speaker, contacting or sending a message to predetermined contact information, or requesting for help to the outside through an IoT device. Here, N may be set as 13 years old or younger, but N is not limited thereto.

For example, when the infant moves to a danger area, the cleaning robot may output a voice warning such as "Dangerous. Be careful" through the speaker. The cleaning robot may transmit image information and the voice of the infant recorded through the voice recognition module to the user terminal such as a smartphone and a wearable device.

Embodiments are not limited thereto, and the cleaning robot may also control on/off of a lamp and inform of danger to the outside using an IoT device.

In another example, in the case in which it is set in history information that the object has a disease, when movement of the object is determined as abnormal from the image information, the cleaning robot may perform an operation such as contacting or sending a message to predetermined contact information, or requesting for help to the outside through an IoT device. That is, the cleaning robot may control devices in the cleaning robot according to various response plans on the basis of at least one of history information and image information and take appropriate action on the object.

Figure 57:
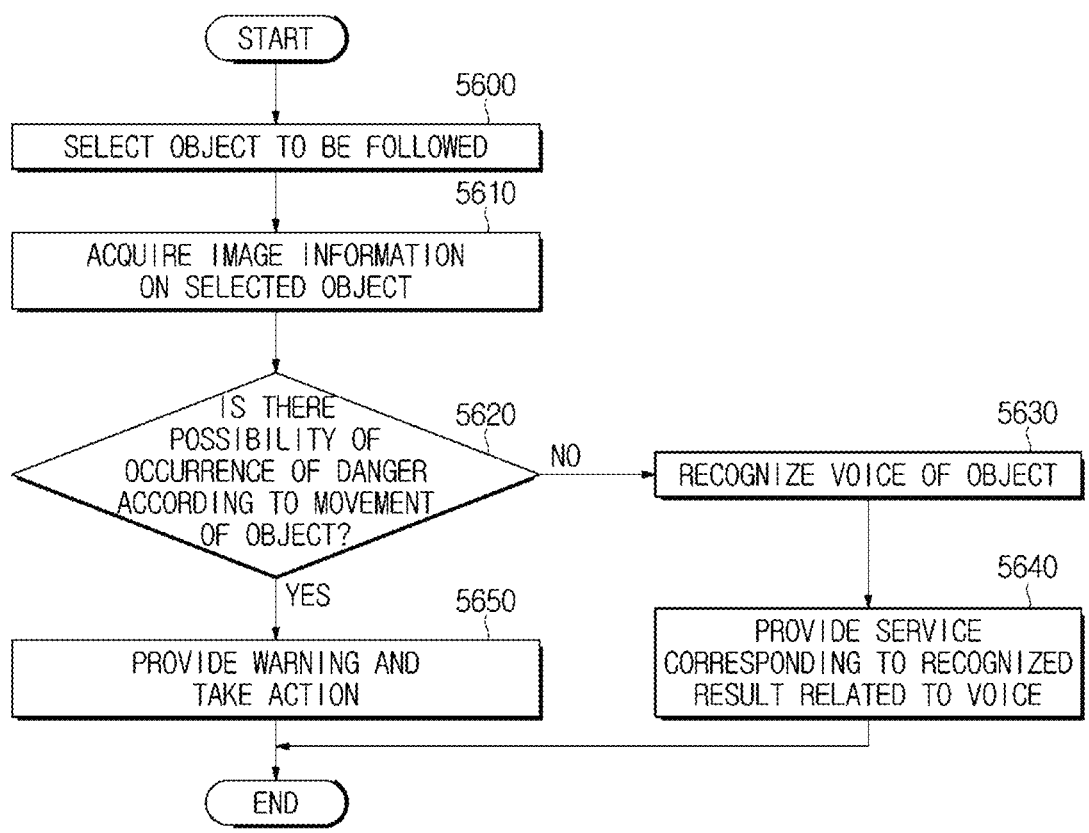
FIG. 57 is a view illustrating an operational flowchart of a cleaning robot that predicts an occurrence of danger according to movement of an object and provides a safety service according to one embodiment.

FIG. 57 is a view illustrating an operational flowchart of a cleaning robot that predicts an occurrence of danger according to movement of an object and provides a safety service according to an embodiment.

Because descriptions of Step 5600 and Step 5610 are respectively the same as descriptions of Step 5500 and Step 5510 given above, detailed description thereof will be omitted.

The cleaning robot may determine the possibility of an occurrence of danger according to movement of an object (5620). When it is determined that there is no possibility of an occurrence of danger as a result of determination according to movement of the object, the cleaning robot may switch to a standby state in which the object's voice may be recognized (5630). Accordingly, when a voice command is produced from the object, the cleaning robot may provide a service corresponding to a recognized result related to the voice command. For example, the cleaning robot may provide various multimedia services described above.

For example, when an object is an adult, the cleaning robot may determine that there is the possibility of an occurrence of danger when the state of the object cannot be viewed as normal such as when a change in movement of the object is not constant. When an object is an infant, the cleaning robot may determine that there is the possibility of an occurrence of danger when, as described above, the infant approaches a danger area such as a kitchen space and an area next to a window.

Accordingly, when it is determined that there is the possibility of an occurrence of danger as an object moves, the cleaning robot may provide warning and take response action (5650). As described above, the cleaning robot may take various response actions such as outputting a warning message through the speaker and contacting or sending a message to predetermined contact information.

The embodiments described herein and the configurations illustrated in the drawings are merely exemplary embodiments of the disclosure, and various modifications that may substitute for the embodiments and drawings of the present specification may be present at the time of filing this application.

The terms used herein are for describing the embodiments and are not intended to limit and/or restrict the disclosure. A singular expression includes a plural expression unless the context clearly indicates otherwise. In the application, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Terms including ordinals such as "first" and "second" herein may be used to describe various elements, but the elements are not limited by the terms. The terms are only used for the purpose of distinguishing one element from another element. For example, a first element may be referred to as a second element while not departing from the scope of the present disclosure, and likewise, a second element may also be referred to as a first element. The term "and/or" includes a combination of a plurality of related described items or any one item among the plurality of related described items.

Terms such as "unit," "-er/or," "block," "member," and "module," when used herein, may refer to a unit of processing at least one function or operation. For example, the terms may refer to software or hardware such as field-programmable gate array (FPGA) and application-specific integrated circuit (ASIC). However, a "unit," "-er/or," "block," "member," and "module" are not limited to software or hardware, and the "unit," "-er/or," "block," "member," and "module" may be configurations stored in an accessible storage medium and performed by one or more processors.

The invention claimed is:

1. A cleaning robot comprising:
    a modular including one or more modules configured to perform different functions, wherein the one or more modules includes a gripper module configured to control a robot arm and mount a cleaning head on the robot arm; and
    a controller configured to:
        identify a cleaning head corresponding to a cleaning mode,
        control an operation of the robot arm to mount the cleaning head corresponding to the cleaning mode on the robot arm, and
        control at least one of the one or more modules in the cleaning robot and Internet-of-Things (IoT) devices.

2. The cleaning robot of claim 1, wherein:
    the controller is further configured to control an operation of the gripper module to perform cleaning using the cleaning head mounted on the robot arm.

3. A cleaning robot comprising:
    a robot arm on which a cleaning head is mounted; and
    a controller configured to:
        identify a cleaning head corresponding to a cleaning mode from among a plurality of cleaning heads,
        control mounting between the robot arm and the identified cleaning head, and
        control performance of cleaning using the mounted cleaning head.

4. The cleaning robot of claim 3, wherein a water supply pipe configured to supply water to the cleaning head and a suctioning flow path configured to suction dust are provided inside the robot arm.

5. The cleaning robot of claim 3, wherein a docking unit configured to guide coupling with the cleaning head and an electromagnet configured to fix the cleaning head are provided inside the robot arm.

6. The cleaning robot of claim 3, further comprising a cleaning head storage in which the plurality of cleaning heads are stored.

7. The cleaning robot of claim 6, wherein the cleaning head storage is provided at a station of the cleaning robot or at a predetermined position.

8. The cleaning robot of claim 6, wherein the plurality of cleaning heads are stored at predetermined positions in the cleaning head storage.

9. The cleaning robot of claim 6, wherein the controller is further configured to use an infrared ray (IR) sensor mounted on the cleaning head storage to identify a position of the cleaning head storage.

* * * * *